(12) United States Patent
Martin et al.

(10) Patent No.: US 12,074,999 B2
(45) Date of Patent: *Aug. 27, 2024

(54) SYSTEMS AND METHODS FOR AUTOMATED EMERGENCY RESPONSE

(71) Applicant: RapidSOS, Inc., New York, NY (US)

(72) Inventors: Michael John Martin, Long Island City, NY (US); Nicholas Edward Horelik, Long Island City, NY (US); John Paul Lawrence, Brooklyn, NY (US); Ramon Antonio Alvarez, Brooklyn, NY (US); Mateo Creamer, Brooklyn, NY (US)

(73) Assignee: RapidSOS, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,732

(22) Filed: May 8, 2023

(65) Prior Publication Data

US 2023/0370540 A1 Nov. 16, 2023

Related U.S. Application Data

(63) Continuation of application No. 17/534,929, filed on Nov. 24, 2021, now Pat. No. 11,689,653, which is a
(Continued)

(51) Int. Cl.
*H04M 1/72421* (2021.01)
*H04W 4/14* (2009.01)
*H04W 4/90* (2018.01)

(52) U.S. Cl.
CPC ......... *H04M 1/72421* (2021.01); *H04W 4/14* (2013.01); *H04W 4/90* (2018.02)

(58) Field of Classification Search
CPC ...... H04M 1/72421; H04W 4/90; H04W 4/14
(Continued)

(56) References Cited

U.S. PATENT DOCUMENTS 5,013,271 A 5/1991 Bartlett
5,022,878 A 6/1991 Casad
(Continued)

FOREIGN PATENT DOCUMENTS

CA 2662606 A1 10/2009
CA 2697986 A1 9/2010
(Continued)

OTHER PUBLICATIONS

Abel et al. Semantics + Filtering + Search—Twitcident exploring information in social web streams. HT'12—Proceedings of 23rd ACM Conference on Hypertext and Social Media (10 pgs) (Jun. 25-28, 2012).
(Continued)

*Primary Examiner* — Nghi H Ly
(74) *Attorney, Agent, or Firm* — Fitch, Even, Tabin & Flannery LLP

(57) ABSTRACT

Described herein are systems, devices, methods, and media for facilitating emergency communications by an emergency management system. In one embodiment, a method for facilitating emergency communications comprises: identifying a user potentially affected by an emergency; providing an emergency response message to a communication device associated with the user; receiving confirmation of the emergency; in response to receiving confirmation of the emergency, initiating an autonomous communication session with the user through the communication device; extracting emergency information from the autonomous communication session; and providing the emergency information to an emergency service provider (ESP).

20 Claims, 29 Drawing Sheets

Related U.S. Application Data continuation of application No. 16/798,049, filed on Feb. 21, 2020, now Pat. No. 11,218,584.

(60) Provisional application No. 62/809,379, filed on Feb. 22, 2019.

(58) Field of Classification Search
USPC .......... 455/404.1, 404.2, 414.1, 456.1, 422.1
See application file for complete search history.

(56) References Cited

U.S. PATENT DOCUMENTS

| | | |
|---|---|---|
| 5,379,337 A | 1/1995 | Castillo |
| 5,479,482 A | 12/1995 | Grimes |
| 5,563,931 A | 10/1996 | Bishop |
| 5,596,625 A | 1/1997 | Leblanc |
| 5,710,803 A | 1/1998 | Kowal |
| 5,742,666 A | 4/1998 | Alpert |
| 6,014,555 A | 1/2000 | Tendler |
| 6,133,853 A | 10/2000 | Obradovich |
| 6,167,255 A | 12/2000 | Kennedy, III |
| 6,249,674 B1 | 6/2001 | Verdonk |
| 6,252,943 B1 | 6/2001 | Johnson |
| 6,256,489 B1 | 7/2001 | Lichter |
| 6,262,655 B1 | 7/2001 | Yoshioka |
| 6,292,687 B1 | 9/2001 | Lowell |
| 6,363,138 B1 | 3/2002 | Aprile |
| 6,459,782 B1 | 10/2002 | Bedrosian |
| 6,477,362 B1 | 11/2002 | Raith |
| 6,502,030 B2 | 12/2002 | Hilleary |
| 6,510,315 B1 | 1/2003 | Arnson |
| 6,556,816 B1 | 4/2003 | Gafrick |
| 6,571,092 B2 | 5/2003 | Faccin |
| 6,574,323 B1 | 6/2003 | Manuel |
| 6,587,545 B1 | 7/2003 | Antonucci |
| 6,594,666 B1 | 7/2003 | Biswas |
| 6,600,812 B1 | 7/2003 | Gentillin |
| 6,628,933 B1 | 9/2003 | Humes |
| 6,680,998 B1 | 1/2004 | Bell |
| 6,707,421 B1 | 3/2004 | Drury |
| 6,731,610 B2 | 5/2004 | Sajikawa |
| 6,993,118 B2 | 1/2006 | Antonucci |
| 7,031,663 B2 | 4/2006 | Heinonen |
| 7,054,611 B2 | 5/2006 | Eisner |
| 7,058,385 B2 | 6/2006 | Lauper |
| 7,177,400 B2 | 2/2007 | Eisner |
| 7,224,773 B2 | 5/2007 | Croak |
| 7,271,704 B2 | 9/2007 | Mcsheffrey |
| 7,313,402 B1 | 12/2007 | Rahman |
| 7,324,801 B2 | 1/2008 | Droste |
| 7,349,706 B2 | 3/2008 | Kim |
| 7,409,044 B2 | 8/2008 | Leduc |
| 7,409,428 B1 | 8/2008 | Brabec |
| 7,436,938 B2 | 10/2008 | Savaglio |
| 7,437,143 B1 | 10/2008 | Williams |
| 7,469,138 B2 | 12/2008 | Dayar |
| 7,483,519 B2 | 1/2009 | Binning |
| 7,519,351 B2 | 4/2009 | Malone, III |
| 7,519,372 B2 | 4/2009 | MacDonald |
| 7,548,158 B2 | 6/2009 | Titus |
| 7,565,131 B2 | 7/2009 | Rollender |
| 7,646,854 B2 | 1/2010 | Anderson |
| 7,676,215 B2 | 3/2010 | Chin |
| 7,684,782 B2 | 3/2010 | Ashley, Jr. |
| 7,848,733 B2 | 12/2010 | Bull |
| 7,937,067 B2 | 5/2011 | Maier |
| 7,949,326 B2 | 5/2011 | Gallagher |
| 8,009,810 B2 | 8/2011 | Seidberg |
| 8,041,335 B2 | 10/2011 | Khetawat |
| 8,041,341 B1 | 10/2011 | Malackowski |
| 8,045,954 B2 | 10/2011 | Barbeau |
| 8,068,881 B2 | 11/2011 | Schrager |
| 8,102,972 B2 | 1/2012 | Poremba |
| 8,126,424 B2 | 2/2012 | Piett |
| 8,150,367 B1 | 4/2012 | Malladi |
| 8,165,560 B2 | 4/2012 | Stenquist |
| 8,165,562 B2 | 4/2012 | Piett |
| 8,185,087 B2 | 5/2012 | Mitchell, Jr. |
| 8,195,121 B2 | 6/2012 | Dunn |
| 8,219,135 B2 | 7/2012 | De Amorim |
| 8,244,205 B2 | 8/2012 | Wu |
| 8,249,546 B1 | 8/2012 | Shah |
| 8,249,547 B1 | 8/2012 | Fellner |
| 8,289,953 B2 | 10/2012 | Ray |
| 8,306,501 B2 | 11/2012 | Moodbidri |
| 8,326,260 B1 | 12/2012 | Bradish |
| 8,369,488 B2 | 2/2013 | Sennett |
| 8,396,970 B2 | 3/2013 | Black |
| 8,401,565 B2 | 3/2013 | Sandberg |
| 8,417,090 B2 | 4/2013 | Fleming |
| 8,417,212 B2 | 4/2013 | Cepuran |
| 8,442,481 B2 | 5/2013 | Maier |
| 8,442,482 B2 | 5/2013 | Maier |
| 8,472,973 B2 | 6/2013 | Lin |
| 8,484,352 B2 | 7/2013 | Piett |
| 8,489,062 B2 | 7/2013 | Ray |
| 8,494,868 B2 | 7/2013 | Saalsaa |
| 8,509,729 B2 | 8/2013 | Shaw |
| 8,516,122 B2 | 8/2013 | Piett |
| 8,538,370 B2 | 9/2013 | Ray |
| 8,538,468 B2 | 9/2013 | Daly |
| 8,576,066 B2 * | 11/2013 | Bivens ................ G08B 25/003 455/404.1 |
| 8,588,733 B2 | 11/2013 | Ferguson |
| 8,594,015 B2 | 11/2013 | Dunn |
| 8,606,218 B2 | 12/2013 | Ray |
| 8,625,578 B2 | 1/2014 | Roy |
| 8,626,112 B2 | 1/2014 | Ray |
| 8,630,609 B2 | 1/2014 | Ray |
| 8,644,301 B2 | 2/2014 | Tamhankar |
| 8,649,806 B2 | 2/2014 | Cuff |
| 8,682,279 B2 | 3/2014 | Rudolf |
| 8,682,281 B2 | 3/2014 | Dunn |
| 8,682,286 B2 | 3/2014 | Dickinson |
| 8,712,366 B2 | 4/2014 | Greene |
| 8,747,336 B2 | 6/2014 | Tran |
| 8,751,265 B2 | 6/2014 | Piett |
| 8,755,767 B2 | 6/2014 | Maier |
| 8,760,290 B2 | 6/2014 | Piett |
| 8,761,721 B2 | 6/2014 | Li |
| 8,792,867 B1 | 7/2014 | Negahban |
| 8,811,935 B2 | 8/2014 | Faccin |
| 8,825,687 B2 | 9/2014 | Marceau |
| 8,848,877 B2 | 9/2014 | Seidberg |
| 8,866,606 B1 | 10/2014 | Will |
| 8,868,028 B1 | 10/2014 | Kaltsukis |
| 8,880,021 B2 | 11/2014 | Hawkins |
| 8,890,685 B1 | 11/2014 | Sookman |
| 8,918,075 B2 | 12/2014 | Maier |
| 8,948,732 B1 | 2/2015 | Negahban |
| 8,971,839 B2 | 3/2015 | Hong |
| 8,983,424 B2 | 3/2015 | Binning |
| 8,984,143 B2 | 3/2015 | Serra |
| 9,008,078 B2 | 4/2015 | Kamdar |
| 9,014,657 B2 | 4/2015 | Rohde |
| 9,019,870 B2 | 4/2015 | Khan |
| 9,020,462 B2 | 4/2015 | Hodgson |
| 9,071,643 B2 | 6/2015 | Saito |
| 9,077,676 B2 | 7/2015 | Price |
| 9,078,092 B2 | 7/2015 | Piett |
| 9,094,816 B2 | 7/2015 | Maier |
| 9,129,219 B1 | 9/2015 | Robertson |
| 9,167,379 B1 | 10/2015 | Hamilton |
| 9,244,922 B2 | 1/2016 | Marceau |
| 9,258,680 B2 | 2/2016 | Drucker |
| 9,277,389 B2 | 3/2016 | Saito |
| 9,351,142 B2 | 5/2016 | Basore |
| 9,369,847 B2 | 6/2016 | Borghei |
| 9,384,491 B1 | 7/2016 | Briggs |
| 9,402,159 B1 | 7/2016 | Self |
| 9,408,051 B2 | 8/2016 | Finney |
| 9,420,099 B1 | 8/2016 | Krishnan |
| 9,426,638 B1 | 8/2016 | Johnson |
| 9,497,585 B1 | 11/2016 | Cooley |

(56) References Cited

U.S. PATENT DOCUMENTS

| | | |
|---|---|---|
| 9,503,876 B2 | 11/2016 | Saito |
| 9,544,260 B2 | 1/2017 | Cuff |
| 9,544,750 B1 | 1/2017 | Self |
| 9,591,467 B2 | 3/2017 | Piett |
| 9,609,128 B2 | 3/2017 | Dahan |
| 9,629,185 B1 | 4/2017 | Gluckman |
| 9,635,534 B2 | 4/2017 | Maier |
| 9,648,479 B2 | 5/2017 | Michaelis |
| 9,659,484 B1 | 5/2017 | Mehta |
| 9,693,213 B2 | 6/2017 | Self |
| 9,734,721 B2 | 8/2017 | Stenneth |
| 9,736,670 B2 | 8/2017 | Mehta |
| 9,756,169 B2 | 9/2017 | Mehta |
| 9,805,430 B2 | 10/2017 | Miasnik |
| 9,838,858 B2 | 12/2017 | Anand |
| 9,877,177 B2 | 1/2018 | Lesage |
| 9,924,043 B2 | 3/2018 | Mehta |
| 9,942,739 B2 | 4/2018 | Bozik |
| 9,986,404 B2 | 5/2018 | Mehta |
| 9,992,655 B2 | 6/2018 | Anand |
| 9,998,507 B2 | 6/2018 | Mehta |
| 10,002,375 B1 | 6/2018 | Scythes |
| 10,089,854 B2 | 10/2018 | Hender |
| 10,136,294 B2 | 11/2018 | Mehta |
| 10,140,482 B2 | 11/2018 | White |
| 10,140,842 B2 | 11/2018 | Mehta |
| 10,142,213 B1 | 11/2018 | Hart |
| 10,142,469 B2 | 11/2018 | Klaban |
| 10,142,816 B2 | 11/2018 | Cavendish |
| 10,165,431 B2 | 12/2018 | Bozik |
| 10,419,915 B2 | 9/2019 | Mehta |
| 10,425,799 B2 | 9/2019 | Anand |
| 10,447,865 B2 | 10/2019 | Mehta |
| 10,524,106 B1 | 12/2019 | Skertich |
| 10,657,799 B2 | 5/2020 | Mehta |
| 10,701,541 B2 | 6/2020 | Mehta |
| 10,701,542 B2 | 6/2020 | Martin |
| 10,708,412 B1 | 7/2020 | Killpack |
| 10,771,951 B2 | 9/2020 | Mehta |
| 10,805,786 B2 | 10/2020 | Pellegrini |
| 10,820,181 B2 | 10/2020 | Horelik |
| 10,861,320 B2 | 12/2020 | Martin |
| 10,911,926 B2 | 2/2021 | Pellegrini |
| 10,922,776 B2 | 2/2021 | Kumar |
| 11,140,538 B2 | 10/2021 | Mehta |
| 11,146,680 B2 | 10/2021 | Leavitt |
| 11,153,737 B2 | 10/2021 | Anand |
| 11,197,145 B2 | 12/2021 | Martin |
| 11,218,584 B2 * | 1/2022 | Martin ............... H04W 4/02 |
| 11,228,891 B2 | 1/2022 | King-Berkman |
| 2001/0051849 A1 | 12/2001 | Boone |
| 2002/0001367 A1 | 1/2002 | Lee |
| 2002/0027975 A1 | 3/2002 | Oxley |
| 2002/0057678 A1 | 5/2002 | Jiang |
| 2002/0120698 A1 | 8/2002 | Tamargo |
| 2003/0069035 A1 | 4/2003 | Shurvinton |
| 2003/0109245 A1 | 6/2003 | Mccalmont |
| 2003/0195775 A1 | 10/2003 | Hampton |
| 2004/0166828 A1 | 8/2004 | Yosioka |
| 2004/0203572 A1 | 10/2004 | Aerrabotu |
| 2004/0229620 A1 | 11/2004 | Zhao |
| 2004/0266390 A1 | 12/2004 | Faucher |
| 2005/0085215 A1 | 4/2005 | Kokko |
| 2005/0104745 A1 | 5/2005 | Bachelder |
| 2005/0111630 A1 | 5/2005 | Potorny |
| 2005/0151642 A1 | 7/2005 | Tupler |
| 2005/0190892 A1 | 9/2005 | Dawson |
| 2005/0192746 A1 | 9/2005 | King |
| 2005/0220277 A1 | 10/2005 | Blalock |
| 2005/0222829 A1 | 10/2005 | Dumas |
| 2005/0239477 A1 | 10/2005 | Kim |
| 2005/0242944 A1 | 11/2005 | Bankert |
| 2005/0282518 A1 | 12/2005 | D Evelyn |
| 2005/0285181 A1 | 12/2005 | Yasui |
| 2006/0077053 A1 | 4/2006 | Park |
| 2006/0085275 A1 | 4/2006 | Stokes |
| 2006/0109960 A1 | 5/2006 | D Evelyn |
| 2006/0154642 A1 | 7/2006 | Scannell |
| 2006/0217105 A1 | 9/2006 | Kumar P S |
| 2006/0293024 A1 | 12/2006 | Benco |
| 2007/0003024 A1 | 1/2007 | Olivier |
| 2007/0030144 A1 | 2/2007 | Titus |
| 2007/0030146 A1 | 2/2007 | Shepherd |
| 2007/0033095 A1 | 2/2007 | Hodgin |
| 2007/0049287 A1 | 3/2007 | Dunn |
| 2007/0053308 A1 | 3/2007 | Dumas |
| 2007/0058528 A1 | 3/2007 | Massa |
| 2007/0060097 A1 | 3/2007 | Edge |
| 2007/0161383 A1 | 7/2007 | Caci |
| 2007/0164872 A1 | 7/2007 | Monroe |
| 2007/0171854 A1 | 7/2007 | Chen |
| 2007/0218895 A1 | 9/2007 | Saito |
| 2008/0019268 A1 | 1/2008 | Rollins |
| 2008/0063153 A1 | 3/2008 | Krivorot |
| 2008/0077474 A1 | 3/2008 | Dumas |
| 2008/0081646 A1 | 4/2008 | Morin |
| 2008/0194238 A1 | 8/2008 | Kwon |
| 2008/0253535 A1 | 10/2008 | Sherry |
| 2008/0274721 A1 | 11/2008 | Stagnetto |
| 2008/0294058 A1 | 11/2008 | Shklarski |
| 2008/0309486 A1 | 12/2008 | Mckenna |
| 2009/0041206 A1 | 2/2009 | Hobby |
| 2009/0094602 A1 | 4/2009 | Ziskind |
| 2009/0134982 A1 | 5/2009 | Robertson |
| 2009/0186596 A1 | 7/2009 | Kaltsukis |
| 2009/0214000 A1 | 8/2009 | Patel |
| 2009/0257345 A1 | 10/2009 | King |
| 2009/0311987 A1 | 12/2009 | Edge |
| 2009/0322513 A1 | 12/2009 | Hwang |
| 2010/0002846 A1 | 1/2010 | Ray |
| 2010/0003964 A1 | 1/2010 | Khare |
| 2010/0093305 A1 | 4/2010 | Reich |
| 2010/0156626 A1 | 6/2010 | Story |
| 2010/0159871 A1 | 6/2010 | Tester |
| 2010/0159976 A1 | 6/2010 | Marocchi |
| 2010/0161727 A1 | 6/2010 | Shaffer |
| 2010/0166153 A1 | 7/2010 | Guleria |
| 2010/0190468 A1 | 7/2010 | Scott |
| 2010/0202368 A1 | 8/2010 | Hans |
| 2010/0238018 A1 | 9/2010 | Kelly |
| 2010/0261448 A1 | 10/2010 | Peters |
| 2010/0262668 A1 | 10/2010 | Piett |
| 2010/0293106 A1 | 11/2010 | Rhoads |
| 2010/0317317 A1 | 12/2010 | Maier |
| 2011/0009086 A1 | 1/2011 | Poremba |
| 2011/0029600 A1 | 2/2011 | Theimer |
| 2011/0051658 A1 | 3/2011 | Jin |
| 2011/0071880 A1 | 3/2011 | Spector |
| 2011/0086607 A1 | 4/2011 | Wang |
| 2011/0103266 A1 | 5/2011 | Andreasen |
| 2011/0134897 A1 | 6/2011 | Montemurro |
| 2011/0151829 A1 | 6/2011 | Velusamy |
| 2011/0153368 A1 | 6/2011 | Pierre |
| 2011/0201357 A1 | 8/2011 | Garrett |
| 2011/0263219 A1 | 10/2011 | Hasenfang |
| 2011/0263319 A1 | 10/2011 | Haemaelaeinen |
| 2012/0002792 A1 | 1/2012 | Chang |
| 2012/0028599 A1 | 2/2012 | Hatton |
| 2012/0029970 A1 | 2/2012 | Stiles |
| 2012/0040636 A1 | 2/2012 | Kazmi |
| 2012/0066139 A1 | 3/2012 | Guzman |
| 2012/0092161 A1 | 4/2012 | West |
| 2012/0144019 A1 | 6/2012 | Zhu |
| 2012/0157795 A1 | 6/2012 | Chiu |
| 2012/0202428 A1 | 8/2012 | Mirbaha |
| 2012/0210325 A1 | 8/2012 | De Lind Van Wijngaarden |
| 2012/0218102 A1 | 8/2012 | Bivens |
| 2012/0256745 A1 | 10/2012 | Piett |
| 2012/0257729 A1 | 10/2012 | Piett |
| 2012/0258680 A1 | 10/2012 | Piett |
| 2012/0289243 A1 | 11/2012 | Tarlow |
| 2012/0295575 A1 | 11/2012 | Nam |
| 2012/0309341 A1 | 12/2012 | Ward |
| 2013/0005295 A1 | 1/2013 | Park |

(56) References Cited

U.S. PATENT DOCUMENTS

| | | |
|---|---|---|
| 2013/0012155 A1 | 1/2013 | Forstall |
| 2013/0030825 A1 | 1/2013 | Bagwandeen |
| 2013/0052983 A1 | 2/2013 | Fletcher |
| 2013/0065569 A1 | 3/2013 | Leipzig |
| 2013/0082837 A1 | 4/2013 | Cosentino |
| 2013/0084824 A1 | 4/2013 | Hursey |
| 2013/0100268 A1 | 4/2013 | Mihailidis |
| 2013/0102351 A1 | 4/2013 | Mo |
| 2013/0122932 A1 | 5/2013 | Patel |
| 2013/0138791 A1 | 5/2013 | Thomas |
| 2013/0143530 A1 | 6/2013 | Ehrlich |
| 2013/0183924 A1 | 7/2013 | Saigh |
| 2013/0185368 A1 | 7/2013 | Nordstrom |
| 2013/0203373 A1 | 8/2013 | Edge |
| 2013/0203376 A1 | 8/2013 | Maier |
| 2013/0222133 A1 | 8/2013 | Schultz |
| 2013/0226369 A1 | 8/2013 | Yorio |
| 2013/0237175 A1 | 9/2013 | Piett |
| 2013/0237181 A1 | 9/2013 | Ray |
| 2013/0260710 A1 | 10/2013 | H R |
| 2013/0309994 A1 | 11/2013 | Karl |
| 2013/0331055 A1 | 12/2013 | Mckown |
| 2013/0331058 A1 | 12/2013 | Harvey |
| 2014/0031000 A1 | 1/2014 | Hanover |
| 2014/0045450 A1 | 2/2014 | Ballantyne |
| 2014/0051379 A1 | 2/2014 | Ganesh |
| 2014/0057590 A1 | 2/2014 | Romero |
| 2014/0086108 A1 | 3/2014 | Dunn |
| 2014/0087680 A1 | 3/2014 | Luukkala |
| 2014/0087780 A1 | 3/2014 | Abhyanker |
| 2014/0096195 A1 | 4/2014 | Morgan |
| 2014/0113606 A1 | 4/2014 | Morken |
| 2014/0126356 A1 | 5/2014 | Lee |
| 2014/0134969 A1 | 5/2014 | Jin |
| 2014/0142979 A1 | 5/2014 | Mitsunaga |
| 2014/0148117 A1 | 5/2014 | Basore |
| 2014/0148120 A1 | 5/2014 | Buck |
| 2014/0155017 A1 | 6/2014 | Fan |
| 2014/0155018 A1 | 6/2014 | Fan |
| 2014/0164505 A1 | 6/2014 | Daly |
| 2014/0199959 A1 | 7/2014 | Hassan |
| 2014/0213212 A1 | 7/2014 | Clawson |
| 2014/0222462 A1 | 8/2014 | Shakil |
| 2014/0248848 A1 | 9/2014 | Mufti |
| 2014/0253326 A1 | 9/2014 | Cho |
| 2014/0257846 A1 | 9/2014 | Hermiz |
| 2014/0302810 A1 | 10/2014 | Inha |
| 2014/0324351 A1 | 10/2014 | Dannevik |
| 2014/0359008 A1 | 12/2014 | Finney |
| 2014/0368601 A1 | 12/2014 | Decharms |
| 2014/0370836 A1 | 12/2014 | Gladstone |
| 2014/0370839 A1 | 12/2014 | Hatton |
| 2014/0370841 A1 | 12/2014 | Roberts |
| 2015/0011176 A1 | 1/2015 | Zhu |
| 2015/0029836 A1 | 1/2015 | Hans |
| 2015/0031324 A1 | 1/2015 | Zentner |
| 2015/0055453 A1 | 2/2015 | Chaki |
| 2015/0055554 A1 | 2/2015 | Sedlacek |
| 2015/0065082 A1 | 3/2015 | Sehgal |
| 2015/0081209 A1 | 3/2015 | Yeh |
| 2015/0081927 A1 | 3/2015 | Xu |
| 2015/0085997 A1 | 3/2015 | Biage |
| 2015/0087259 A1 | 3/2015 | Hinsen |
| 2015/0094095 A1 | 4/2015 | Johnson |
| 2015/0099481 A1 | 4/2015 | Maitre |
| 2015/0109125 A1 | 4/2015 | Kaib |
| 2015/0111524 A1 | 4/2015 | South |
| 2015/0112883 A1 | 4/2015 | Orduna |
| 2015/0137972 A1 | 5/2015 | Nepo |
| 2015/0140936 A1 | 5/2015 | Sachs |
| 2015/0172897 A1 | 6/2015 | Mariathasan |
| 2015/0289121 A1 | 10/2015 | Lesage |
| 2015/0289122 A1 | 10/2015 | Friesen |
| 2015/0296351 A1 | 10/2015 | Tham |
| 2015/0304827 A1 | 10/2015 | Price |
| 2015/0317809 A1 | 11/2015 | Chellappan |
| 2015/0319284 A1 | 11/2015 | Leonessi |
| 2015/0350262 A1 | 12/2015 | Rainisto |
| 2015/0350836 A1 | 12/2015 | Smith |
| 2015/0358794 A1 | 12/2015 | Nokhoudian |
| 2015/0365319 A1 | 12/2015 | Finn |
| 2016/0004224 A1 | 1/2016 | Pi |
| 2016/0012702 A1 | 1/2016 | Hart |
| 2016/0026768 A1 | 1/2016 | Singh |
| 2016/0029197 A1 | 1/2016 | Gellens |
| 2016/0057595 A1 | 2/2016 | Ahmed |
| 2016/0065748 A1 | 3/2016 | Li |
| 2016/0088455 A1 | 3/2016 | Bozik |
| 2016/0110991 A1 | 4/2016 | Hunter |
| 2016/0173689 A1 | 6/2016 | Klaban |
| 2016/0192167 A1 | 6/2016 | Piett |
| 2016/0210581 A1 | 7/2016 | Braun |
| 2016/0219084 A1 | 7/2016 | Abiezzi |
| 2016/0219397 A1 | 7/2016 | Mayor |
| 2016/0227589 A1 | 8/2016 | Marshall |
| 2016/0269535 A1 | 9/2016 | Balabhadruni |
| 2016/0307436 A1 | 10/2016 | Nixon |
| 2016/0315923 A1 | 10/2016 | Riscombe-Burton |
| 2016/0316493 A1 | 10/2016 | Davis |
| 2016/0330769 A1 | 11/2016 | Edge |
| 2016/0337831 A1 | 11/2016 | Piett |
| 2016/0345171 A1 | 11/2016 | Kulkarni |
| 2016/0352898 A1* | 12/2016 | Clawson ................ H04W 4/90 |
| 2016/0353266 A1 | 12/2016 | Winkler |
| 2016/0363931 A1 | 12/2016 | Yang |
| 2016/0371973 A1 | 12/2016 | Holleczek |
| 2017/0004427 A1 | 1/2017 | Bruchal |
| 2017/0005914 A1 | 1/2017 | Edge |
| 2017/0012815 A1 | 1/2017 | Nekrestyanov |
| 2017/0046216 A1 | 2/2017 | Stenneth |
| 2017/0078226 A1 | 3/2017 | Daly |
| 2017/0093594 A1 | 3/2017 | Peak |
| 2017/0099579 A1 | 4/2017 | Ryan |
| 2017/0108862 A1 | 4/2017 | Mikkelsen |
| 2017/0124670 A1 | 5/2017 | Becker |
| 2017/0124852 A1 | 5/2017 | Pauws |
| 2017/0140637 A1 | 5/2017 | Thurlow |
| 2017/0142568 A1 | 5/2017 | Saito |
| 2017/0150335 A1 | 5/2017 | Self |
| 2017/0161614 A1 | 6/2017 | Mehta |
| 2017/0180963 A1 | 6/2017 | Cavendish |
| 2017/0180966 A1 | 6/2017 | Piett |
| 2017/0188218 A1 | 6/2017 | Corley |
| 2017/0213251 A1 | 7/2017 | Nunally |
| 2017/0238129 A1 | 8/2017 | Maier |
| 2017/0238136 A1 | 8/2017 | Smith |
| 2017/0245113 A1 | 8/2017 | Hooker |
| 2017/0287085 A1 | 10/2017 | Smith |
| 2017/0310827 A1 | 10/2017 | Mehta |
| 2017/0316698 A1 | 11/2017 | Stenneth |
| 2017/0323209 A1 | 11/2017 | Rinzler |
| 2017/0325056 A1 | 11/2017 | Mehta |
| 2017/0331954 A1 | 11/2017 | Kotnis |
| 2017/0359712 A1 | 12/2017 | Meredith |
| 2017/0374538 A1 | 12/2017 | Gellens |
| 2018/0020091 A1 | 1/2018 | Self |
| 2018/0053401 A1* | 2/2018 | Martin ................ H04M 11/04 |
| 2018/0077282 A1 | 3/2018 | Herron |
| 2018/0077553 A1 | 3/2018 | Gideon, III |
| 2018/0089718 A1 | 3/2018 | Raisi |
| 2018/0150928 A1 | 5/2018 | Dejewski |
| 2018/0174430 A1 | 6/2018 | Sieja |
| 2018/0176271 A1 | 6/2018 | Laurent |
| 2018/0262544 A1 | 9/2018 | Mehta |
| 2018/0352408 A1 | 12/2018 | Baer |
| 2019/0020993 A1 | 1/2019 | Nguyen |
| 2019/0073894 A1 | 3/2019 | Mehta |
| 2019/0104395 A1 | 4/2019 | Mehta |
| 2019/0130719 A1 | 5/2019 | D'Amico |
| 2019/0149661 A1 | 5/2019 | Klaban |
| 2019/0166244 A1 | 5/2019 | Ravichandran |
| 2019/0166480 A1 | 5/2019 | Rauner |
| 2019/0174288 A1 | 6/2019 | Bozik |
| 2019/0174289 A1 | 6/2019 | Martin |

(56) References Cited

U.S. PATENT DOCUMENTS

| | | |
|---|---|---|
| 2019/0230476 A1 | 7/2019 | Qi |
| 2019/0253861 A1 | 8/2019 | Horelik |
| 2019/0261145 A1 | 8/2019 | South |
| 2019/0281165 A1 | 9/2019 | Mehta |
| 2019/0306664 A1 | 10/2019 | Mehta |
| 2019/0320310 A1 | 10/2019 | Horelik |
| 2019/0327597 A1 | 10/2019 | Katz |
| 2019/0335310 A1 | 10/2019 | Anand |
| 2019/0342526 A1 | 11/2019 | Drako |
| 2019/0380020 A1 | 12/2019 | Pellegrini |
| 2020/0059776 A1 | 2/2020 | Martin |
| 2020/0068374 A1 | 2/2020 | Mehta |
| 2020/0100084 A1 | 3/2020 | Martin |
| 2020/0126174 A1 | 4/2020 | Halse |
| 2020/0135005 A1 | 4/2020 | Katz |
| 2021/0006961 A1 | 1/2021 | King-Berkman |
| 2021/0014659 A1 | 1/2021 | Mehta |
| 2021/0037368 A1 | 2/2021 | Pellegrini |
| 2021/0110686 A1 | 4/2021 | Slavin |
| 2021/0127228 A1 | 4/2021 | Baarman |
| 2021/0266722 A1 | 8/2021 | Pellegrini |
| 2021/0289334 A1 | 9/2021 | Martin |
| 2021/0390844 A1 | 12/2021 | Katz |
| 2022/0014895 A1 | 1/2022 | Horelik |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CN | 104487976 A | 4/2015 |
| CN | 104539776 A | 4/2015 |
| CN | 106021508 A | 10/2016 |
| EP | 2161912 A2 | 3/2010 |
| JP | H10314133 A | 12/1998 |
| JP | H1170086 A | 3/1999 |
| JP | 2006319946 A | 11/2006 |
| JP | 2006334369 A | 12/2006 |
| JP | 2011223285 A | 11/2011 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| KR | 20170100422 A | 9/2017 |
| WO | 9723104 A1 | 6/1997 |
| WO | 0022593 A1 | 4/2000 |
| WO | 0165763 A2 | 9/2001 |
| WO | 0167419 A2 | 9/2001 |
| WO | 2007109599 A2 | 9/2007 |
| WO | 2012129561 A1 | 9/2012 |
| WO | 2014025563 A1 | 2/2014 |
| WO | 2014063121 A1 | 4/2014 |
| WO | 2014074420 A1 | 5/2014 |
| WO | 2014176646 A1 | 11/2014 |
| WO | 2015127867 A1 | 9/2015 |
| WO | 2015196155 A1 | 12/2015 |
| WO | 2016044540 A1 | 3/2016 |
| WO | 2017079354 A1 | 5/2017 |
| WO | 2017083571 A1 | 5/2017 |
| WO | 2017100220 A1 | 6/2017 |
| WO | 2017106775 A1 | 6/2017 |
| WO | 2017112820 A1 | 6/2017 |
| WO | 2017189610 A2 | 11/2017 |
| WO | 2017196753 A1 | 11/2017 |
| WO | 2018039142 A1 | 3/2018 |
| WO | 2019113129 A1 | 6/2019 |
| WO | 2020172612 A1 | 8/2020 |
| WO | 2020205033 A1 | 10/2020 |
| WO | 2021034859 A1 | 2/2021 |
| WO | 2021203037 A1 | 10/2021 |

OTHER PUBLICATIONS

ArcGIS REST Services Directory. Folder: TIGERWeb. Available at https://tigerweb.geo.census.gov/arcgis/rest/services/TIGERweb. (1 pg.) (Accessed Sep. 2017).

Chowdhury et al. Tweet4act: Using incident-specific profiles for classifying crisis-related messages. Proceedings of the 10th International ISCRAM Conference (pp. 834-839) (2013).

Cipolla et al. A tool for Emergency Detection with Deep Learning Neural Networks. KDWeb (2016) How to predict a disaster. ICAR—National Research Council of Italy—Palermo, Italy (Dec. 1, 2016) (10 pgs).

Co-pending U.S. Appl. No. 16/537,377, filed Aug. 9, 2019.

Co-pending U.S. Appl. No. 16/684,366, filed Nov. 14, 2019.

Co-pending U.S. Appl. No. 16/740,207, filed Jan. 10, 2020.

Homeland Security Science and Technology. Using Social Media for Enhanced Situational Awareness and Decision Support. Virtual Social Medial Working Group and DHS First Responders Group. (44 pgs.) (Jun. 2014).

Marcus et al. TwitInfo: Aggregating and Visualizing Microblogs for Event Exploration. ACM CHI Conference May 7-12, 2011, 2011 (10 pgs).

Meier. MatchApp: Next Generation Disaster Response App? Revolution (12 pgs.) (Feb. 27, 2013).

National Emergency Number Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (2012).

National Emergency Number Association (nena) Technical Committee Chairs, "NENA Functional and Interface Standards for Next Generation 9-1-1 Version 1.0 (i3)", (Dec. 18, 2007), URL: https://c.ymcdn.com/sites/nena.site-ym.com/resource/collection/2851C951-69FF-40F0-A6B8-36A714CB085D/NENA_08-002-v1_Functional_Interface_Standards_NG911_i3.pdf, (Feb. 5, 2018), XP055447667.

PCT/US2015/050609 International Search Report and Written Opinion dated Dec. 16, 2015.

PCT/US2016/060189 International Search Report and Written Opinion dated Feb. 24, 2017.

PCT/US2016/065212 International Search Report and Written Opinion dated Feb. 20, 2017.

PCT/US2016/067366 International Search Report and Written Opinion dated Mar. 31, 2017.

PCT/US2016/068134 International Search Report and Written Opinion dated Apr. 21, 2017.

PCT/US2017/029465 International Search Report and Written Opinion dated Aug. 9, 2017.

PCT/US2017/031605 International Search Report and Written Opinion dated Jul. 31, 2017.

PCT/US2017/047854 International Search Report and Written Opinion dated Nov. 28, 2017.

PCT/US2018/063935 International Search Report and Written Opinion dated Mar. 22, 2019.

PCT/US2019/027538 International Search Report and Written Opinion dated Aug. 2, 2019.

Seattle Real Time Fire 911 Calls. Available at https://catalog.data.gov/dataset/seattle-real-time-fire-911-calls-6cdf3 (3 pgs.) (Accessed Sep. 2017).

Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (Jan. 2011).

U.S. Census Bureau. Developers: Population Estimates APIs. Available at https://www.census.gov/data/developers/data-sets/popest-popproj/popest.html (2 pgs.) (Accessed Sep. 2017).

U.S. Appl. No. 14/794,780 Office Action dated Feb. 2, 2016.

U.S. Appl. No. 14/794,780 Office Action dated Mar. 7, 2017.

(56) References Cited

OTHER PUBLICATIONS

U.S. Appl. No. 14/794,780 Office Action dated Nov. 15, 2016.
U.S. Appl. No. 14/856,818 Office Action dated Apr. 12, 2017.
U.S. Appl. No. 15/371,117 Office Action dated Aug. 5, 2019.
U.S. Appl. No. 15/387,363 Office Action dated Jul. 6, 2017.
U.S. Appl. No. 15/387,363 Office Action dated Mar. 15, 2017.
U.S. Appl. No. 15/436,379 Office Action dated Apr. 6, 2017.
U.S. Appl. No. 15/436,379 Office Action dated Nov. 2, 2017.
U.S. Appl. No. 15/436,484 Office Action dated May 8, 2017.
U.S. Appl. No. 15/436,484 Office Action dated Sep. 14, 2017.
U.S. Appl. No. 15/444,133 Office Action dated Apr. 4, 2017.
U.S. Appl. No. 15/444,133 Office Action dated Aug. 17, 2017.
U.S. Appl. No. 15/497,067 Office Action dated Jun. 23, 2017.
U.S. Appl. No. 15/588,343 Office Action dated Feb. 26, 2018.
U.S. Appl. No. 15/589,847 Office Action dated Jun. 23, 2017.
U.S. Appl. No. 15/589,847 Office Action dated Nov. 30, 2017.
U.S. Appl. No. 15/589,847 Office Action dated Nov. 6, 2018.
U.S. Appl. No. 15/667,531 Office Action dated Apr. 5, 2018.
U.S. Appl. No. 15/667,531 Office Action dated Nov. 8, 2017.
U.S. Appl. No. 15/682,440 Office Action dated Jan. 27, 2020.
U.S. Appl. No. 15/682,440 Office Action dated Jul. 10, 2019.
U.S. Appl. No. 15/880,208 Office Action dated Aug. 7, 2018.
U.S. Appl. No. 15/958,186 Office Action dated Oct. 18, 2018.
U.S. Appl. No. 15/958,398 Office Action dated Oct. 12, 2018.
U.S. Appl. No. 15/976,600 Office Action dated Jan. 30, 2020.
U.S. Appl. No. 16/150,099 Office Action dated Jun. 25, 2019.
U.S. Appl. No. 16/162,171 Office Action dated Nov. 4, 2019.
U.S. Appl. No. 16/178,476 Office Action dated May 30, 2019.
U.S. Appl. No. 16/209,892 Office Action dated Feb. 8, 2019.
U.S. Appl. No. 16/271,634 Office Action dated Dec. 16, 2019.
U.S. Appl. No. 16/271,634 Office Action dated Jun. 13, 2019.
U.S. Appl. No. 16/378,363 Office Action dated Jul. 19, 2019.
U.S. Appl. No. 16/421,355 Office Action dated Feb. 4, 2020.
U.S. Appl. No. 16/436,810 Office Action dated Aug. 9, 2019.
U.S. Appl. No. 16/436,810 Office Action dated Dec. 17, 2019.
U.S. Appl. No. 16/526,195 Office Action dated Dec. 27, 2019.
U.S. Appl. No. 16/740,207 Office Action dated Mar. 11, 2020.
U.S. Appl. No. 16/378,363 Office Action dated Jan. 14, 2020.
Weather Company Data for IBM Bluemix APIs. Available at https://twcservice.mybluemix.net/rest-api/ (100 pgs) (Accessed Sep. 2017).
Co-pending U.S. Appl. No. 16/823,192, filed Mar. 18, 2020.
Co-pending U.S. Appl. No. 16/834,914, filed Mar. 30, 2020.
PCT/US2020/013176 International Search Report and Written Opinion dated May 8, 2020.
Song. Next Generation Emergency Call System with Enhanced Indoor Positioning, Columbia University. Thesis [online] [retrieved Apr. 20, 2020 from < url:https://scholar.google.co.kr/citations/?user=h_4uUqAAAAAJ&hl=ko > (156 pgs) (2014) < /url: < a > .
U.S. Appl. No. 16/162,171 Office Action dated Apr. 9, 2020.
U.S. Appl. No. 16/384,600 Office Action dated Apr. 2, 2020.
PCT/US2020/019341 International Search Report and Written Opinion dated Jun. 29, 2020.
PCT/US2020/046857 International Search Report and Written Opinion dated Nov. 18, 2020.
U.S. Appl. No. 15/976,600 Office Action dated Aug. 3, 2020.
U.S. Appl. No. 16/162,171 Office Action dated Sep. 24, 2020.
U.S. Appl. No. 16/384,600 Office Action dated Oct. 2, 2020.
U.S. Appl. No. 16/421,355 Office Action dated Oct. 19, 2020.
U.S. Appl. No. 16/509,296 Office Action dated Sep. 3, 2020.
U.S. Appl. No. 16/684,366 Office Action dated Dec. 23, 2020.
U.S. Appl. No. 16/740,207 Office Action dated Aug. 17, 2020.
U.S. Appl. No. 16/823,192 Office Action dated Dec. 4, 2020.
U.S. Appl. No. 16/834,914 Office Action dated Dec. 2, 2020.
U.S. Appl. No. 16/378,363 Office Action dated Feb. 17, 2021.
U.S. Appl. No. 16/384,600 Office Action dated Jun. 9, 2021.
U.S. Appl. No. 16/865,170 Office Action dated Jul. 9, 2021.
U.S. Appl. No. 16/936,856 Office Action dated Aug. 16, 2021.
U.S. Appl. No. 16/378,363 Office Action dated Sep. 17, 2021.
U.S. Appl. No. 16/539,946 Office Action dated Oct. 6, 2021.
U.S. Appl. No. 16/684,366 Office Action dated Oct. 6, 2021.
U.S. Appl. No. 17/332,863 Office Action dated Sep. 9, 2021.
U.S. Appl. No. 15/976,600 Office Action dated May 13, 2021.
U.S. Appl. No. 16/162,171 Office Action dated Apr. 8, 2021.
U.S. Appl. No. 16/421,355 Office Action dated May 12, 2021.
U.S. Appl. No. 16/537,377 Office Action dated Apr. 16, 2021.
U.S. Appl. No. 16/537,377 Office Action dated Dec. 27, 2021.
U.S. Appl. No. 16/798,049 Office Action dated Jul. 17, 2020.
U.S. Appl. No. 16/798,049 Office Action dated Mar. 8, 2021.
U.S. Appl. No. 16/936,856 Office Action dated Aug. 5, 2021.
U.S. Appl. No. 16/940,043 Office Action dated Oct. 18, 2021.
U.S. Appl. No. 17/065,337 Office Action dated Nov. 8, 2021.
U.S. Appl. No. 17/115,098 Office Action dated Mar. 9, 2021.
U.S. Appl. No. 17/143,819 Office Action dated Dec. 6, 2021.

\* cited by examiner

FIG. 23A

| I. Dispatch Card | II. Data Type |
|---|---|
| 1 – Abdominal Pain | A – (Static) Age |
| 2 – Allergies/Envenomation | B – (Static) Pre-Existing |
| 3 – Animal Bites/Attacks | C – (Static) Medications |
| 4 – Assault/Sexual Assault | D – (Medical) Fall Detection |
| 5 – Back Pain | E – (Medical) Breathing |
| 6 – Breathing Problems | F – (Medical) Heart Rate |
| 7 – Burns/Explosion | G – (Medical) Seizure |
| 8 – CO/Hazmat | H – (Medical) Glucose |
| 9 – Cardiac or Respiratory Arrest | I – (Medical) Body Temperature |
| 10 – Chest Pain | J – (Home) Smoke |
| 11 – Choking | K – (Home) Building |
| 12 – Convulsions/Seizures | L – (Home) CO |
| 13 – Diabetic | M – (Home) Building Hazards |
| 14 – Drowning | N – (Auto) Crash Detection |
| 15 – Electrocution/Lightning | O – (Auto) Vehicle |
| 16 – Eye Problems/Injuries | P – (Auto) Roll-Over |
| 17 – Falls | Q – (Auto) Vehicle Hazards |
| 18 – Headache | R – Real-Time Multimedia |
| 19 – Heart Problems | |
| 20 – Heat/Cold Exposure | |
| 21 – Hemorrhage/Lacerations | |
| 22 – Inaccessible Incident/Other Entrapments | |
| 23 – Overdoes/Poisoning | |
| 24 – Pregnancy/Childbirth/Miscarriage | |
| 25 – Psychiatric/Abnormal Behavior/Suicide | |
| 26 – Sick Person | |
| 27 – Stab/Gunshot/Penetrating Trauma | |
| 28 – Stroke | |
| 29 – Traffic/Transportation Accidents | |
| 30 – Traumatic Injuries | |
| 31 – Unconscious/Fainting | |
| 32 – Unknown Problem | |
| 33 – Transfer/Interfacility/Palliative Care | |

FIG. 23B

Emergency Report

Date: 9/28/18; 12:21 EST

Incident Reporter: John Doe

Location of Emergency: 901 E Shelby Dr, Memphis, TN

Nature of Emergency: Fire

Severity Index: Low

Dispatch Recommendation: 1 Firetruck

Responder Dispatch Time: 12:23 EST

Responder Arrival Time: 12:33 EST

Emergency Data: N/A

SYSTEMS AND METHODS FOR AUTOMATED EMERGENCY RESPONSE

CROSS-REFERENCE

This application is a continuation of U.S. Ser. No. 17/534,929, filed Nov. 24, 2021, which is a continuation of U.S. Ser. No. 16/798,049 filed Feb. 21, 2020, now issued as U.S. Pat. No. 11,218,584, which claims the benefit of U.S. Provisional Application No. 62/809,379 filed Feb. 22, 2019, all of which are incorporated by reference herein.

BACKGROUND OF THE INVENTION

A person in an emergency situation may request help using a mobile communication device such as a cell phone to dial a designated emergency number like 9-1-1 or a direct access phone number for the local emergency service provider (e.g., a public safety answering point (PSAP), or an emergency dispatch center). This call is assigned to one or more first responders by the emergency service provider. However, these communications are typically limited to audio calls with narrow functionality since most emergency service providers that receive emergency calls currently lack the capacity for more sophisticated communications. Additionally, in some instances (e.g., during a mass emergency, such as a hurricane or mass shooting) call-takers at emergency service providers may be fully occupied or otherwise unable to respond to a 9-1-1 call, which can delay the arrival of emergency assistance to those in need.

SUMMARY OF THE INVENTION

Disclosed herein are systems, servers, devices, methods, and media for managing emergency communications such as multimedia data communications. The present disclosure takes advantage of recent technological advancements that have led to the dramatic rise in the number and popularity of sophisticated electronic devices in home, office, mobile, and outdoor environments—commonly referred to the Internet of Things (IoT)—that are capable of sensing and recording information from their environments and communicating over a network. In some embodiments, IoT devices, when in the vicinity of an emergency, are leveraged to provide valuable information, or insight, into the emergency. This information can then be used to automate emergency response services, such as when all of the call-takers at a public safety answering point (PSAP) are occupied and cannot immediately respond to additional calls, or in environments without PSAPs.

Emergency response services such as PSAPs are often limited in the number of available personnel who can field emergency communications. Such limitations can cause a bottleneck in the ability to effectively identify and respond to emergency situations. Dispatchers may be forced to triage or even ignore emergency alerts, resulting in the delay of potentially life-saving assistance. Moreover, dispatchers often commence communications regarding an emergency situation with little or no information. Accordingly, the autonomous communication sessions provided herein solve these technical problems by verifying emergencies and/or gathering information without requiring human assistance. These autonomous communication sessions can also triage an emergency, for example, by verifying the type of emergency, severity or scope of the emergency (e.g., the number of people involved in an accident), injuries, location, and other relevant information. In the scenario that a PSAP is overwhelmed with emergency communications or alerts, the information gathered by the autonomous communication session can be used to triage the alerts so as to place them in a queue to be addressed by a human operator.

One advantage provided by the systems, servers, devices, methods, and media of the instant application is the ability to host autonomous communication sessions (e.g., a chat-bot) with a person in need of emergency assistance. In some embodiments, when a person generates an emergency alert using a communication device (such as by dialing 9-1-1 on a mobile phone in the United States), an emergency management system (EMS) initiates an autonomous communication session with the user of the communication device through which the user can submit critical information regarding their emergency. The emergency information can be gathered through the autonomous communication session without requiring a human call-taker. The EMS can facilitate the collection and transfer of emergency information gathered through an autonomous communication session to emergency service providers (ESPs) such as emergency dispatch centers (EDCs) and/or public safety answering points (PSAPs). By autonomously gathering and distributing emergency information while ESPs are preoccupied or absent, the EMS can ensure and expedite emergency assistance.

Another advantage provided by the systems, servers, devices, methods, and media of the instant application is an emergency assistant application capable of providing basic emergency assistance to those in need before first responders are dispatched and arrive at the scene of an emergency. In some embodiments, when a person generates an emergency alert (such as by dialing 9-1-1 on a mobile phone in the United States) using a smartphone or other IoT device, an emergency management system (EMS) presents an emergency assistant application, gathers emergency data, and delivers a safety recommendation to the person in need through the device. For example, in some embodiments, after determining that a person is bleeding profusely from the arm, the EMS instructs (for instance, through the emergency assistant application) the person through the proper bandaging techniques. In some embodiments, emergency assistance is provided through the autonomous communication session. For example, the gathering of emergency data and/or delivery of safety recommendations may be at least partially automated through an exchange of messages or other communications via a chat-bot. In some embodiments, the EMS gathers emergency data through an autonomous communication session facilitated by the emergency assistant application. In some embodiments, the EMS gathers emergency data through sensors housed within the device.

Another advantage provided by the systems, servers, devices, methods, and media of the instant application is the ability to automatically coordinate ESPs for responding to emergencies. Different emergencies require different forms of emergency response, often times based on the nature of the emergency (e.g., fire or medical) and the severity of the emergency. In some embodiments, when a person generates an emergency alert for an emergency (such as by dialing 9-1-1 on a mobile phone in the United States) using a smartphone or other IoT device, an emergency management system (EMS) gathers emergency data, determines a nature of the emergency, determines a severity of the emergency, and, based on the nature and severity of the emergency, generates a dispatch recommendation suggesting the recommended form of emergency response for the emergency. In some embodiments, the EMS gathers emergency data through sensors housed within the device or other devices associated with the emergency.

In another aspect, disclosed herein is a method for facilitating emergency communications by an emergency management system, the method comprising: a) identifying a user at risk of an emergency; b) presenting an emergency response prompt at a communication device associated with the user; c) receiving confirmation of the emergency; d) in response to receiving confirmation of the emergency, initiating an autonomous communication session with the user through the communication device; e) extracting emergency information from the autonomous communication session; and f) transmitting the emergency information to an emergency service provider (ESP). In some embodiments, initiating the autonomous communication session comprises transmitting one or more messages comprising emergency response questions to the communication device according to a predetermined script. In some embodiments, the method further comprises adapting the predetermined script during the autonomous communication session according to one or more responses from the user. In some embodiments, the emergency information extracted from the autonomous communication session comprises answers received from the user in response to the emergency response questions. In some embodiments, the emergency information comprises content from one or more messages received from the user through the autonomous communication session. In some embodiments, a) the emergency response prompt comprises a first SMS text message; and b) confirmation of the emergency comprises a second SMS text message received from the user in response to the first SMS text message. In some embodiments, a) the emergency response prompt comprises a push notification; and b) confirmation of the emergency comprises selection of the push notification. In some embodiments, a) the communication device is an internet of things (IoT) device comprising a microphone and a speaker; and b) the autonomous communication session is an audio session conducted through the microphone and speaker of the IoT device. In some embodiments, initiating the autonomous communication session with the user through the communication device comprises launching a mobile application on the communication device, wherein the mobile application comprises a graphical user interface configured to facilitate the autonomous communication session. In some embodiments, the graphical user interface comprises two or more soft buttons for the user to submit responses to at least one of multiple choice or yes or no questions during the autonomous communication session. In some embodiments, the method further comprises: a) obtaining a location of the communication device; and b) determining an appropriate ESP to receive the emergency information based on the location of the communication device. In some embodiments, the emergency information comprises a photo or video received from the communication device during the autonomous communication session. In some embodiments, the method further comprises displaying the emergency information through a graphical user interface (GUI) of an emergency response application executed on a computing device at the ESP. In some embodiments, identifying the user at risk of the emergency comprises detecting an emergency alert generated by the communication device. In some embodiments, identifying the user at risk of the emergency comprises detecting an emergency alert generated by an electronic device associated with the user and distinct from the communication device. In some embodiments, the electronic device is an Internet of Things (IoT) device, a wearable device, or a security monitoring device. In some embodiments, identifying the user at risk of the emergency comprises detecting an emergency response anomaly associated with an emergency alert associated with the user. In some embodiments, identifying the user at risk of the emergency comprises: a) detecting a negative status of an emergency alert associated with the emergency; b) presenting an option to initiate an autonomous communication session for the emergency alert within a graphical user interface (GUI) of an emergency response application; and c) detecting selection of the option to initiate an autonomous communication session for the emergency alert. In some embodiments, the emergency management system is further configured to determine a priority level of the emergency. In some embodiments, the priority level of the emergency is provided to the ESP, wherein the priority level is optionally used by the ESP to position an emergency communication corresponding to the emergency in a queue of emergencies based on priority level. In some embodiments, the method further comprises providing emergency assistance to the user, wherein the emergency assistance comprises instructions for responding to the emergency based at least on the emergency information. In some embodiments, the instructions for responding to the emergency is based at least on an emergency type or a severity of the emergency. In some embodiments, the emergency information comprises an injury, property damage, environmental danger, risk of violence, or any combination thereof. In some embodiments, the environmental danger comprises a gas leak or fire. In some embodiments, the instructions for responding to the emergency comprises first aid, evacuation procedures, hazard identification, safety or emergency equipment protocol, or any combination thereof.

In another aspect, disclosed herein is a method for facilitating emergency communications by an emergency management system, the method comprising: a) detecting an indication of an emergency; b) presenting an emergency response prompt at a communication device; c) receiving confirmation of the emergency; d) in response to receiving confirmation of the emergency, initiating an autonomous communication session with the communication device; e) extracting emergency information from the autonomous communication session; and f) transmitting the emergency information to an emergency service provider (ESP).

In another aspect, disclosed herein is a system comprising: a) a network server comprising at least one processor; and b) an emergency management system executed on the at least one processor and configured to: i) identify a user at risk of an emergency; ii) present an emergency response prompt at a communication device associated with the user; iii) receive confirmation of the emergency); in response to receiving confirmation of the emergency, initiate an autonomous communication session with the user through the communication device; e) extract emergency information from the autonomous communication session; and f) transmit the emergency information to an emergency service provider (ESP). In some embodiments, the emergency management system is configured to initiate the autonomous communication session by transmitting one or more messages comprising emergency response questions to the communication device according to a predetermined script. In some embodiments, the emergency communication system is further configured to adapt the predetermined script during the autonomous communication session according to one or more responses from the user. In some embodiments, the emergency information extracted from the autonomous communication session comprises answers received from the user in response to the emergency response questions. In some embodiments, the emergency information comprises content from one or more messages received from the user through the autonomous communication session. In some embodiments, a) the emergency response prompt comprises a first SMS text message; and b) confirmation of the emergency comprises a second SMS text message received from the user in response to the first SMS text message. In some embodiments, a) the emergency response prompt comprises a push notification; and b) confirmation of the emergency comprises selection of the push notification. In some embodiments, a) the communication device is an internet of things (IoT) device comprising a microphone and a speaker; and b) the autonomous communication session is an audio session conducted through the microphone and speaker of the IoT device. In some embodiments, the emergency management system is configured to initiate the autonomous communication session with the user through the communication device by launching a mobile application on the communication device, wherein the mobile application comprises a graphical user interface configured to facilitate the autonomous communication session. In some embodiments, the graphical user interface comprises two or more soft buttons for the user to submit responses to at least one of multiple choice or yes or no questions during the autonomous communication session. In some embodiments, the emergency management system is configured to: a) obtain a location of the communication device; and b) determine an appropriate ESP to receive the emergency information based on the location of the communication device. In some embodiments, the emergency information comprises a photo or video received from the communication device during the autonomous communication session. In some embodiments, the emergency management system is further configured to display the emergency information through a graphical user interface (GUI) of an emergency response application executed on a computing device at the ESP. In some embodiments, the emergency management system is configured to identify the user at risk of the emergency by detecting an emergency alert generated by the communication device. In some embodiments, the emergency management system is configured to identify the user at risk of the emergency by detecting an emergency alert generated by an electronic device associated with the user and distinct from the communication device. In some embodiments, the electronic device is an Internet of Things (IoT) device, a wearable device, or a security monitoring device. In some embodiments, the emergency management system is configured to identify the user at risk of the emergency by detecting an emergency response anomaly associated with an emergency alert associated with the user. In some embodiments, the emergency management system is configured to identify the user at risk of the emergency by: a) detecting a negative status of an emergency alert associated with the emergency; b) presenting an option to initiate an autonomous communication session for the emergency alert within a graphical user interface (GUI) of an emergency response application; and c) detecting selection of the option to initiate an autonomous communication session for the emergency alert. In some embodiments, the emergency management system is further configured to determine a priority level of the emergency. In some embodiments, the priority level of the emergency is provided to the ESP, wherein the priority level is optionally used by the ESP to position an emergency communication corresponding to the emergency in a queue of emergencies based on priority level. In some embodiments, the emergency management system is further configured to provide emergency assistance to the user, wherein the emergency assistance comprises instructions for responding to the emergency based at least on the emergency information. In some embodiments, the instructions for responding to the emergency is based at least on an emergency type or a severity of the emergency. In some embodiments, the emergency information comprises an injury, property damage, environmental danger, risk of violence, or any combination thereof. In some embodiments, the environmental danger comprises a gas leak or fire. In some embodiments, the instructions for responding to the emergency comprises first aid, evacuation procedures, hazard identification, safety or emergency equipment protocol, or any combination thereof.

In another aspect, disclosed herein is a system comprising: a) a network server comprising at least one processor; and b) an emergency management system executed on the at least one processor and configured to: i) detect an indication of an emergency; ii) present an emergency response prompt at a communication device; iii) receive confirmation of the emergency); in response to receiving confirmation of the emergency, initiate an autonomous communication session with the communication device; e) extract emergency information from the autonomous communication session; and f) transmit the emergency information to an emergency service provider (ESP).

In one aspect, disclosed herein is a method for facilitating emergency communications by an emergency management system, the method comprising: a) identifying a user potentially affected by an emergency; b) providing an emergency response message to a communication device associated with the user; c) receiving confirmation of the emergency; d) in response to receiving confirmation of the emergency, initiating an autonomous communication session with the user through the communication device; e) extracting emergency information from the autonomous communication session; and f) providing the emergency information to an emergency service provider (ESP). In some embodiments, the emergency information comprises content from one or more messages received from the user through the autonomous communication session. In some embodiments, initiating the autonomous communication session comprises providing one or more messages comprising emergency response questions to the communication device according to a predetermined script. In some embodiments, the method further comprises adapting the predetermined script during the autonomous communication session according to one or more responses from the user. In some embodiments, the predetermined script is adapted according to a decision tree. In some embodiments, the emergency information from the autonomous communication session comprises answers received from the user in response to the emergency response questions. In some embodiments: a) the emergency response message comprises a first SMS text message; and b) confirmation of the emergency comprises a second SMS text message received from the user in response to the first SMS text message. In some embodiments: a) the communication device is an internet of things (IoT) device comprising a microphone and a speaker; and b) the autonomous communication session is an audio session conducted through the microphone and speaker of the IoT device. In some embodiments, identifying the user potentially affected by the emergency comprises detecting an emergency alert generated by the communication device. In some embodiments, identifying the user potentially affected by the emergency comprises detecting an emergency alert generated by an electronic device associated with the user. In some embodiments, the electronic device is an Internet of Things (IoT) device, a wearable device, a sensor, or a security monitoring device. In some embodiments, the electronic device is determined to be associated with the user by querying a database with identifying information for the electronic device, wherein the database is configured to store user profiles linked to associated electronic devices. In some embodiments, identifying the user potentially affected by the emergency comprises detecting an emergency alert generated by an electronic device communicatively coupled to the communication device. In some embodiments, identifying the user potentially affected by the emergency comprises: a) detecting an emergency call made from the communication device to the ESP; and b) determining that the ESP is unable to respond to the emergency call, wherein the emergency response message is transmitted to the communication device in response to determining that the ESP is unable to respond to the emergency call. In some embodiments, identifying the user potentially affected by the emergency comprises detecting a message indicative of a potential emergency sent from the communication device. In some embodiments, the message indicative of a potential emergency is an SMS message sent from the communication device to the ESP. In some embodiments, initiating the autonomous communication session with the user through the communication device comprises launching a mobile application on the communication device, wherein the mobile application comprises a graphical user interface configured to facilitate the autonomous communication session. In some embodiments, the graphical user interface comprises two or more soft buttons for the user to submit responses to at least one of multiple choice or yes or no questions during the autonomous communication session. In some embodiments, the graphical user interface comprises a text entry field for the user to submit free response responses to questions during the autonomous communication session. In some embodiments, the method further comprises extracting emergency information from the autonomous communication session by parsing free response responses submitted by the user during the autonomous communication session. In some embodiments, identifying the user potentially affected by the emergency comprises: a) identifying the emergency as a group emergency affecting a plurality of people; b) determining an affected area for the emergency; c) receiving a location from the communication device; d) confirming that the location is within the affected area; and e) providing the emergency response message to the communication device in response to confirming that the location is within the affected area. In some embodiments, the group emergency is a state of emergency declared by a government official. In some embodiments, the method further comprises detecting one or more social media posts indicative of the emergency; and b) wherein the user potentially affected by the emergency is identified based on the one or more social media posts. In some embodiments, the one or more social media posts are posted by the user potentially affected by the emergency. In some embodiments, the one or more social media posts are posted by a third party who is not the user potentially affected by the emergency. In some embodiments, the method further comprises a) generating an emergency vicinity for the emergency based on the one or more social media posts; and b) wherein the user potentially affected by the emergency is identified as potentially within the emergency vicinity. In some embodiments, the method further comprises: a) receiving a location from the communication device; b) confirming that the location is within the emergency vicinity; and c) providing the emergency response message to the communication device in response to confirming that the location is within the emergency vicinity. In some embodiments: a) the emergency response message comprises a push notification; and b) confirmation of the emergency comprises selection of the push notification. In some embodiments, initiating the autonomous communication session with the user further comprises providing one or more SMS text messages to the communication device. In some embodiments, the one or more SMS text messages comprise yes or no questions.

In another aspect, disclosed herein is a method for facilitating emergency communications by an emergency management system, the method comprising: a) detecting an emergency response anomaly associated with an identifier of a communication device; b) in response to detecting the emergency response anomaly, initiating an autonomous communication session with the communication device; c) extracting emergency information from the autonomous communication session; and d) providing the emergency information to an emergency service provider (ESP). In some embodiments, detecting the emergency response anomaly regarding the identifier of the communication device comprises: a) detecting an emergency call made to the ESP; and b) detecting a failure of the emergency call. In some embodiments, detecting the emergency response anomaly associated with the identifier of the communication device comprises: a) receiving, from the communication device, an emergency alert comprising the identifier of the communication device; b) determining if a request for emergency information comprising the identifier of the communication device is received from the ESP within a predetermined period of time; and c) detecting the emergency response anomaly in response to determining that the request for emergency information comprising the identifier of the communication device is not received from the ESP within the predetermined period of time. In some embodiments, detecting the emergency response anomaly associated with the identifier of the communication device comprises: a) receiving, from the communication device, an emergency alert comprising the identifier of the communication device and a location of the communication device; b) determining one or more ESPs appropriate for responding to the emergency alert based on the location of the communication device, wherein the one or more ESPs comprises the ESP; c) determining if a request for emergency information comprising the identifier of the communication device is received from any of the other or more ESPs within a predetermined period of time; and d) detecting the emergency response anomaly in response to determining that the request for emergency information comprising the identifier of the communication device is not received from any of the one or more ESPs within the predetermined period of time. In some embodiments, detecting the emergency response anomaly associated with the identifier of the communication device comprises: a) detecting an emergency call made from the communication device to the ESP; and b) detecting that the ESP is unable to respond to the emergency call.

In another aspect, disclosed herein is a method for facilitating emergency communications, the method comprising: a) determining a user is at risk of an emergency; b) initiating an autonomous communication session with a communication device associated with the user; c) extracting emergency information from the autonomous communication session; and d) providing the emergency information to an emergency service provider (ESP).

In another aspect, disclosed herein is a system for facilitating emergency communications, the system comprising: a) a communication device associated with a user; b) a network server comprising at least one processor; and c) an emergency management system executed on the at least one processor and configured to: i) identify a user potentially affected by an emergency; ii) transmit an emergency response message to the communication device associated with the user; iii) receive confirmation of the emergency; iv) in response to receiving confirmation of the emergency, initiate an autonomous communication session with the user through the communication device; v) extract emergency information from the autonomous communication session; and vi) transmit the emergency information to an emergency service provider (ESP). In some embodiments, the emergency information comprises content from one or more messages received from the user through the autonomous communication session. In some embodiments, the emergency management system is further configured to initiate the autonomous communication session by providing one or more messages comprising emergency response questions to the communication device according to a predetermined script. In some embodiments, the emergency management system is further configured to adapt the predetermined script during the autonomous communication session according one or more responses from the user. In some embodiments, the predetermined script is adapted according to a decision tree. In some embodiments, the emergency information from the autonomous communication session comprises answers received from the user in response to the emergency response questions. In some embodiments: a) the emergency response message comprises a first SMS text message; and b) confirmation of the emergency comprises a second SMS text message received from the user in response to the first SMS text message. In some embodiments: a) the communication device is an internet of things (IoT) device comprising a microphone and a speaker; and b) the autonomous communication session is an audio session conducted through the microphone and speaker of the IoT device. In some embodiments, the emergency management system is further configured to identify the user potentially affected by the emergency by detecting an emergency alert generated by the communication device. In some embodiments, the emergency management system is further configured to identify the user potentially affected by the emergency by detecting an emergency alert generated by an electronic device associated with the user. In some embodiments, the electronic device is an Internet of Things (IoT) device, a wearable device, a sensor, or a security monitoring device. In some embodiments, the electronic device is determined to be associated with the user by querying a database with identifying information for the electronic device, wherein the database is configured to store user profiles linked to associated electronic devices. In some embodiments, the emergency management system is further configured to identify the user potentially affected by the emergency by detecting an emergency alert generated by an electronic device communicatively coupled to the communication device. In some embodiments, the emergency management system is further configured to identify the user potentially affected by the emergency by: a) detecting an emergency call made from the communication device to the ESP; and b) determining that the ESP is unable to respond to the emergency call, wherein the emergency response message is transmitted to the communication device in response to determining that the ESP is unable to respond to the emergency call. In some embodiments, the emergency management system is further configured to identify the user potentially affected by the emergency by detecting a message indicative of a potential emergency sent from the communication device. In some embodiments, the message indicative of a potential emergency is an SMS message sent from the communication device to the ESP. In some embodiments, the emergency management system is further configured to initiate the autonomous communication session with the user through the communication device by launching a mobile application on the communication device, wherein the mobile application comprises a graphical user interface configured to facilitate the autonomous communication session. In some embodiments, the graphical user interface comprises two or more soft buttons for the user to submit responses to at least one of multiple choice or yes or no questions during the autonomous communication session. In some embodiments, the graphical user interface comprises a text entry field for the user to submit free response responses to questions during the autonomous communication session. In some embodiments, the emergency management system is further configured to extract emergency information from the autonomous communication session by parsing free response responses submitted by the user during the autonomous communication session. In some embodiments, the emergency management system is further configured to identify the user potentially affected by the emergency by: a) identifying the emergency as a group emergency affecting a plurality of people; b) determining an affected area for the emergency; c) receiving a location from the communication device; d) confirming that the location is within the affected area; and e) providing the emergency response message to the communication device in response to confirming that the location is within the affected area. In some embodiments, the group emergency is a state of emergency declared by a government official. In some embodiments, the emergency management system is further configured to detect one or more social media posts indicative of the emergency; and b) wherein the user potentially affected by the emergency is identified based on the one or more social media posts. In some embodiments, the one or more social media posts are posted by the user potentially affected by the emergency. In some embodiments, the one or more social media posts are posted by a third party who is not the user potentially affected by the emergency. In some embodiments: a) the emergency management system is further configured to generate an emergency vicinity for the emergency based on the one or more social media posts; and b) the user potentially affected by the emergency is identified as potentially within the emergency vicinity. In some embodiments, the emergency management system is further configured to: a) receive a location from the communication device; b) confirm that the location is within the emergency vicinity; and c) transmit the emergency response message to the communication device in response to confirming that the location is within the emergency vicinity. In some embodiments: a) the emergency response message comprises a push notification; and b) confirmation of the emergency comprises selection of the push notification. In some embodiments, the emergency management system is further configured to initiate the autonomous communication session with the user by providing one or more SMS text messages to the communication device. In some embodiments, the one or more SMS text messages comprise yes or no questions.

In another aspect, disclosed herein is a system for facilitating emergency communications, the system comprising: a) a communication device associated with a user; b) a network server comprising at least one processor; and c) an emergency management system executed on the at least one processor and configured to: i) detect an emergency response anomaly associated with an identifier of a communication device; ii) in response to detecting the emergency response anomaly, initiating an autonomous communication session with the communication device; iii) extract emergency information from the autonomous communication session; and iv) transmit the emergency information to an emergency service provider (ESP). In some embodiments, the emergency management system is further configured to detect the emergency response anomaly regarding the identifier of the communication device by: a) detecting an emergency call made to the ESP; and b) detecting a failure of the emergency call. In some embodiments, the emergency management system is further configured to detect the emergency response anomaly regarding the identifier of the communication device by: a) receiving, from the communication device, an emergency alert comprising the identifier of the communication device; b) determining if a request for emergency information comprising the identifier of the communication device is received from the ESP within a predetermined period of time; and c) detecting the emergency response anomaly in response to determining that the request for emergency information comprising the identifier of the communication device is not received from the ESP within the predetermined period of time. In some embodiments, the emergency management system is further configured to detect the emergency response anomaly regarding the identifier of the communication device by: a) receiving, from the communication device, an emergency alert comprising the identifier of the communication device and a location of the communication device; b) determining one or more ESPs appropriate for responding to the emergency alert based on the location of the communication device, wherein the one or more ESPs comprises the ESP; c) determining if a request for emergency information comprising the identifier of the communication device is received from any of the other or more ESPs within a predetermined period of time; and d) detecting the emergency response anomaly in response to determining that the request for emergency information comprising the identifier of the communication device is not received from any of the one or more ESPs within the predetermined period of time. In some embodiments, the emergency management system is further configured to detect the emergency response anomaly regarding the identifier of the communication device by: a) detecting an emergency call made from the communication device to the ESP; and b) detecting that the ESP is unable to respond to the emergency call.

In another aspect, disclosed herein is a system for facilitating emergency communications, the system comprising: a) a communication device associated with a user; b) a network server comprising at least one processor; and c) an emergency management system executed on the at least one processor and configured to: i) determine a user is at risk of an emergency; ii) initiate an autonomous communication session with a communication device associated with the user; iii) extract emergency information from the autonomous communication session; and iv) transmit the emergency information to an emergency service provider (ESP).

In another aspect, disclosed herein is non-transitory computer readable storage media encoded with at least one computer program including instructions executable by at least one processor to perform steps comprising: a) identifying a user potentially affected by an emergency; b) providing an emergency response message to a communication device associated with the user; c) receiving confirmation of the emergency; d) in response to receiving confirmation of the emergency, initiating an autonomous communication session with the user through the communication device; e) extracting emergency information from the autonomous communication session; and f) providing the emergency information to an emergency service provider (ESP). In some embodiments, the emergency information comprises content from one or more messages received from the user through the autonomous communication session. In some embodiments, initiating the autonomous communication session comprises providing one or more messages comprising emergency response questions to the communication device according to a predetermined script. In some embodiments, the steps further comprise adapting the predetermined script during the autonomous communication session according to one or more responses from the user. In some embodiments, the predetermined script is adapted according to a decision tree. In some embodiments, the emergency information from the autonomous communication session comprises answers received from the user in response to the emergency response questions. In some embodiments: a) the emergency response message comprises a first SMS text message; and b) confirmation of the emergency comprises a second SMS text message received from the user in response to the first SMS text message. In some embodiments: a) the communication device is an internet of things (IoT) device comprising a microphone and a speaker; and b) the autonomous communication session is an audio session conducted through the microphone and speaker of the IoT device. In some embodiments, identifying the user potentially affected by the emergency comprises detecting an emergency alert generated by the communication device. In some embodiments, identifying the user potentially affected by the emergency comprises detecting an emergency alert generated by an electronic device associated with the user. In some embodiments, the electronic device is an Internet of Things (IoT) device, a wearable device, a sensor, or a security monitoring device. In some embodiments, the electronic device is determined to be associated with the user by querying a database with identifying information for the electronic device, wherein the database is configured to store user profiles linked to associated electronic devices. In some embodiments, identifying the user potentially affected by the emergency comprises detecting an emergency alert generated by an electronic device communicatively coupled to the communication device. In some embodiments, identifying the user potentially affected by the emergency comprises: a) detecting an emergency call made from the communication device to the ESP; and b) determining that the ESP is unable to respond to the emergency call, wherein the emergency response message is transmitted to the communication device in response to determining that the ESP is unable to respond to the emergency call. In some embodiments, identifying the user potentially affected by the emergency comprises detecting a message indicative of a potential emergency sent from the communication device. In some embodiments, the message indicative of a potential emergency is an SMS message sent from the communication device to the ESP. In some embodiments, initiating the autonomous communication session with the user through the communication device comprises launching a mobile application on the communication device, wherein the mobile application comprises a graphical user interface configured to facilitate the autonomous communication session. In some embodiments, the graphical user interface comprises two or more soft buttons for the user to submit responses to at least one of multiple choice or yes or no questions during the autonomous communication session. In some embodiments, the graphical user interface comprises a text entry field for the user to submit free response responses to questions during the autonomous communication session. In some embodiments, the steps further comprise extracting emergency information from the autonomous communication session by parsing free response responses submitted by the user during the autonomous communication session. In some embodiments, identifying the user potentially affected by the emergency comprises: a) identifying the emergency as a group emergency affecting a plurality of people; b) determining an affected area for the emergency; c) receiving a location from the communication device; d) confirming that the location is within the affected area; and e) providing the emergency response message to the communication device in response to confirming that the location is within the affected area. In some embodiments, the group emergency is a state of emergency declared by a government official. In some embodiments, the steps further comprise a) detecting one or more social media posts indicative of the emergency; and b) wherein the user potentially affected by the emergency is identified based on the one or more social media posts. In some embodiments, the one or more social media posts are posted by the user potentially affected by the emergency. In some embodiments, the one or more social media posts are posted by a third party who is not the user potentially affected by the emergency. In some embodiments, the steps further comprise a) generating an emergency vicinity for the emergency based on the one or more social media posts; and b) wherein the user potentially affected by the emergency is identified as potentially within the emergency vicinity. In some embodiments, the steps further comprise: a) receiving a location from the communication device; b) confirming that the location is within the emergency vicinity; and c) providing the emergency response message to the communication device in response to confirming that the location is within the emergency vicinity. In some embodiments: a) the emergency response message comprises a push notification; and b) confirmation of the emergency comprises selection of the push notification. In some embodiments, initiating the autonomous communication session with the user further comprises providing one or more SMS text messages to the communication device. In some embodiments, the one or more SMS text messages comprise yes or no questions.

In another aspect, disclosed herein is non-transitory computer readable storage media encoded with at least one computer program including instructions executable by at least one processor to perform steps comprising: a) detecting an emergency response anomaly associated with an identifier of a communication device; b) in response to detecting the emergency response anomaly, initiating an autonomous communication session with the communication device; c) extracting emergency information from the autonomous communication session; and d) providing the emergency information to an emergency service provider (ESP). In some embodiments, detecting the emergency response anomaly regarding the identifier of the communication device comprises: a) detecting an emergency call made to the ESP; and b) detecting a failure of the emergency call. In some embodiments, detecting the emergency response anomaly associated with the identifier of the communication device comprises: a) receiving, from the communication device, an emergency alert comprising the identifier of the communication device; b) determining if a request for emergency information comprising the identifier of the communication device is received from the ESP within a predetermined period of time; and c) detecting the emergency response anomaly in response to determining that the request for emergency information comprising the identifier of the communication device is not received from the ESP within the predetermined period of time. In some embodiments, detecting the emergency response anomaly associated with the identifier of the communication device comprises: a) receiving, from the communication device, an emergency alert comprising the identifier of the communication device and a location of the communication device; b) determining one or more ESPs appropriate for responding to the emergency alert based on the location of the communication device, wherein the one or more ESPs comprises the ESP; c) determining if a request for emergency information comprising the identifier of the communication device is received from any of the other or more ESPs within a predetermined period of time; and d) detecting the emergency response anomaly in response to determining that the request for emergency information comprising the identifier of the communication device is not received from any of the one or more ESPs within the predetermined period of time. In some embodiments, detecting the emergency response anomaly associated with the identifier of the communication device comprises: a) detecting an emergency call made from the communication device to the ESP; and b) detecting that the ESP is unable to respond to the emergency call.

In another aspect, disclosed herein is non-transitory computer readable storage media encoded with at least one computer program including instructions executable by at least one processor to perform steps comprising: a) determining a user is at risk of an emergency; b) initiating an autonomous communication session with a communication device associated with the user; c) extracting emergency information from the autonomous communication session; and d) providing the emergency information to an emergency service provider (ESP).

In another aspect, disclosed herein is a method for providing emergency assistance by an emergency management system, the method comprising: a) detecting an emergency alert associated with an emergency; b) identifying an electronic device associated with the emergency alert; c) providing an emergency assistant application through an interface of the electronic device; d) receiving, from the electronic device, emergency information obtained through the interface of the electronic device; e) based at least in part on the emergency information received from the electronic device, determining an emergency category for the emergency; f) based at least on the emergency category, retrieving a safety recommendation from a safety recommendation database; and g) delivering the safety recommendation to the electronic device to be presented through the interface. In some embodiments, the safety recommendation is delivered through the interface of the electronic device as text. In some embodiments, the safety recommendation is delivered through the interface of the electronic device as audio. In some embodiments, the audio is a text-to-speech conversion of a text file. In some embodiments, the safety recommendation comprises a video. In some embodiments, the electronic device is one of a smartphone, a wearable device, an IoT device, or a vehicle. In some embodiments: a) the electronic device is a communication device; and b) providing the emergency assistant through the interface of the electronic device further comprises: i) providing an emergency response message to the communication device; ii) receiving confirmation of the emergency; and iii) in response to receiving confirmation of the emergency, initiating an autonomous communication session with the user through the communication device. In some embodiments: a) the emergency response message comprises a first SMS text message; and b) confirmation of the emergency comprises a second SMS text message received from the user in response to the first SMS text message. In some embodiments, initiating the autonomous communication session with the user further comprises providing one or more SMS text messages to the communication device. In some embodiments, delivering the safety recommendation through the interface of the electronic device further comprises providing an SMS text message comprising the safety recommendation to the communication device. In some embodiments, receiving emergency information obtained through the interface of the electronic device further comprises receiving one or more SMS text messages from the communication device and extracting the emergency information from the one or more SMS text messages. In some embodiments: a) the emergency response message comprises a push notification; and b) confirmation of the emergency comprises selection of the push notification. In some embodiments, initiating the autonomous communication session with the user further comprises launching a mobile application on the communication device. In some embodiments, the mobile application comprises a graphical user interface through which the autonomous communication session is held. In some embodiments, the graphical user interface comprises one or more soft buttons or text entry fields for the user to respond to questions posed through the emergency assistant application during the autonomous communication session. In some embodiments, receiving the emergency information obtained through the interface of the electronic device comprises receiving responses to questions posed through the emergency assistant application during the autonomous communication session. In some embodiments, the safety recommendation delivered to the communication device is displayed through the graphical user interface. In some embodiments: a) the electronic device is an internet-of-things (IoT) device comprising a microphone and a speaker; and b) providing the emergency assistant application through the interface of the electronic device comprises: i) providing an emergency response message to the IoT device; ii) audibly playing the emergency response message through the speaker; iii) receiving verbal confirmation of the emergency through the microphone; iv) in response to receiving verbal confirmation of the emergency, initiating an autonomous communication session with a user of the IoT device, wherein the autonomous communication session is held using the speaker and microphone. In some embodiments, initiating the autonomous communication session with the user further comprises audibly playing one or more audio messages through the speaker. In some embodiments, delivering the safety recommendation to the electronic device further comprises audibly playing the safety recommendation through the speaker. In some embodiments, receiving emergency information comprises receiving, from the user, verbal responses to questions posed through the emergency assistant application during the autonomous communication session through the microphone. In some embodiments: a) the electronic device is a wearable device; and b) providing the emergency assistant application through the interface of the electronic device further comprises: i) providing an emergency response message to the wearable device; ii) receiving confirmation of the emergency; and iii) in response to receiving confirmation of the emergency, initiating an autonomous communication session with a user of the wearable device. In some embodiments: a) the wearable device comprises a microphone and a speaker; b) providing the emergency response message to the wearable device further comprises audibly playing the emergency response message through the speaker; and c) wherein receiving confirmation of the emergency further comprises receiving verbal confirmation of the emergency through the microphone. In some embodiments, initiating the autonomous communication session with the user further comprises audibly playing one or more audio messages through the speaker. In some embodiments, delivering the safety recommendation to the electronic device further comprises audibly playing the safety recommendation through the speaker. In some embodiments: a) the emergency response message comprises a push notification; and b) confirmation of the emergency comprises selection of the push notification. In some embodiments, initiating the autonomous communication session with the user further comprises launching a mobile application on the wearable device. In some embodiments, the mobile application comprises a graphical user interface through which the autonomous communication session is held. In some embodiments, the graphical user interface comprises one or more soft buttons for the user to respond to questions during the autonomous communication session. In some embodiments, receiving emergency information from the electronic device comprises receiving, from the user, responses to questions posed through the emergency assistant application during the autonomous communication session. In some embodiments, the safety recommendation is delivered to the electronic device through the graphical user interface of the mobile application on the wearable device. In some embodiments: a) the electronic device is communicatively coupled to a headset; b) the headset comprises a microphone and a speaker; and c) providing the emergency assistant application through the interface of the electronic device further comprises: i) providing an emergency response message to the electronic device; ii) audibly playing the emergency response message through the speaker; iii) receiving verbal confirmation of the emergency through the microphone; iv) in response to receiving confirmation of the emergency, initiating an autonomous communication session with a user of the electronic device. In some embodiments, initiating the autonomous communication session further comprises audibly playing one or more audio messages through the speaker. In some embodiments, receiving emergency information from the electronic device further comprises receiving, from the user, verbal responses to questions posed through the emergency assistant application during the autonomous communication session through the microphone. In some embodiments, delivering the safety recommendation to the electronic device further comprises audibly playing the safety recommendation through the speaker. In some embodiments, the electronic device is a communication device. In some embodiments, the electronic device is a wearable device. In some embodiments, the method further comprises: a) determining a nature of the emergency; and b) wherein determining the emergency category is based at least in part on the emergency information received through the interface of the electronic device and at least in part on the nature of the emergency. In some embodiments, the nature of the emergency is one of medical, fire, or police. In some embodiments, the emergency alert comprises the nature of the emergency. In some embodiments, the method further comprises: a) gathering emergency data; and b) wherein the nature of the emergency is determined using the emergency data. In some embodiments, the emergency data comprises at least one of sensor data, environmental data, health data, or medical history. In some embodiments, the emergency data is gathered from sensors integrated into the electronic device. In some embodiments, the emergency data is gathered from an emergency data database. In some embodiments, the emergency data is gathered from a second electronic device associated with a user of the electronic device. In some embodiments, the emergency data is gathered from a second electronic device communicatively coupled to the electronic device. In some embodiments, the second electronic device is one of a smartphone, a wearable device, an IoT device, or a vehicle. In some embodiments, the method further comprises: a) accessing a decision tree for safety recommendations; and b) stepping through the decision tree using the emergency information received through the interface of the electronic device to determine the emergency category. In some embodiments, the method further comprises a) determining a nature of the emergency; and b) wherein the decision tree is accessed based on the nature of the emergency. In some embodiments, each step of the decision tree points to a corresponding safety recommendation within the safety recommendation database. In some embodiments, the method further comprises: a) initiating an autonomous communication session with a user of the electronic device; b) posing questions to the user through the emergency assistant application; c) wherein receiving the emergency information from the electronic device further comprises receiving responses to the questions posed through the emergency assistant application during the autonomous communication session; and d) wherein each response received from the user during the autonomous communication session moves the emergency management system one step forward on the decision tree. In some embodiments, the questions posed through the emergency assistant application are limited to a predetermined number of questions. In some embodiments, the predetermined number of questions is two. In some embodiments, one of the questions posed to the user through the emergency assistant application prompts the user to identify an afflicted body part. In some embodiments, the method further comprises receiving a verbal response from the user identifying the afflicted body part. In some embodiments, the method further comprises: a) providing a virtual body diagram through the interface of the electronic device; and b) receiving a response identifying the afflicted body part, from the user, through the virtual body diagram provided through the interface of the electronic device.

In another aspect, disclosed herein is a system for providing emergency assistance by an emergency management system, the system comprising: a) an electronic device; b) a network server comprising at least one processor; and c) an emergency management system executed on the at least one processor and configured to: i) detect an emergency alert associated with an emergency; ii) identify the electronic device as associated with the emergency alert; iii) provide an emergency assistant application through an interface of the electronic device; iv) receive, from the electronic device, emergency information obtained through the interface of the electronic device; v) based at least in part on the emergency information from the electronic device, determine an emergency category for the emergency; vi) based at least on the emergency category, retrieve a safety recommendation from a safety recommendation database; and vii) deliver the safety recommendation to the electronic device to be presented through the interface. In some embodiments, the emergency management system is configured to deliver the safety recommendation to the electronic device as text. In some embodiments, the emergency management system is configured to deliver the safety recommendation to the electronic device as audio. In some embodiments, the audio is a text-to-speech conversion of a text file. In some embodiments, the safety recommendation comprises a video. In some embodiments, the electronic device is one of a smartphone, a wearable device, an IoT device, or a vehicle. In some embodiments: a) the electronic device is a communication device; and b) the emergency management system is further configured to provide the emergency assistant application through the interface of the electronic device by: i) providing an emergency response message to the communication device; ii) receiving confirmation of the emergency; and iii) in response to receiving confirmation of the emergency, initiating an autonomous communication session with the user through the communication device. In some embodiments: a) the emergency response message comprises a first SMS text message; and b) confirmation of the emergency comprises a second SMS text message received from the user in response to the first SMS text message. In some embodiments, the emergency management system is further configured to initiate the autonomous communication session with the user by providing one or more SMS text messages to the communication device. In some embodiments, the emergency management system is further configured to deliver the safety recommendation through the interface of the electronic device by providing an SMS text message comprising the safety recommendation to the communication device. In some embodiments, the emergency management system is further configured to receive emergency information obtained through the interface of the electronic device by receiving one or more SMS text messages from the communication device and extracting the emergency information from the one or more SMS text messages. In some embodiments: a) the emergency response message comprises a push notification; and b) confirmation of the emergency comprises selection of the push notification. In some embodiments, the emergency management system is further configured to initiate the autonomous communication session with the user by launching a mobile application on the communication device. In some embodiments, the mobile application comprises a graphical user interface through which the autonomous communication session is held. In some embodiments, the graphical user interface comprises one or more soft buttons or text entry fields for the user to respond to questions posed through the emergency assistant application during the autonomous communication session. In some embodiments, the emergency management system is further configured to receive the emergency information obtained through the interface of the electronic device by receiving, from the user, responses to questions posed through the emergency assistant application during the autonomous communication session. In some embodiments, the emergency management system is configured to deliver the safety recommendation to the communication device through the graphical user interface. In some embodiments: a) the electronic device is an internet-of-things (IoT) device comprising a microphone and a speaker; and b) the emergency management system is further configured to provide the emergency assistant application through the interface of the electronic device by: i) providing an emergency response message to the IoT device; ii) audibly playing the emergency response message through the speaker; iii) receiving verbal confirmation of the emergency through the microphone; iv) in response to receiving verbal confirmation of the emergency, initiating an autonomous communication session with a user of the communication, wherein the autonomous communication session is held using the speaker and microphone. In some embodiments, the emergency management system is further configured to initiate the autonomous communication session with the user by audibly playing one or more audio messages through the speaker. In some embodiments, the emergency management system is further configured to deliver the safety recommendation through the interface of the electronic device by audibly playing the safety recommendation through the speaker. In some embodiments, the emergency management system is further configured to receive emergency information obtained through the interface of the electronic device by receiving, from the user, verbal responses to questions posed through the emergency assistant application during the autonomous communication session through the microphone. In some embodiments: a) the electronic device is a wearable device; and b) the emergency management system is further configured to provide the emergency assistant application through the interface of the electronic device by: i) providing an emergency response message to the wearable device; ii) receiving confirmation of the emergency; and iii) in response to receiving confirmation of the emergency, initiating an autonomous communication session with a user of the wearable device. In some embodiments: a) the wearable device comprises a microphone and a speaker; b) the emergency management system is further configured to transmit the emergency response message to the wearable device by audibly playing the emergency response message through the speaker; and c) wherein the emergency management system is further configured to receive confirmation of the emergency by receiving verbal confirmation of the emergency through the microphone. In some embodiments, the emergency management system is further configured to initiate the autonomous communication session with the user by audibly playing one or more audio messages through the speaker. In some embodiments, the emergency management system is further configured to deliver the safety recommendation through the interface of the electronic device by audibly playing the safety recommendation through the speaker. In some embodiments: a) the emergency response message comprises a push notification; and b) confirmation of the emergency comprises selection of the push notification. In some embodiments, the emergency management system is further configured to initiate the autonomous communication session with the user by launching a mobile application on the wearable device. In some embodiments, the mobile application comprises a graphical user interface through which the autonomous communication session is held. In some embodiments, the graphical user interface comprises one or more soft buttons for the user to respond to questions during the autonomous communication session. In some embodiments, the emergency management system is further configured to receive emergency information obtained through the interface of the electronic device by receiving, from the user, responses to questions posed through the emergency assistant application during the autonomous communication session. In some embodiments, the emergency management system is configured to deliver the safety recommendation to the electronic device through the graphical user interface of the mobile application on the wearable device. In some embodiments: a) the electronic device is communicatively coupled to a headset; b) the headset comprises a microphone and a speaker; and c) the emergency management system is further configured to provide the emergency assistant application through the interface of the electronic device by: i) providing an emergency response message to the electronic device; ii) audibly playing the emergency response message through the speaker; iii) receiving verbal confirmation of the emergency through the microphone; iv) in response to receiving confirmation of the emergency, initiating an autonomous communication session with a user of the electronic device. In some embodiments, the emergency management system is further configured to initiate the autonomous communication session by audibly playing one or more audio messages through the speaker. In some embodiments, the emergency management system is further configured to receive emergency information obtained through the interface of the electronic device by receiving, from the user, verbal responses to questions posed through the emergency assistant application during the autonomous communication session through the microphone. In some embodiments, the emergency management system is further configured to deliver the safety recommendation through the interface of the electronic device by audibly playing the safety recommendation through the speaker. In some embodiments, the electronic device is a communication device. In some embodiments, the electronic device is a wearable device. In some embodiments, the emergency management system is further configured to: a) determine a nature of the emergency; and b) determine the emergency category based at least in part on the emergency information received through the interface of the electronic device and at least in part on the nature of the emergency. In some embodiments, the nature of the emergency is one of medical, fire, or police. In some embodiments, the emergency alert comprises the nature of the emergency. In some embodiments, the emergency management system is further configured to: a) gather emergency data; and b) determine the nature of the emergency using the emergency data. In some embodiments, the emergency data comprises at least one of sensor data, environmental data, health data, or medical history. In some embodiments, the emergency management system is configured to gather the emergency data from sensors integrated into the electronic device. In some embodiments, the emergency management system is configured to gather the emergency data from an emergency data database. In some embodiments, the emergency management system is configured to gather the emergency data from a second electronic device associated with a user of the electronic device. In some embodiments, the emergency management system is further configured to gather the emergency data from a second electronic device communicatively coupled to the electronic device. In some embodiments, the second electronic device is one of a smartphone, a wearable device, an IoT device, or a vehicle. In some embodiments, the emergency management system is further configured to: a) access a decision tree for safety recommendations; and b) step through the decision tree using the emergency information received through the interface of the electronic device to determine the emergency category. In some embodiments, the emergency management system is further configured to: a) determine a nature of the emergency; and b) access the decision tree based on the nature of the emergency. In some embodiments, each step of the decision tree points to a corresponding safety recommendation within the safety recommendation database. In some embodiments: a) the emergency management system is further configured to: i) initiate an autonomous communication session with a user of the electronic device; ii) pose questions to the user through the emergency assistant application; iii) receive the emergency information obtained through the interface of the electronic device by receiving responses to the questions posed through the emergency assistant application during the autonomous communication session; and b) wherein each response received from the user during the autonomous communication session moves the emergency management system one step forward on the decision tree. In some embodiments, the emergency management system is further configured to limit the questions posed through the emergency assistant application to a predetermined number of questions. In some embodiments, the predetermined number of questions is two. In some embodiments, one of the questions posed to the user through the emergency assistant application prompts the user to identify an afflicted body part. In some embodiments, the emergency management system is further configured to receive a verbal response from the user identifying the afflicted body part. In some embodiments, the emergency management system is further configured to: a) provide a virtual body diagram through the interface of the electronic device; and b) receive a response, from the user, through the virtual body diagram provided through the interface of the electronic device.

In another aspect, disclosed herein is non-transitory computer readable storage media encoded with at least one computer program including instructions executable by at least one processor to perform steps comprising: a) detecting an emergency alert associated with an emergency; b) identifying an electronic device associated with the emergency alert; c) providing an emergency assistant application through an interface of the electronic device; d) receiving, from the electronic device, emergency information obtained through the interface of the electronic device; e) based at least in part on the emergency information received from the electronic device, determining an emergency category for the emergency; f) based at least on the emergency category, retrieving a safety recommendation from a safety recommendation database; and g) delivering the safety recommendation to the electronic device to be presented through the interface. In some embodiments, the safety recommendation is delivered through the interface of the electronic device as text. In some embodiments, the safety recommendation is delivered through the interface of the electronic device as audio. In some embodiments, the audio is a text-to-speech conversion of a text file. In some embodiments, the safety recommendation comprises a video. In some embodiments, the electronic device is one of a smartphone, a wearable device, an IoT device, or a vehicle. In some embodiments: a) the electronic device is a communication device; and b) providing the emergency assistant through the interface of the electronic device further comprises: i) providing an emergency response message to the communication device; ii) receiving confirmation of the emergency; and iii) in response to receiving confirmation of the emergency, initiating an autonomous communication session with the user through the communication device. In some embodiments: a) the emergency response message comprises a first SMS text message; and b) confirmation of the emergency comprises a second SMS text message received from the user in response to the first SMS text message. In some embodiments, initiating the autonomous communication session with the user further comprises providing one or more SMS text messages to the communication device. In some embodiments, delivering the safety recommendation through the interface of the electronic device further comprises providing an SMS text message comprising the safety recommendation to the communication device. In some embodiments, receiving emergency information obtained through the interface of the electronic device further comprises receiving one or more SMS text messages from the communication device and extracting the emergency information from the one or more SMS text messages. In some embodiments: a) the emergency response message comprises a push notification; and b) confirmation of the emergency comprises selection of the push notification. In some embodiments, initiating the autonomous communication session with the user further comprises launching a mobile application on the communication device. In some embodiments, the mobile application comprises a graphical user interface through which the autonomous communication session is held. In some embodiments, the graphical user interface comprises one or more soft buttons or text entry fields for the user to respond to questions posed through the emergency assistant application during the autonomous communication session. In some embodiments, receiving the emergency information obtained through the interface of the electronic device comprises receiving responses to questions posed through the emergency assistant application during the autonomous communication session. In some embodiments, the safety recommendation delivered to the communication device is displayed through the graphical user interface. In some embodiments: a) the electronic device is an internet-of-things (IoT) device comprising a microphone and a speaker; and b) providing the emergency assistant application through the interface of the electronic device comprises: i) providing an emergency response message to the IoT device; ii) audibly playing the emergency response message through the speaker; iii) receiving verbal confirmation of the emergency through the microphone; iv) in response to receiving verbal confirmation of the emergency, initiating an autonomous communication session with a user of the IoT device, wherein the autonomous communication session is held using the speaker and microphone. In some embodiments, initiating the autonomous communication session with the user further comprises audibly playing one or more audio messages through the speaker. In some embodiments, delivering the safety recommendation to the electronic device further comprises audibly playing the safety recommendation through the speaker. In some embodiments, receiving emergency information comprises receiving, from the user, verbal responses to questions posed through the emergency assistant application during the autonomous communication session through the microphone. In some embodiments: a) the electronic device is a wearable device; and b) providing the emergency assistant application through the interface of the electronic device further comprises: i) providing an emergency response message to the wearable device; ii) receiving confirmation of the emergency; and ii) in response to receiving confirmation of the emergency, initiating an autonomous communication session with a user of the wearable device. In some embodiments, a) the wearable device comprises a microphone and a speaker; b) providing the emergency response message to the wearable device further comprises audibly playing the emergency response message through the speaker; and c) wherein receiving confirmation of the emergency further comprises receiving verbal confirmation of the emergency through the microphone. In some embodiments, initiating the autonomous communication session with the user further comprises audibly playing one or more audio messages through the speaker. In some embodiments, delivering the safety recommendation to the electronic device further comprises audibly playing the safety recommendation through the speaker. In some embodiments: a) the emergency response message comprises a push notification; and b) confirmation of the emergency comprises selection of the push notification. In some embodiments, initiating the autonomous communication session with the user further comprises launching a mobile application on the wearable device. In some embodiments, the mobile application comprises a graphical user interface through which the autonomous communication session is held. In some embodiments, the graphical user interface comprises one or more soft buttons for the user to respond to questions during the autonomous communication session. In some embodiments, receiving emergency information from the electronic device comprises receiving, from the user, responses to questions posed through the emergency assistant application during the autonomous communication session. In some embodiments, the safety recommendation is delivered to the electronic device through the graphical user interface of the mobile application on the wearable device. In some embodiments: a) the electronic device is communicatively coupled to a headset; b) the headset comprises a microphone and a speaker; and c) wherein providing the emergency assistant application through the interface of the electronic device further comprises: i) providing an emergency response message to the electronic device; ii) audibly playing the emergency response message through the speaker; iii) receiving verbal confirmation of the emergency through the microphone; iv) in response to receiving confirmation of the emergency, initiating an autonomous communication session with a user of the electronic device. In some embodiments, initiating the autonomous communication session further comprises audibly playing one or more audio messages through the speaker. In some embodiments, receiving emergency information from the electronic device further comprises receiving, from the user, verbal responses to questions posed through the emergency assistant application during the autonomous communication session through the microphone. In some embodiments, delivering the safety recommendation to the electronic device further comprises audibly playing the safety recommendation through the speaker. In some embodiments, the electronic device is a communication device. In some embodiments, the electronic device is a wearable device. In some embodiments, the steps further comprise: a) determining a nature of the emergency; and b) wherein determining the emergency category is based at least in part on the emergency information received through the interface of the electronic device and at least in part on the nature of the emergency. In some embodiments, the nature of the emergency is one of medical, fire, or police. In some embodiments, the emergency alert comprises the nature of the emergency. In some embodiments, the steps further comprise: a) gathering emergency data; and b) wherein the nature of the emergency is determined using the emergency data. In some embodiments, the emergency data comprises at least one of sensor data, environmental data, health data, or medical history. In some embodiments, the emergency data is gathered from sensors integrated into the electronic device. In some embodiments, the emergency data is gathered from an emergency data database. In some embodiments, the emergency data is gathered from a second electronic device associated with a user of the electronic device. In some embodiments, the emergency data is gathered from a second electronic device communicatively coupled to the electronic device. In some embodiments, the second electronic device is one of a smartphone, a wearable device, an IoT device, or a vehicle. In some embodiments, the steps further comprise: a) accessing a decision tree for safety recommendations; and b) stepping through the decision tree using the emergency information received through the interface of the electronic device to determine the emergency category. In some embodiments, the steps further comprise: a) determining a nature of the emergency; and b) wherein the decision tree is accessed based on the nature of the emergency. In some embodiments, each step of the decision tree points to a corresponding safety recommendation within the safety recommendation database. In some embodiments, the steps further comprise: a) initiating an autonomous communication session with a user of the electronic device; b) posing questions to the user through the emergency assistant application; c) wherein receiving the emergency information from the electronic device further comprises receiving responses to the questions posed through the emergency assistant application during the autonomous communication session; and d) wherein each response received from the user during the autonomous communication session moves the emergency management system one step forward on the decision tree. In some embodiments, the questions posed through the emergency assistant application are limited to a predetermined number of questions. In some embodiments, the predetermined number of questions is two. In some embodiments, one of the questions posed to the user through the emergency assistant application prompts the user to identify an afflicted body part. In some embodiments, the steps further comprise receiving a verbal response from the user identifying the afflicted body part. In some embodiments, the steps further comprise: a) providing a virtual body diagram through the interface of the electronic device; and b) receiving a response identifying the afflicted body part, from the user, through the virtual body diagram provided through the interface of the electronic device.

In another aspect, disclosed herein is a method for coordinating emergency response by an emergency management system, the method comprising: a) receiving an emergency alert associated with an emergency from an electronic device; b) gathering emergency data associated with the emergency alert; c) determining a nature of the emergency; d) based at least in part on the emergency data, determining a severity index for the emergency; e) based at least in part on the nature of the emergency and the severity index, generating a dispatch recommendation for the emergency; and f) providing the dispatch recommendation to an emergency service provider (ESP) personnel. In some embodiments, gathering emergency data associated with the emergency alert further comprises providing an emergency assistant application through an interface of the electronic device configured to obtain user input through the interface. In some embodiments, the method further comprises: a) initiating an autonomous communication session with a user of the electronic device; b) posing questions to the user through the emergency assistant application; and c) receiving emergency information obtained through the interface of the electronic device, wherein the emergency information comprises responses to questions posed through the emergency assistant application during the autonomous communication session. In some embodiments, posing questions to the user through the emergency assistant application further comprises asking the user for a nature of the emergency. In some embodiments, posing questions to the user through the emergency assistant application further comprises asking the user if a person involved in the emergency needs immediate emergency assistance. In some embodiments, posing questions to the user through the emergency assistant application further comprises asking the user if the emergency involves a life-threatening danger. In some embodiments, posing questions to the user through the emergency assistant application further comprises asking the user how many people are involved in the emergency. In some embodiments, the nature of the emergency comprises a nature or type of the emergency. In some embodiments, the emergency data associated with the emergency alert comprises audio or video; and b) wherein determining the nature of the emergency further comprises processing the audio or video for audio or visual cues. In some embodiments: a) the emergency data associated with the emergency alert comprises audio or video; and b) determining the severity index for the emergency further comprises processing the audio or video for audio or visual cues. In some embodiments, processing the audio or video for audio or visual cues further comprises using voice recognition or face recognition techniques to identify unique persons from the audio or video. In some embodiments, the audio cues comprise key words. In some embodiments, the audio cues comprise volume level. In some embodiments, the audio cues comprise unique voices. In some embodiments, the visual cues comprise at least one of light intensity, activity, objects, or people. In some embodiments, the method further comprises: a) comparing an audio or visual cue to a threshold value; and b) discarding the audio or visual cue if the audio or visual cue fails to exceed the threshold value. In some embodiments, the method further comprises: a) comparing an audio or visual cue to a threshold value; b) in response to the audio or visual cue exceeding the threshold value, counting the audio or visual cue toward the severity index; and c) in response to the audio or visual cue failing to exceed the threshold value, discarding the audio or visual cue. In some embodiments, the severity index is a quantized value. In some embodiments, the severity index is a qualitative level. In some embodiments, the qualitative level is one of low, medium, and high. In some embodiments, the qualitative level is one of low and high. In some embodiments, the method further comprises a) processing the emergency data associated with the emergency alert to determine a number of persons involved in the emergency; and b) wherein the severity index is determined based at least in part on the number of persons involved in the emergency. In some embodiments: a) the severity index is a qualitative level; b) the qualitative level is one of low and high; and c) the severity index is determined to be high in response to the number of persons involved in the emergency equaling or exceeding two persons. In some embodiments: a) gathering emergency data associated with the emergency alert further comprises: i) providing an emergency assistant application through an interface of the electronic device; ii) initiating an autonomous communication session with a user of the electronic device; iii) posing questions to the user through the emergency assistant application; iv) receiving responses to questions posed through the emergency assistant application during the autonomous communication session; and b) wherein the severity index is a qualitative level; and c) wherein the qualitative level is one of low and high. In some embodiments, the severity index is determined to be high in response to receiving a response to a question posed through the emergency assistant application indicating that a person involved in the emergency needs immediate emergency assistance. In some embodiments, the severity index is determined to be high at least partially in response to receiving a response to a question posed through the emergency assistant application indicating that the emergency involves a life-threatening danger. In some embodiments, the severity index is determined to be high at least partially in response to receiving a response to a question posed through the emergency assistant application indicating that a number of persons involved in the emergency equals or exceeds two persons. In some embodiments, the dispatch recommendation comprises at least one type of emergency response unit and at least one number of the at least one type of emergency response unit. In some embodiments, generating the dispatch recommendation further comprises accessing a dispatch protocol comprising a list of dispatch recommendations, wherein each combination of nature of emergency and severity index corresponds to a particular dispatch recommendation on the list of dispatch recommendations. In some embodiments, the nature of the emergency is comprised within the emergency alert. In some embodiments, the nature of the emergency is determined using the emergency data associated with the emergency alert. In some embodiments, the emergency data associated with the emergency alert comprises at least one of health data, sensor data, environmental data, audio, video, and medical history. In some embodiments, the emergency data associated with the emergency alert is gathered from the electronic device. In some embodiments, the emergency data associated with the emergency alert is gathered from a second electronic device communicatively coupled to the electronic device. In some embodiments: a) the emergency alert is associated with a user account; and b) the emergency data associated with the emergency alert is gathered from a second electronic device associated with the user account. In some embodiments, the emergency data associated with the emergency alert is gathered from an emergency data database. In some embodiments, the emergency alert is generated by the electronic device. In some embodiments, the emergency alert is generated by a second electronic device communicatively coupled to the electronic device in response to detecting an emergency. In some embodiments: a) the electronic device is a sensor device; and b) the emergency alert is automatically generated by the sensor device in response to detecting an emergency based on sensor data gathered by the sensor device. In some embodiments: a) the electronic device is an intelligent vehicle system; and b) the emergency alert is automatically generated by the intelligent vehicle system in response to detecting an emergency based on sensor data gathered by the intelligent vehicle system. In some embodiments, the method further comprises: a) identifying a location of the emergency using the emergency alert; and b) generating a dispatch recommendation for the emergency based at least in part on the nature of the emergency, the severity index, and the location. In some embodiments, the location of the emergency is comprised within the emergency alert. In some embodiments, the method further comprises: a) identifying a location of the emergency using the emergency alert; and b) generating a dispatch recommendation for the emergency based at least in part on the nature of the emergency, the severity index, and the location; and c) wherein generating the dispatch recommendation further comprises: i) accessing a responder information database; ii) identifying one or more emergency service providers in the vicinity of the location of the emergency; and iii) determining the types, capabilities, or availabilities of emergency response units from the one or more emergency service providers. In some embodiments, the dispatch recommendation further comprises directions from the one or more emergency service providers to the location of the emergency. In some embodiments, the method further comprises graphically displaying the dispatch recommendation within a map on an ESP device. In some embodiments, the method further comprises generating an emergency report for the emergency. In some embodiments, the emergency report comprises the nature of the emergency, the severity index, and the dispatch recommendation. In some embodiments, the method further comprises: a) identifying a location of the emergency; and b) wherein the emergency report comprises the nature of the emergency, the location of the emergency, the severity index, and the dispatch recommendation. In some embodiments, the emergency report comprises a transcription of the emergency data associated with the emergency alert. In some embodiments, the emergency report comprises a date and time of when the emergency alert was received. In some embodiments, the method further comprises: a) receiving a notification when an emergency responder is dispatched to the emergency; b) receiving a notification when the emergency responder arrives at the emergency; and c) wherein the emergency report comprises the nature of the emergency, the severity index, the dispatch recommendation, a first date and time of when the emergency responder was dispatched to the emergency, and a second date and time of when the emergency responder arrived at the emergency.

In another aspect, disclosed herein is a method for coordinating emergency response by an emergency management system, the method comprising: a) receiving an emergency alert associated with an emergency from an electronic device; b) gathering emergency data associated with the emergency alert; c) based at least in part on the emergency data, determining a dispatch category for the emergency; d) based at least in part on the dispatch category, generating a dispatch recommendation for the emergency; and e) providing the dispatch recommendation to an emergency service provider (ESP) personnel. In some embodiments, determining the dispatch category for the emergency based on the emergency data further comprises: a) accessing a decision tree for dispatch categories; and b) processing the emergency data using the decision tree to identify the dispatch category for the emergency. In some embodiments, the method further comprises: a) determining a nature of the emergency; and b) wherein the decision tree is accessed based on the nature of the emergency. In some embodiments, the method further comprises determining the nature of the emergency using the emergency data. In some embodiments, the nature of the emergency is comprised within the emergency alert. In some embodiments, determining the dispatch category for the emergency based on the emergency data further comprises processing the emergency data using an emergency classifier configured to identify the dispatch category for the emergency. In some embodiments, determining the dispatch category for the emergency further comprises applying a machine learning algorithm to the emergency data to determine the dispatch category. In some embodiments, the machine learning algorithm is trained on a data set comprising test emergency data sets and corresponding dispatch categories.

In another aspect, disclosed herein is a method for coordinating emergency response by an emergency management system, the method comprising: a) receiving an emergency alert associated with an emergency from an electronic device; b) gathering emergency data associated with the emergency alert; c) determining a dispatch card appropriate for the emergency, wherein the dispatch card comprises a set of questions regarding the emergency and a set of dispatch options based on answers to the set of questions; d) answering one or more questions within the set of questions regarding the emergency comprised by the dispatch card using the emergency data associated with the emergency alert; e) based at least in part on the one or more questions answered using the emergency data associated with the emergency alert and the set of dispatch options comprised by the dispatch card, generating a dispatch recommendation for the emergency; and f) providing the dispatch recommendation to an emergency service provider (ESP) personnel. In some embodiments, determining the dispatch card appropriate for the emergency further comprises receiving selection of the dispatch card from the ESP personnel. In some embodiments, determining the dispatch card appropriate for the emergency further comprises: a) providing an emergency assistant application through an interface of the electronic device; b) initiating an autonomous communication session with a user of the electronic device through the emergency assistant application; c) posing questions to the user through emergency assistant application during the autonomous communication session; d) receiving emergency information obtained through the interface of the electronic device in the form of responses from the user to the questions posed through the emergency assistant during the autonomous communication session; and e) determining the dispatch card appropriate for the emergency based at least in part on the emergency information received through the emergency assistant. In some embodiments, the method further comprises: a) identifying a location of the emergency using the emergency alert; and b) generating the dispatch recommendation based at least in part on the one or more questions answered using the emergency data, the set of dispatch options comprised by the dispatch card, and the location of the emergency. In some embodiments, the dispatch card is selected from a plurality of different dispatch cards associated with different types of emergencies.

In another aspect, disclosed herein is a system for coordinating emergency response by an emergency management system, the system comprising: a) an electronic device; b) a network server comprising at least one processor; and c) an emergency management system executed on the at least one processor and configured to: i) receive an emergency alert associated with an emergency from an electronic device; ii) gather emergency data associated with the emergency alert; iii) determine a nature of the emergency; iv) based at least in part on the emergency data, determine a severity index for the emergency; v) based at least in part on the nature of the emergency and the severity index, generate a dispatch recommendation for the emergency; and vi) transmit the dispatch recommendation to an emergency service provider (ESP) personnel. In some embodiments, the emergency management system is further configured to gather emergency data associated with the emergency alert by providing an emergency assistant application through an interface of the electronic device configured to obtain user input through the interface. In some embodiments, the emergency management system is further configured to: a) initiate an autonomous communication session with a user of the electronic device; b) pose questions to the user through the emergency assistant application; and c) receive emergency information obtained through the interface of the electronic device, wherein the emergency information comprises responses to questions posed through the emergency assistant application during the autonomous communication session. In some embodiments, the emergency management system is further configured to pose questions to the user through the emergency assistant application by asking the user for a nature of the emergency. In some embodiments, the emergency management system is further configured to pose questions to the user through the emergency assistant application by asking the user if a person involved in the emergency needs immediate emergency assistance. In some embodiments, the emergency management system is further configured to pose questions to the user through the emergency assistant application by asking the user if the emergency involves a life-threatening danger. In some embodiments, the emergency management system is further configured to pose questions to the user through the emergency assistant application by asking the user how many people are involved in the emergency. In some embodiments, the nature of the emergency comprises a nature or type of the emergency. In some embodiments: a) the emergency data associated with the emergency alert comprises audio or video; and b) the emergency management system is further configured to determine the nature of the emergency further by processing the audio or video for audio or visual cues. In some embodiments: a) the emergency data associated with the emergency alert comprises audio or video; and b) the emergency management system is further configured to determine the severity index for the emergency further by processing the audio or video for audio or visual cues. In some embodiments, the emergency management system is further configured to process the audio or visual cues by using voice recognition or face recognition techniques to identify unique persons from the audio or video. In some embodiments, the audio cues comprise key words. In some embodiments, the audio cues comprise volume level. In some embodiments, the audio cues comprise unique voices. In some embodiments, the visual cues comprise at least one of light intensity, activity, objects, or people. In some embodiments, the emergency management system is further configured to: a) compare an audio or visual cue to a threshold value; and b) discard the audio or visual cue if the audio or visual cue fails to exceed the threshold value. In some embodiments, the emergency management system is further configured to: a) comparing an audio or visual cue to a threshold value; b) in response to the audio or visual cue exceeding the threshold value, counting the audio or visual cue toward the severity index; and c) in response to the audio or visual cue failing to exceed the threshold value, discarding the audio or visual cue. In some embodiments, the severity index is a quantized value. In some embodiments, the severity index is a qualitative level. In some embodiments, the qualitative level is one of low, medium, and high. In some embodiments, the qualitative level is one of low and high. In some embodiments: a) the emergency management system is further configured to process the emergency data associated with the emergency alert to determine a number of persons involved in the emergency; and b) the severity index is determined based at least in part on the number of persons involved in the emergency. In some embodiments: a) the severity index is a qualitative level; b) wherein the qualitative level is one of low and high; c) the severity index is determined to be high in response to the number of persons involved in the emergency equaling or exceeding two persons. In some embodiments: a) the emergency management system is further configured to gather emergency data associated with the emergency alert by: i) providing an emergency assistant application through an interface of the electronic device; ii) initiating an autonomous communication session with a user of the electronic device; iii) posing questions to the user through the emergency assistant application; iv) receiving responses to questions posed through the emergency assistant application during the autonomous communication session; and b) wherein the severity index is a qualitative level; and c) wherein the qualitative level is one of low and high. In some embodiments, the severity index is determined to be high in response to receiving a response to a question posed through the emergency assistant application indicating that a person involved in the emergency needs immediate emergency assistance. In some embodiments, the severity index is determined to be high at least partially in response to receiving a response to a question posed through the emergency assistant application indicating that the emergency involves a life-threatening danger. In some embodiments, the severity index is determined to be high at least partially in response to receiving a response to a question posed through the emergency assistant application indicating that a number of persons involved in the emergency equals or exceeds two persons. In some embodiments, the dispatch recommendation comprises at least one type of emergency response unit and at least one number of the at least one type of emergency response unit. In some embodiments, generating the dispatch recommendation further comprises accessing a dispatch protocol comprising a list of dispatch recommendations, wherein each combination of nature of emergency and severity index corresponds to a particular dispatch recommendation on the list of dispatch recommendations. In some embodiments, the nature of the emergency is comprised within the emergency alert. In some embodiments, the nature of the emergency is determined using the emergency data associated with the emergency alert. In some embodiments, the emergency data associated with the emergency alert comprises at least one of health data, sensor data, environmental data, audio, video, and medical history. In some embodiments, the emergency data associated with the emergency alert is gathered from the electronic device. In some embodiments, the emergency data associated with the emergency alert is gathered from a second electronic device communicatively coupled to the electronic device. In some embodiments: a) the emergency alert is associated with a user account; and b) the emergency data associated with the emergency alert is gathered from a second electronic device associated with the user account. In some embodiments, the emergency data associated with the emergency alert is gathered from an emergency data database. In some embodiments, the emergency alert is generated by the electronic device. In some embodiments, the emergency alert is generated by a second electronic device communicatively coupled to the electronic device in response to detecting an emergency. In some embodiments: a) the electronic device is a sensor device; and b) the emergency alert is automatically generated by the sensor device in response to detecting an emergency based on sensor data gathered by the sensor device. In some embodiments: a) the electronic device is an intelligent vehicle system; and b) the emergency alert is automatically generated by the intelligent vehicle system in response to detecting an emergency based on sensor data gathered by the intelligent vehicle system. In some embodiments, the emergency management system is further configured for: a) identifying a location of the emergency using the emergency alert; and b) generating a dispatch recommendation for the emergency based at least in part on the nature of the emergency, the severity index, and the location. In some embodiments, the location of the emergency is comprised within the emergency alert. In some embodiments, the emergency management system is further configured to: a) identify a location of the emergency using the emergency alert; b) generate a dispatch recommendation for the emergency based at least in part on the nature of the emergency, the severity index, and the location; c) access a responder information database; d) identify one or more emergency service providers in the vicinity of the location of the emergency; and e) determine the types, capabilities, or availabilities of emergency response units from the one or more emergency service providers. In some embodiments, the dispatch recommendation further comprises directions from the one or more emergency service providers to the location of the emergency. In some embodiments, the emergency management system is further configured to graphically display the dispatch recommendation within a map on an ESP device. In some embodiments, the emergency management system is further configured to generate an emergency report for the emergency. In some embodiments, the emergency report comprises the nature of the emergency, the severity index, and the dispatch recommendation. In some embodiments: a) the emergency management system is further configured to identify a location of the emergency; and b) the emergency report comprises the nature of the emergency, the location of the emergency, the severity index, and the dispatch recommendation. In some embodiments, the emergency report comprises a transcription of the emergency data associated with the emergency alert. In some embodiments, the emergency report comprises a date and time of when the emergency alert was received. In some embodiments: a) the emergency management system is further configured to: i) receive a notification when an emergency responder is dispatched to the emergency; and ii) receive a notification when the emergency responder arrives at the emergency; and b) wherein the emergency report comprises the nature of the emergency, the severity index, the dispatch recommendation, a first date and time of when the emergency responder was dispatched to the emergency, and a second date and time of when the emergency responder arrived at the emergency.

In another aspect, disclosed herein is a system for coordinating emergency response by an emergency management system, the system comprising: a) an electronic device; b) a network server comprising at least one processor; and c) an emergency management system executed on the at least one processor and configured to: i) receive an emergency alert associated with an emergency from an electronic device; ii) gather emergency data associated with the emergency alert; iii) based at least in part on the emergency data, determine a dispatch category for the emergency; iv) based at least in part on the dispatch category, generate a dispatch recommendation for the emergency; and v) transmit the dispatch recommendation to an emergency service provider (ESP) personnel. In some embodiments, the emergency management system is further configured to determine the dispatch category for the emergency based on the emergency data by: a) accessing a decision tree for dispatch categories; and b) processing the emergency data using the decision tree to identify the dispatch category for the emergency. In some embodiments: a) the emergency management system is further configured to determine a nature of the emergency; and b) the decision tree is accessed based on the nature of the emergency. In some embodiments, the emergency management system is further configured to determining the nature of the emergency using the emergency data. In some embodiments, the nature of the emergency is comprised within the emergency alert. In some embodiments, the emergency management system is further configured to determine the dispatch category for the emergency based on the emergency data by processing the emergency data using an emergency classifier configured to identify the dispatch category for the emergency. In some embodiments, the emergency management system is further configured to determine the dispatch category for the emergency based on the emergency data by applying a machine learning algorithm to the emergency data to determine the dispatch category. In some embodiments, the machine learning algorithm is trained on a data set comprising test emergency data sets and corresponding dispatch categories.

In another aspect, disclosed herein is a system for coordinating emergency response by an emergency management system, the system comprising: a) an electronic device; b) a network server comprising at least one processor; and c) an emergency management system executed on the at least one processor and configured to: i) receive an emergency alert associated with an emergency from an electronic device; ii) gather emergency data associated with the emergency alert; iii) determine a dispatch card appropriate for the emergency, wherein the dispatch card comprises a set of questions regarding the emergency and a set of dispatch options based on answers to the set of questions; iv) answer one or more questions within the set of questions regarding the emergency comprised by the dispatch card using the emergency data associated with the emergency alert; v) based at least in part on the one or more questions answered using the emergency data associated with the emergency alert and the set of dispatch options comprised by the dispatch card, generate a dispatch recommendation for the emergency; and vi) transmit the dispatch recommendation to an emergency service provider (ESP) personnel. In some embodiments, the emergency management system is further configured to determine the dispatch card appropriate for the emergency by receiving selection of the dispatch card from the ESP personnel. In some embodiments, the emergency management system is further configured to determine the dispatch card appropriate for the emergency by: a) providing an emergency assistant application through an interface of the electronic device; b) initiating an autonomous communication session with a user of the electronic device through the emergency assistant application; c) posing questions to the user through emergency assistant application during the autonomous communication session; d) receiving emergency information obtained through the interface of the electronic device in the form of responses from the user to the questions posed through the emergency assistant during the autonomous communication session; and e) determining the dispatch card appropriate for the emergency based at least in part on the emergency information received through the emergency assistant. In some embodiments, the emergency management system is further configured to: a) identify a location of the emergency using the emergency alert; and b) generate the dispatch recommendation based at least in part on the one or more questions answered using the emergency data, the set of dispatch options comprised by the dispatch card, and the location of the emergency. In some embodiments, the dispatch card is selected from a plurality of different dispatch cards associated with different types of emergencies.

In another aspect, disclosed herein is non-transitory computer readable storage media encoded with at least one computer program including instructions executable by at least one processor to perform steps comprising: a) receiving an emergency alert associated with an emergency from an electronic device; b) gathering emergency data associated with the emergency alert; c) determining a nature of the emergency; d) based at least in part on the emergency data, determining a severity index for the emergency; e) based at least in part on the nature of the emergency and the severity index, generating a dispatch recommendation for the emergency; and f) providing the dispatch recommendation to an emergency service provider (ESP) personnel. In some embodiments, gathering emergency data associated with the emergency alert further comprises providing an emergency assistant application through an interface of the electronic device configured to obtain user input through the interface. In some embodiments, the steps further comprise: a) initiating an autonomous communication session with a user of the electronic device; b) posing questions to the user through the emergency assistant application; and c) receiving emergency information obtained through the interface of the electronic device, wherein the emergency information comprises responses to questions posed through the emergency assistant application during the autonomous communication session. In some embodiments, posing questions to the user through the emergency assistant application further comprises asking the user for a nature of the emergency. In some embodiments, posing questions to the user through the emergency assistant application further comprises asking the user if a person involved in the emergency needs immediate emergency assistance. In some embodiments, posing questions to the user through the emergency assistant application further comprises asking the user if the emergency involves a life-threatening danger. In some embodiments, posing questions to the user through the emergency assistant application further comprises asking the user how many people are involved in the emergency. In some embodiments, the nature of the emergency comprises a nature or type of the emergency. In some embodiments: a) the emergency data associated with the emergency alert comprises audio or video; and b) determining the nature of the emergency further comprises processing the audio or video for audio or visual cues. In some embodiments: a) the emergency data associated with the emergency alert comprises audio or video; and b) determining the severity index for the emergency further comprises processing the audio or video for audio or visual cues. In some embodiments, processing the audio or video for audio or visual cues further comprises using voice recognition or face recognition techniques to identify unique persons from the audio or video. In some embodiments, the audio cues comprise key words. In some embodiments, the audio cues comprise volume level. In some embodiments, the audio cues comprise unique voices. In some embodiments, the visual cues comprise at least one of light intensity, activity, objects, or people. In some embodiments, the steps further comprise: a) comparing an audio or visual cue to a threshold value; and b) discarding the audio or visual cue if the audio or visual cue fails to exceed the threshold value. In some embodiments, the steps further comprise: a) comparing an audio or visual cue to a threshold value; b) in response to the audio or visual cue exceeding the threshold value, counting the audio or visual cue toward the severity index; and c) in response to the audio or visual cue failing to exceed the threshold value, discarding the audio or visual cue. In some embodiments, the severity index is a quantized value. In some embodiments, the severity index is a qualitative level. In some embodiments, the qualitative level is one of low, medium, and high. In some embodiments, the qualitative level is one of low and high. In some embodiments, the steps further comprise: a) processing the emergency data associated with the emergency alert to determine a number of persons involved in the emergency; and b) wherein the severity index is determined based at least in part on the number of persons involved in the emergency. In some embodiments: a) the severity index is a qualitative level; b) wherein the qualitative level is one of low and high; c) the severity index is determined to be high in response to the number of persons involved in the emergency equaling or exceeding two persons. In some embodiments: a) gathering emergency data associated with the emergency alert further comprises: i) providing an emergency assistant application through an interface of the electronic device; ii) initiating an autonomous communication session with a user of the electronic device; iii) posing questions to the user through the emergency assistant application; iv) receiving responses to questions posed through the emergency assistant application during the autonomous communication session; b) the severity index is a qualitative level; and c) the qualitative level is one of low and high. In some embodiments, the severity index is determined to be high in response to receiving a response to a question posed through the emergency assistant application indicating that a person involved in the emergency needs immediate emergency assistance. In some embodiments, the severity index is determined to be high at least partially in response to receiving a response to a question posed through the emergency assistant application indicating that the emergency involves a life-threatening danger. In some embodiments, the severity index is determined to be high at least partially in response to receiving a response to a question posed through the emergency assistant application indicating that a number of persons involved in the emergency equals or exceeds two persons. In some embodiments, the dispatch recommendation comprises at least one type of emergency response unit and at least one number of the at least one type of emergency response unit. In some embodiments, generating the dispatch recommendation further comprises accessing a dispatch protocol comprising a list of dispatch recommendations, wherein each combination of nature of emergency and severity index corresponds to a particular dispatch recommendation on the list of dispatch recommendations. In some embodiments, the nature of the emergency is comprised within the emergency alert. In some embodiments, the nature of the emergency is determined using the emergency data associated with the emergency alert. In some embodiments, the emergency data associated with the emergency alert comprises at least one of health data, sensor data, environmental data, audio, video, and medical history. In some embodiments, the emergency data associated with the emergency alert is gathered from the electronic device. In some embodiments, the emergency data associated with the emergency alert is gathered from a second electronic device communicatively coupled to the electronic device. In some embodiments: a) the emergency alert is associated with a user account; and b) the emergency data associated with the emergency alert is gathered from a second electronic device associated with the user account. In some embodiments, the emergency data associated with the emergency alert is gathered from an emergency data database. In some embodiments, the emergency alert is generated by the electronic device. In some embodiments, the emergency alert is generated by a second electronic device communicatively coupled to the electronic device in response to detecting an emergency. In some embodiments: a) the electronic device is a sensor device; and b) the emergency alert is automatically generated by the sensor device in response to detecting an emergency based on sensor data gathered by the sensor device. In some embodiments: a) the electronic device is an intelligent vehicle system; and b) the emergency alert is automatically generated by the intelligent vehicle system in response to detecting an emergency based on sensor data gathered by the intelligent vehicle system. In some embodiments, the steps further comprise: a) identifying a location of the emergency using the emergency alert; and b) generating a dispatch recommendation for the emergency based at least in part on the nature of the emergency, the severity index, and the location. In some embodiments, the location of the emergency is comprised within the emergency alert. In some embodiments, the steps further comprise: i) identifying a location of the emergency using the emergency alert; and ii) generating a dispatch recommendation for the emergency based at least in part on the nature of the emergency, the severity index, and the location; and b) wherein generating the dispatch recommendation further comprises: i) accessing a responder information database; ii) identifying one or more emergency service providers in the vicinity of the location of the emergency; and iii) determining the types, capabilities, or availabilities of emergency response units from the one or more emergency service providers. In some embodiments, the dispatch recommendation further comprises directions from the one or more emergency service providers to the location of the emergency. In some embodiments, the steps further comprise graphically displaying the dispatch recommendation within a map on an ESP device. In some embodiments, the steps further comprise generating an emergency report for the emergency. In some embodiments, the emergency report comprises the nature of the emergency, the severity index, and the dispatch recommendation. In some embodiments, the steps further comprise: a) identifying a location of the emergency; and b) wherein the emergency report comprises the nature of the emergency, the location of the emergency, the severity index, and the dispatch recommendation. In some embodiments, the emergency report comprises a transcription of the emergency data associated with the emergency alert. In some embodiments, the emergency report comprises a date and time of when the emergency alert was received. In some embodiments, the steps further comprise a) receiving a notification when an emergency responder is dispatched to the emergency; b) further comprising receiving a notification when the emergency responder arrives at the emergency; and c) wherein the emergency report comprises the nature of the emergency, the severity index, the dispatch recommendation, a first date and time of when the emergency responder was dispatched to the emergency, and a second date and time of when the emergency responder arrived at the emergency.

In another aspect, disclosed herein is non-transitory computer readable storage media encoded with at least one computer program including instructions executable by at least one processor to perform steps comprising: a) receiving an emergency alert associated with an emergency from an electronic device; b) gathering emergency data associated with the emergency alert; c) based at least in part on the emergency data, determining a dispatch category for the emergency; d) based at least in part on the dispatch category, generating a dispatch recommendation for the emergency; and e) providing the dispatch recommendation to an emergency service provider (ESP) personnel. In some embodiments, determining the dispatch category for the emergency based on the emergency data further comprises: a) accessing a decision tree for dispatch categories; and b) processing the emergency data using the decision tree to identify the dispatch category for the emergency. In some embodiments, the steps further comprise: a) determining a nature of the emergency; and b) wherein the decision tree is accessed based on the nature of the emergency. In some embodiments, the steps further comprise determining the nature of the emergency using the emergency data. In some embodiments, the nature of the emergency is comprised within the emergency alert. In some embodiments, determining the dispatch category for the emergency based on the emergency data further comprises processing the emergency data using an emergency classifier configured to identify the dispatch category for the emergency. In some embodiments, determining the dispatch category for the emergency further comprises applying a machine learning algorithm to the emergency data to determine the dispatch category. In some embodiments, the machine learning algorithm is trained on a data set comprising test emergency data sets and corresponding dispatch categories.

In another aspect, disclosed herein is non-transitory computer readable storage media encoded with at least one computer program including instructions executable by at least one processor to perform steps comprising: a) receiving an emergency alert associated with an emergency from an electronic device; b) gathering emergency data associated with the emergency alert; c) determining a dispatch card appropriate for the emergency, wherein the dispatch card comprises a set of questions regarding the emergency and a set of dispatch options based on answers to the set of questions; d) answering one or more questions within the set of questions regarding the emergency comprised by the dispatch card using the emergency data associated with the emergency alert; e) based at least in part on the one or more questions answered using the emergency data associated with the emergency alert and the set of dispatch options comprised by the dispatch card, generating a dispatch recommendation for the emergency; and f) providing the dispatch recommendation to an emergency service provider (ESP) personnel. In some embodiments, determining the dispatch card appropriate for the emergency further comprises receiving selection of the dispatch card from the ESP personnel. In some embodiments, determining the dispatch card appropriate for the emergency further comprises: a) providing an emergency assistant application through an interface of the electronic device; b) initiating an autonomous communication session with a user of the electronic device through the emergency assistant application; c) posing questions to the user through emergency assistant application during the autonomous communication session; d) receiving emergency information obtained through the interface of the electronic device in the form of responses from the user to the questions posed through the emergency assistant during the autonomous communication session; and e) determining the dispatch card appropriate for the emergency based at least in part on the emergency information received through the emergency assistant. In some embodiments, the steps further comprise: a) identifying a location of the emergency using the emergency alert; and b) generating the dispatch recommendation based at least in part on the one or more questions answered using the emergency data, the set of dispatch options comprised by the dispatch card, and the location of the emergency. In some embodiments, the dispatch card is selected from a plurality of different dispatch cards associated with different types of emergencies.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the invention are utilized, and the accompanying drawings of which:

FIG. 23A and FIG. 23B depict a non-limiting example of a table of dispatch cards and emergency data types in accordance with the present disclosure; and FIG. 24 depicts a non-limiting example of an emergency report in accordance with the present disclosure.

DETAILED DESCRIPTION

Electronic Device, Emergency Management System, and Emergency Service Provider (ESP)

Figure 1A:
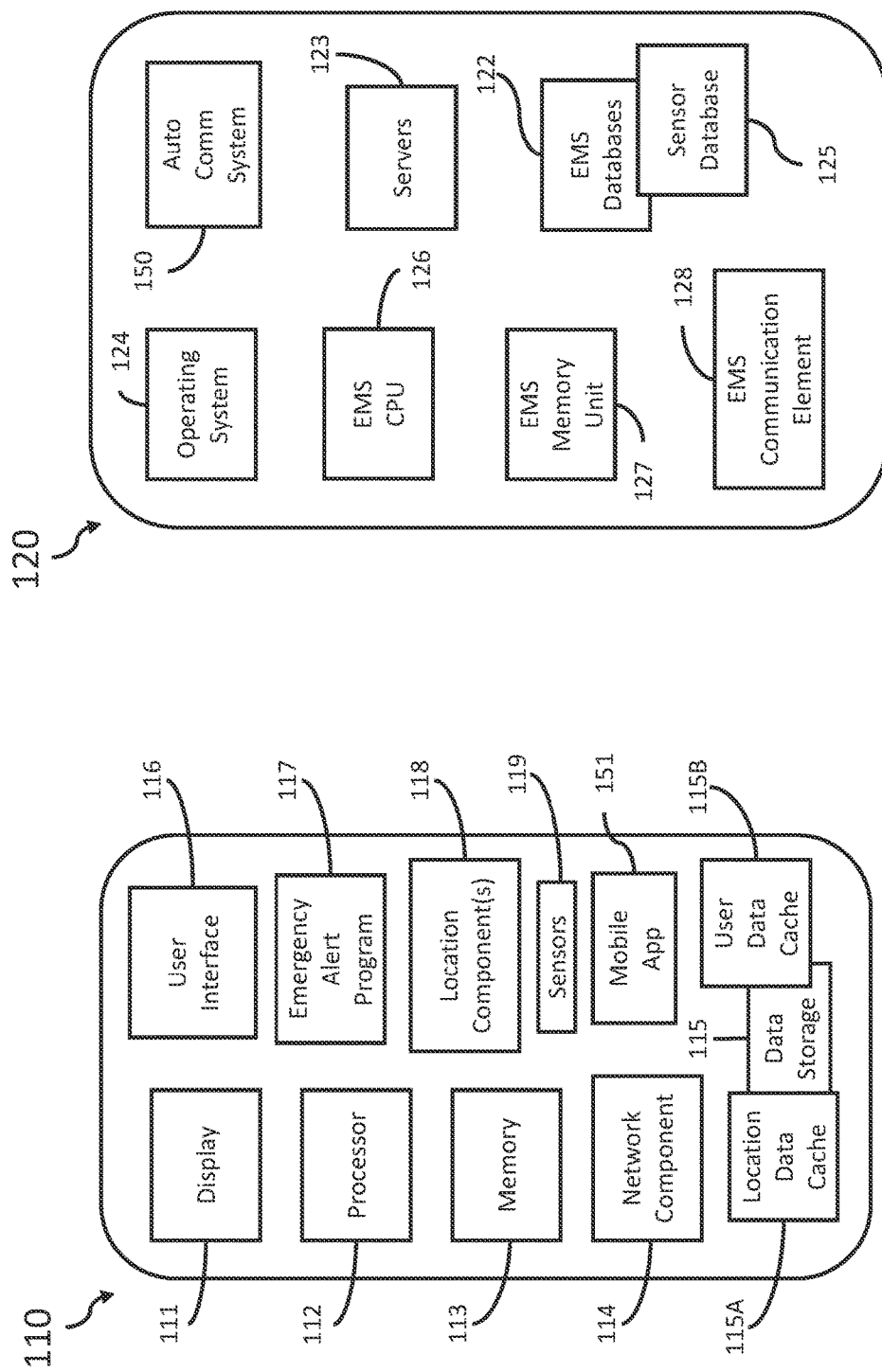
FIGS. 1A and 1B depict diagrams of (i) an electronic device, (ii) an emergency management system (EMS), (iii) an emergency service provider (ESP) system, and (iv) ESP software in accordance with one embodiment of the present disclosure.

In certain embodiments, disclosed herein are devices, systems, and methods for managing emergency data for emergency response. FIG. 1A depicts diagrams of (i) an electronic device 110 and (ii) an emergency management system (EMS) 120 in accordance with one embodiment of the present disclosure. In some embodiments, the electronic device 110 is a digital processing device such as a communication device (e.g., mobile or cellular phone, computer, laptop, etc.). In some embodiments, the electronic device is a wearable device (e.g., a smartwatch). In some embodiments, the electronic device is an Internet of Things (IoT) device, such as a home assistant (e.g., an Amazon Echo) or a connected smoke detector (e.g., a Nest Protect smoke and carbon monoxide alarm). In some embodiments, the electronic device is a walkie-talkie or two-way radio.

In some embodiments, the electronic device 110 includes a display 111, a processor 112, a memory 113 (e.g., an EPROM memory, a RAM, or a solid-state memory), and several optional components such as one or more network component(s) 114 (e.g., an antenna and associated components, Wi-Fi adapters, Bluetooth adapters, etc.), a data storage 115, a user interface 116, a computer program such as an emergency alert program 117, one or more location components 118, and one or more sensors 119. In some embodiments, the processor 112 is implemented as one or more microprocessors, microcomputers, microcontrollers, digital signal processors, central processing units, state machines, logic circuitries, and/or devices that manipulate signals based on operational instructions. Among other capabilities, the processor 112 is configured to fetch and execute computer-readable instructions stored in the memory 113.

In some embodiments, the display 111 is part of the user interface 116 (e.g., a touchscreen is both a display and a user interface in that it provides an interface to receive user input or user interactions). In some embodiments, the user interface 116 includes physical buttons such as an on/off button or volume buttons. In some embodiments, the display 111 and/or the user interface 116 comprises a touchscreen (e.g., a capacitive touchscreen), which is capable of displaying information and receiving user input. In some embodiments, the user interface 116 does not include a touchscreen, but comprises one or more physical buttons and/or a microphone. In some embodiments, the display 111 does not include a touchscreen, but comprises one or more lights, indicators, and/or lighted buttons.

In some embodiments, the electronic device 110 includes various accessories that allow for additional functionality. In some embodiments, these accessories (not shown) include one or more of the following: a microphone, a camera, speaker, a fingerprint scanner/reader, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage 115 includes a location data cache 115a and a user data cache 115*b*. In some embodiments, the location data cache 115*a* is configured to store locations generated by the one or more location components 118.

In some embodiments, the computer program 117 is an emergency response application or emergency response mobile application. In some embodiments, the computer program 117 is configured to record user data, such as a name, address, or medical data of a user associated with the electronic device 110. In some embodiments, the computer program 117 is an emergency alert program configured to detect an emergency from the electronic device (e.g., when a user 100 (not shown) uses the electronic device 110 to make an emergency call). In some embodiments, the user initiates the emergency alert by interacting with the user interface 116. In some embodiments, the emergency is detected by one or more sensors (built in or peripheral to the device). In some embodiments, in response to detecting an emergency request for assistance (e.g., a native dial 9-1-1 call) generated or sent by the electronic device 110, the computer program is configured to deliver a notification to the EMS 120. In some embodiments, the notification is an HTTP post containing information regarding the emergency request. In some embodiments, the notification includes a location (e.g., a device-based hybrid location) generated by or for the electronic device 110. In some embodiments, in response to detecting an emergency request generated or sent by the electronic device 110, the computer program is configured to deliver user data to the emergency management system (EMS) 120. In some embodiments, the electronic device 110 additionally or alternatively includes a mobile application 151 (also referred to as a "mobile app") configured to perform emergency response functions in response to an emergency alert (such as an emergency alert initiated by the emergency alert program) or according to instructions from the EMS 120, as described below.

In some embodiments, as depicted in FIG. 1A, the emergency management system (EMS) 120 includes an EMS operating system 124, an EMS CPU 126, an EMS memory unit 127, and an EMS communication element 128. In some embodiments, the EMS CPU 126 is implemented as one or more microprocessors, microcomputers, microcontrollers, digital signal processors, central processing units, state machines, logic circuitries, and/or devices that manipulate signals based on operational instructions. Among other capabilities, the EMS CPU 126 is configured to fetch and execute computer-readable instructions stored in the EMS memory unit 127. The EMS memory unit 127 optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The EMS memory unit 127 optionally includes modules, routines, programs, objects, components, data structures, etc., which perform particular tasks or implement particular abstract data types. In some embodiments, the EMS 120 includes one or more EMS databases 122 (such as sensor database 125), one or more servers 123, and an EMS communication element 128. In some embodiments, the EMS 120 includes an autonomous communication system 150 configured to initiate and manage autonomous communication sessions with electronic devices, as described below.

Figure 1B:
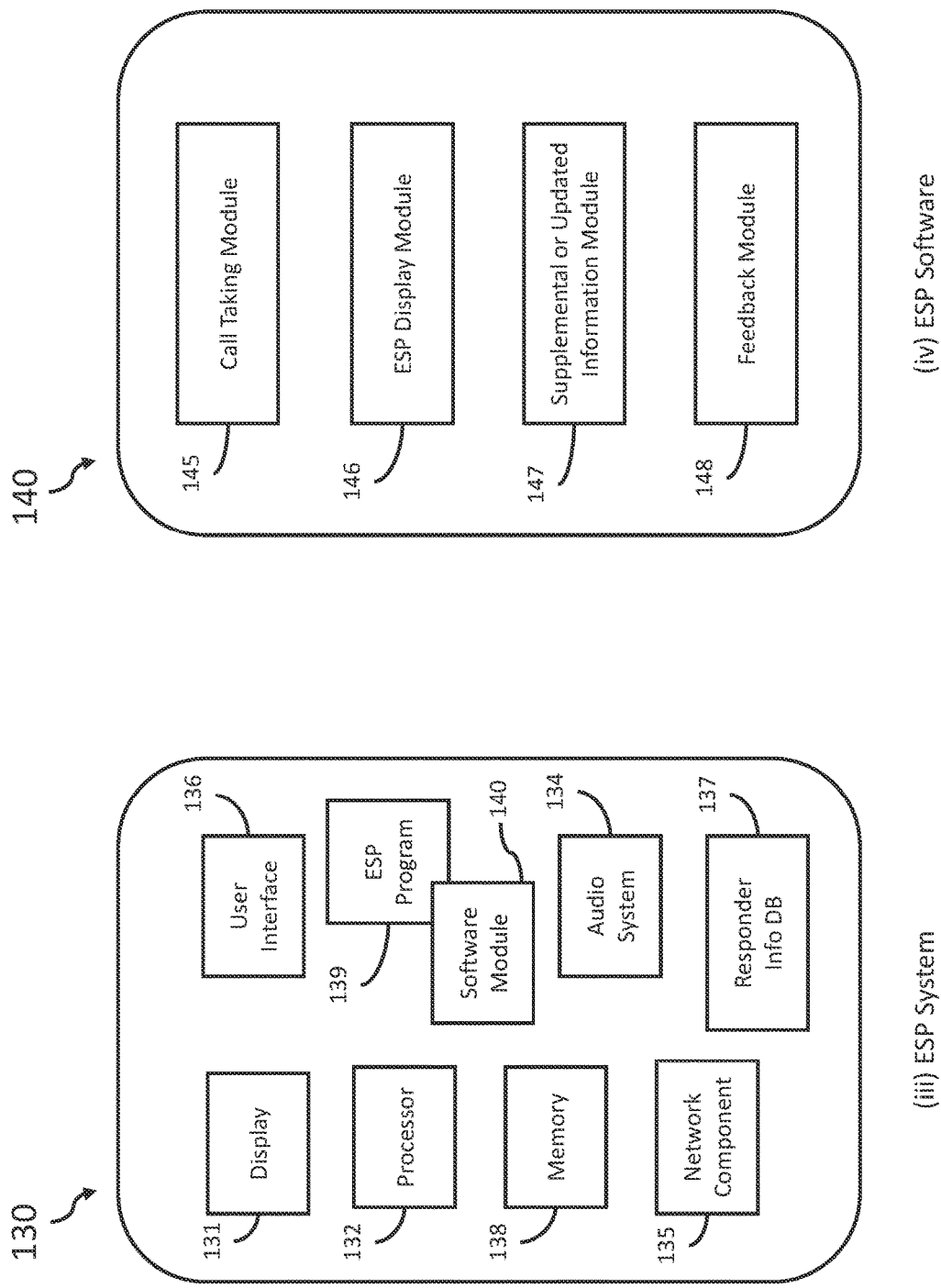

In some embodiments, as depicted in FIG. 1B, an ESP is an emergency service provider (ESP) system 130 that includes one or more of a display 131, a memory 138, a user interface 136, at least one central processing unit or processor 132, a network component 135, an audio system 134 (e.g., microphone, speaker and/or a call-taking headset), and a computer program such as a ESP application or ESP program (software) 139. In some embodiments, the ESP application or program 139 comprises one or more software modules 140. In some embodiments, the ESP system 130 comprises a database of emergency responders 137, such as medical assets, police assets, fire response assets, rescue assets, safety assets, etc.

In some embodiments, as depicted in FIG. 1B, the ESP application or program 139 installed on an ESP system 130 includes at least one software module 140, such as a call taking module 145 (e.g., a computer aided dispatch system), an ESP display module 146, a supplemental or updated information module 147, a feedback module 148 (for ESP users to request specific type of data), or a combination thereof. In some embodiments, the ESP application 139 displays the information on a map (e.g., on the display 131). In some embodiments, location and supplemental information is displayed for other emergency service providers (e.g., police, fire, medical, etc.) and/or responders on their respective devices. It is contemplated that responder devices have optionally installed a responder device program (not shown) similar to ESP display module 146. In some embodiments, the responder device program displays the emergency location on a map.

Autonomous Communication for Emergency Response

Figure 2:
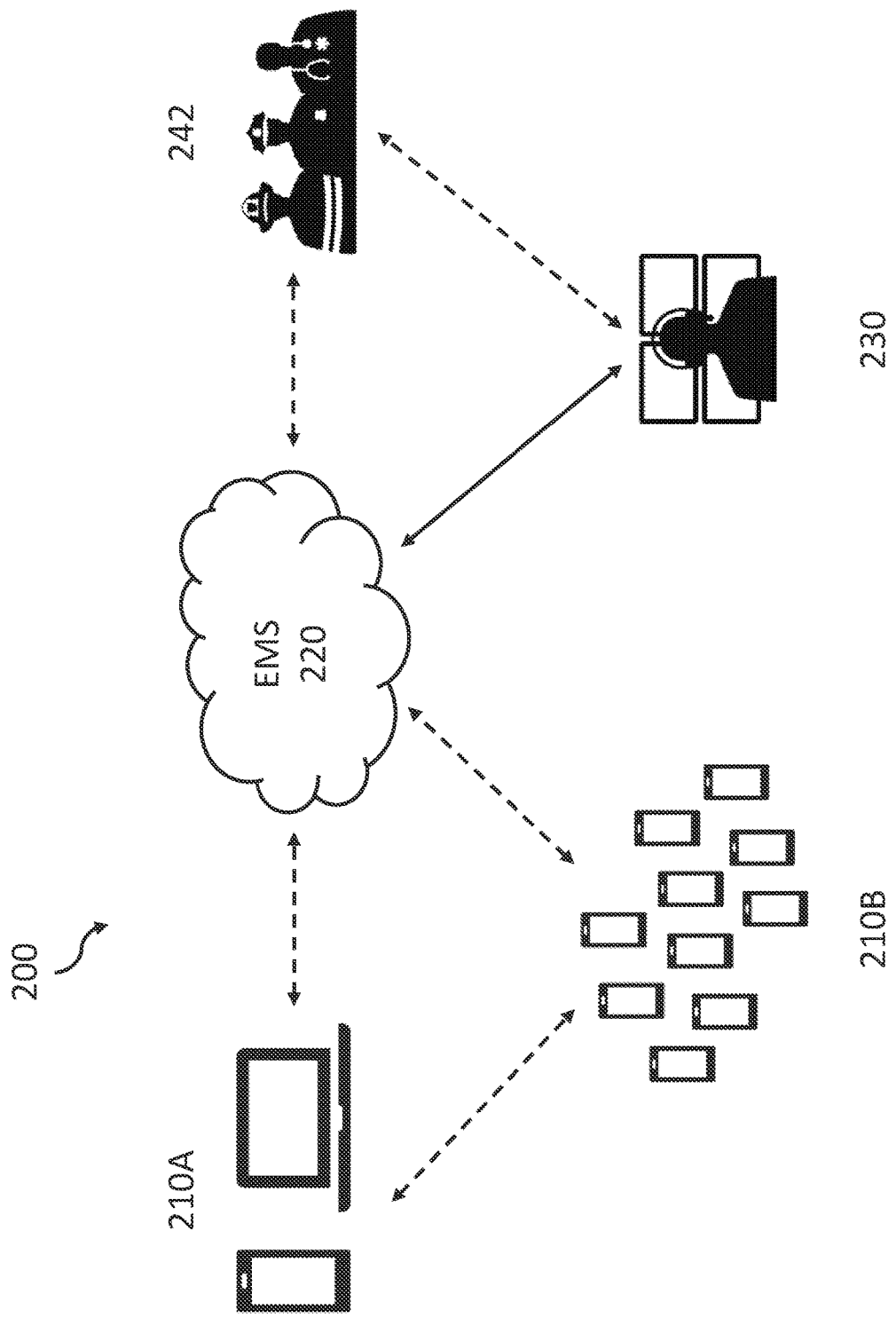
FIG. 2 depicts a non-limiting example of a system for facilitating emergency communications during an emergency by an emergency management system in accordance with one embodiment of the present disclosure.

FIG. 2 depicts an embodiment of a system 200 for facilitating emergency communications during an emergency by an emergency management system in accordance with one embodiment of the present disclosure. In some embodiments, the system includes an electronic device 210A, an emergency management system (EMS) 220, an emergency service provider (ESP) 230 (e.g., a public safety answering point (PSAP) or emergency dispatch center (EDC)), and one or more emergency responders 242. In some embodiments, the system additionally includes a group of electronic devices 210B. As mentioned above, in some embodiments, when the emergency management system 220 identifies one or more users at risk of an emergency (such as by receiving an emergency alert in response to a 9-1-1 call dialed on a mobile phone in the United States), the emergency management system 220 initiates an autonomous communication session with one or more communication devices 210 (e.g., the electronic device 210A or the group of electronic devices 210B) through which users of the communication devices 210 can submit critical information regarding their emergencies. Through the autonomous communication session, the EMS 220 can gather emergency information regarding the emergency, as described below. The EMS 220 can then transmit the emergency information gathered through the autonomous communication session to an emergency service provider (ESP) 230, such as a public safety answering point (PSAP) or an emergency dispatch center (EDC).

The EMS 220 can identify a user at risk of an emergency in numerous ways. For example, in some embodiments, as depicted in FIG. 2, an electronic device 210 can generate and/or transmit an emergency alert to the EMS 220. In such an embodiment, the EMS can identify a user at risk of an emergency using the emergency alert. In some embodiments, an electronic device 210 generates and transmits an emergency alert to the EMS 220 in response to an emergency call (e.g., 9-1-1) being made from the electronic device 210. In some embodiments, the emergency alert includes a location of the electronic device 210. In some embodiments, the electronic device 210 that generates and/or transmits the emergency alert to the EMS 220 is not a communication device. For example, the electronic device 210 may be a wearable device with no communication elements or an IoT device with no communication elements. In some embodiments, the emergency management system 220 receives an emergency alert from other sources other than an electronic device 210. For example, in some embodiments, the emergency management system 220 receives an emergency alert indicating that a group emergency (an emergency affecting a large number of people, such as a flash flood, hurricane, or wildfire) has occurred. In some embodiments, a group emergency may be a state of emergency declared by a government official. For example, in the case of a wildfire, a government official may issue an evacuation order for people within a certain vicinity of the wildfire. In some embodiments, the EMS 220 can then detect and identify the evacuation order as an emergency alert. In response to detecting the evacuation order (e.g., the emergency alert), the EMS 220 can identify communication devices located within the vicinity (e.g., 50 miles) of the wildfire and initiate autonomous communication sessions with those communication devices. In some embodiments, an electronic device (e.g., a communication device) is determined to be associated with a user by querying a database with identifying information for the electronic device, wherein the database is configured to store user profiles linked to associated electronic devices.

In some embodiments, the EMS 220 can identify a user at risk of an emergency by identifying or detecting an emergency response anomaly. Emergency response anomalies can exist in various forms. For example, the EMS 220 can detect an emergency response anomaly if the EMS 220 receives significantly more or significantly fewer emergency alerts than average for a particular period of time. Or, for example, the EMS 220 can detect an emergency response anomaly if an emergency alert is not responded to. In some embodiments, the EMS 220 can detect an emergency response anomaly based on anomalous or missing data included in an emergency alert. For example, in some embodiments, after an emergency call is made from an electronic device 210, the electronic device 210 can send an emergency alert to the EMS 220 (as described above) including an indication of whether or not the emergency call was received or answered by an ESP 230. In such an embodiment, the EMS 220 can detect an emergency response anomaly if the emergency alert includes an indication that the emergency call was not received or answered by an ESP 230. In some embodiments, the EMS 220 can detect an emergency response anomaly based on data or information received from a third-party source. However, the EMS 220 can detect an emergency response anomaly in any other way.

For example, in some embodiments, the EMS 220 stores emergency data received from various sources (e.g., electronic devices communicatively coupled to the EMS 220). During an emergency, a user of an electronic device can generate an emergency alert (as described above) that is received (along with any available emergency data, such as a location of the electronic device) by the EMS 220. An emergency service provider can then query the EMS 220 for emergency data pertinent to the emergency. In some embodiments, the EMS 220 detects a potential emergency response anomaly if the EMS 220 receives an emergency alert associated with an emergency but does not receive a query for emergency data regarding the emergency. In some embodiments, when the EMS 220 receives an emergency alert associated with an emergency and the emergency alert includes a location of the electronic device that generated the emergency alert, the EMS 220 determines one or more ESPs appropriate to respond the emergency based on the location included in the emergency alert. In some embodiments, the EMS 220 can then detect a potential emergency response anomaly if the EMS 220 does not receive a query for emergency data regarding the emergency from the one or more ESPs determined to be appropriate for responding to the emergency. In some embodiments, the EMS 220 detects a potential emergency response anomaly if the EMS 220 receives multiple emergency alerts including respective locations within a predetermined proximity and period of time but does not receive queries for emergency data corresponding to the multiple emergency alerts. In some embodiments, the EMS 220 detects a potential emergency response anomaly if the EMS 220 receives multiple emergency alerts including respective locations for which the same one or more ESPs are determined to be appropriate for responding, but does not receive queries for emergency data corresponding to the multiple emergency alerts from the one or more ESPs. A potential emergency response anomaly detected by the EMS 220 could indicate that one or more ESPs are experiencing technical or operational difficulties. For example, the EMS 220 may not receive a query for emergency data from an ESP if the ESP has lost power due to an electrical blackout. Or, for example, the EMS 220 may not receive a query for emergency data from an ESP if the ESP is responding to a mass emergency and is receiving more requests for help than the ESP is able to respond to. In response to detecting a potential emergency response anomaly, the EMS 220 can initiate an autonomous communication session with an electronic device that generated an emergency alert for which no query for emergency data was received.

In some embodiments, the EMS 220 can identify a user at risk of an emergency using an electronic or digital communication from an emergency service provider (ESP) 230. For example, in some embodiments, an ESP 230 (or a member of an ESP) can transmit a request to initiate an autonomous communication session (as described below) to the EMS 220 through an emergency response application (as described below). In some embodiments, the request includes an identifier of a user associated with the request (e.g., a phone number or email address) that the EMS 220 can then use to identify the user associated with the request as a user at risk of an emergency. In some embodiments, the request is sent in response to an emergency call received by the ESP 230 being dropped, as described below. In some embodiments, the request is sent in response to an emergency call made from an electronic device 210A not being received by the ESP 230, as described below.

After identifying a user at risk of an emergency, the EMS 220 can then initiate an autonomous communication session with a communication device associated with the user. For example, in response to receiving an emergency alert, the EMS 220 can initiate an autonomous communication session with the electronic device 210 that generated and/or transmitted the emergency alert to the EMS 220. In some embodiments, if the electronic device 210 that generated and/or transmitted the emergency alert to the EMS 220 is not a communication device, the EMS 220 can identify a separate communication device associated with the electronic device 210 to initiate the autonomous communication session with. For example, if the electronic device 210 that generated and/or transmitted the emergency alert to the EMS 220 is a wearable device lacking communication elements, the EMS 220 can identify a cell phone communicatively coupled to the wearable device (e.g., via Wi-Fi or Bluetooth) or associated with the same user (e.g., the same user account, such as an email address) to initiate an autonomous communication session with. In some embodiments, the EMS 220 can additionally or alternatively initiate an autonomous communication session with a group of communication devices 210B associated with users who may be affected by the emergency. For example, in response to detecting an emergency at a particular location, the EMS 220 can identify communication devices in the vicinity of the emergency (e.g., within a one-mile radius from the particular location) and initiate autonomous communication sessions with the communication devices identified as in the vicinity of the emergency. In this way, the EMS 220 can gather emergency information about the emergency from users directly affected by the emergency, as well as from bystanders, who may be valuable sources of emergency information. Additionally, in this way, the EMS 220 can alert users who are not yet directly affected by the emergency but may potentially be in imminent danger.

Figure 3:
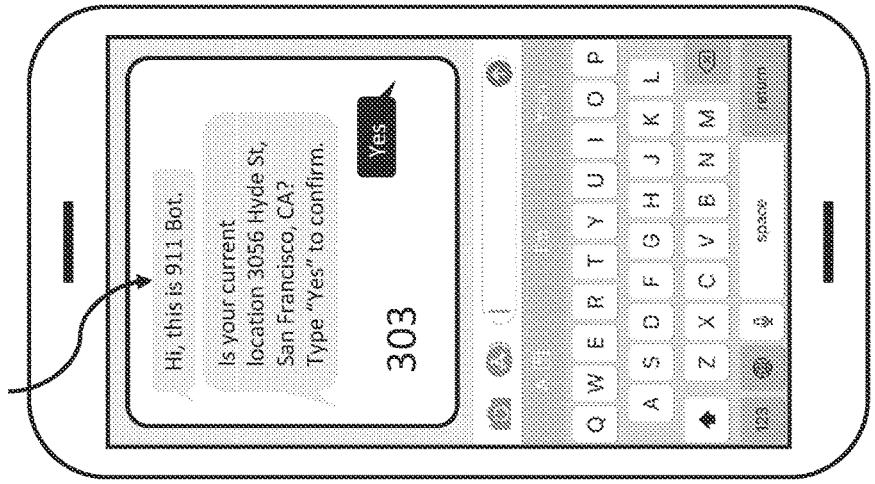
FIG. 3 illustrates a non-limiting example of an emergency response message and autonomous communication session in accordance with the present disclosure.
Figure 3:
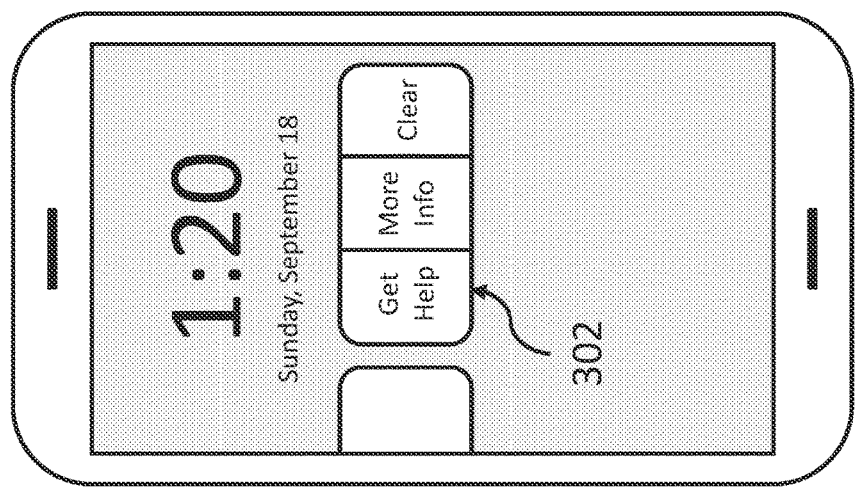
Figure 3:
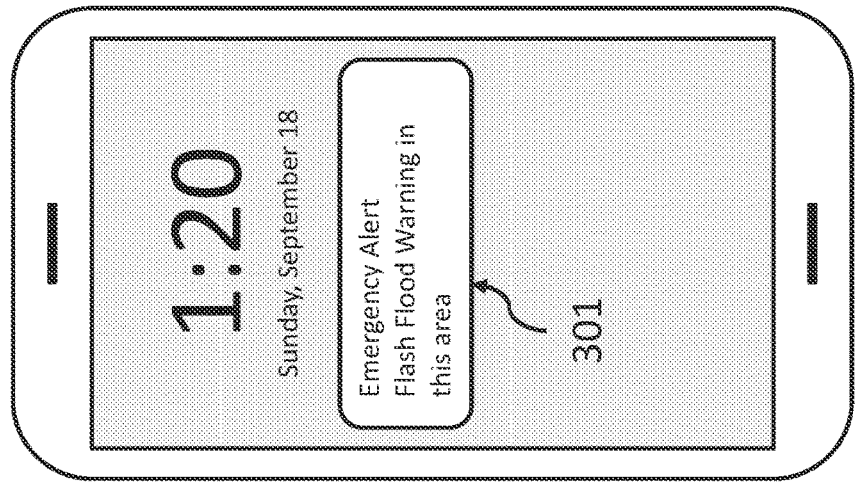

FIG. 3 illustrates an emergency response prompt and autonomous communication session in accordance with one embodiment of the present disclosure. In some embodiments, as mentioned above, the EMS, in response to identifying one or more users at risk of an emergency, can initiate an autonomous communication session with one or more communication devices associated with the one or more users. In some embodiments, as depicted by FIG. 3, before initiating an autonomous communication session 303, the EMS seeks to obtain confirmation of the emergency by transmitting an emergency response prompt 301 to a communication device 310. In some embodiments, the emergency response prompt 301 is a push notification. After the emergency response prompt 301 is transmitted to the communication device 310, a user of the communication device can confirm the emergency by confirming the emergency response prompt 301. For example, in an embodiment in which the emergency response prompt is a push notification, a user can confirm the push notification by swiping the push notification or otherwise selecting the push notification, such as by selecting the "Get Help" button 302 depicted in FIG. 3. Confirming the emergency response prompt 301 transmits confirmation of the emergency to the EMS. In some embodiments, after receiving confirmation of the emergency, the EMS then initiates the autonomous communication session 303.

Figure 5:
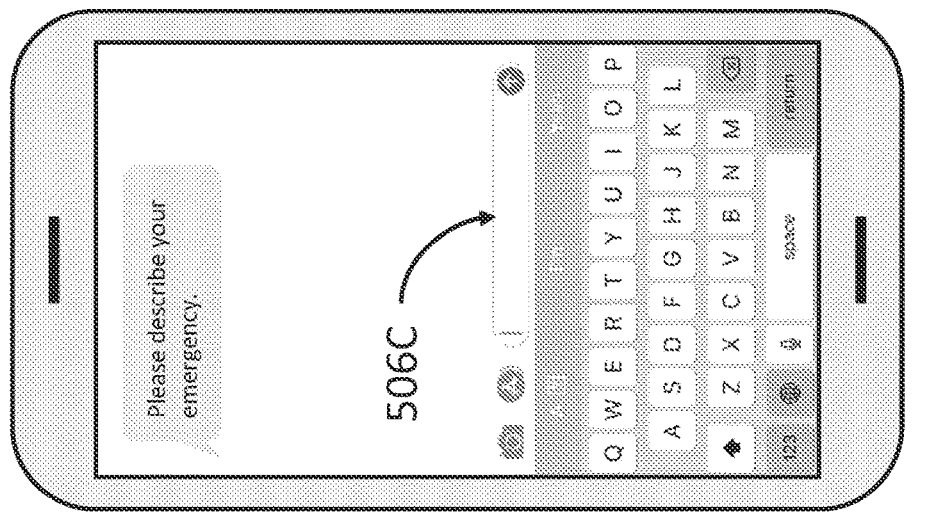
FIG. 5 illustrates a non-limiting example of an autonomous communication session in accordance with the present disclosure.
Figure 5:
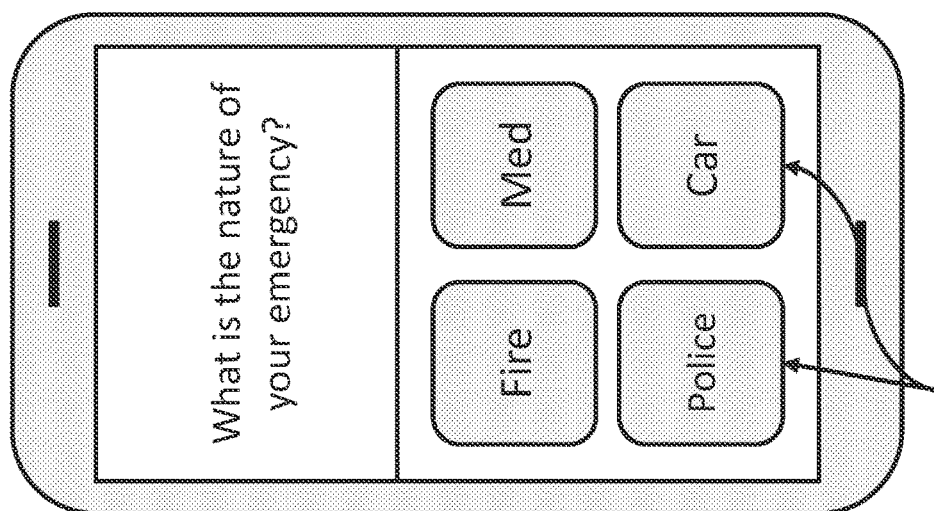
Figure 5:
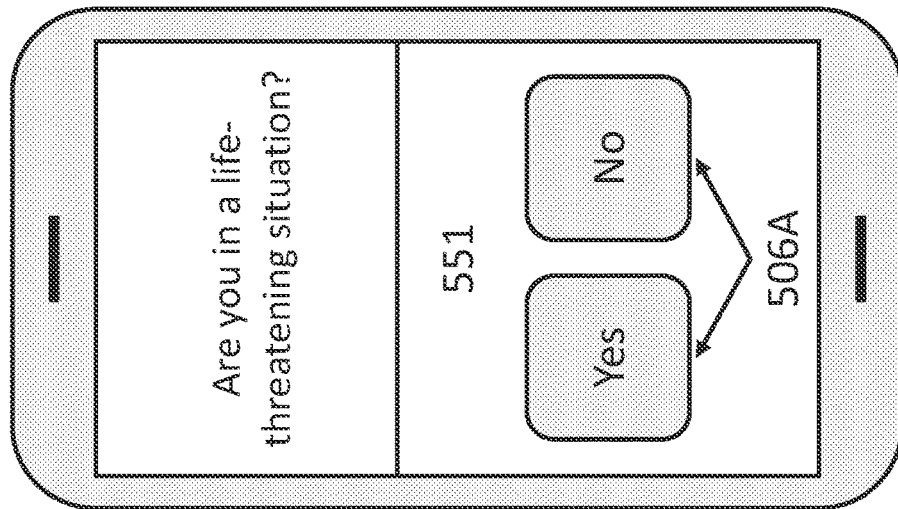

In some embodiments, as depicted by FIG. 3, the EMS transmits one or more messages 304 to the communication device 310 during the autonomous communication session 303. In some embodiments, the one or more messages 304 are SMS text messages. In some embodiments, the EMS poses questions to the user of the communication device through the one or more messages 304. The EMS can then extract emergency information from the autonomous communication session in the form of answers from the user to the questions posed through the communication device. For example, in some embodiments, the EMS can pose questions to the user of the communication device regarding the user's location or the nature of the user's emergency. However, the EMS can pose a question of any nature to the user through the autonomous communication session 303. In some embodiments, the messages 304 are transmitted to the communication device 310 according to a predetermined script. For example, in some embodiments, the autonomous communication session 303 is preconfigured to begin with two consecutive messages (as depicted by FIG. 3): 1) "Hi, this is 911 Bot." and 2) "Is your current location [insert location associated with emergency alert]? Type "Yes" to confirm." In this example, after receiving a response from the user, the autonomous communication session 303 may be preconfigured to continue by sending a third message to the user asking the user if the they are in a life-threatening situation, as depicted in FIG. 5. In some embodiments, the sequence of messages transmitted to the user during the autonomous communication session 303 is adapted dynamically based on responses received from the user. For example, in some embodiments, if the user indicates that they are in a life-threatening situation, the autonomous communication session 303 may respond by prompting the user to find a safer environment, if possible. If the user indicates that they are not in a life-threatening situation, the autonomous communication session 303 may respond by asking the user for more details regarding the emergency, as depicted in FIG. 5. In some embodiments, the predetermined script or sequence of messages is trained or generated using machine learning algorithms, as described below.

Figure 4:
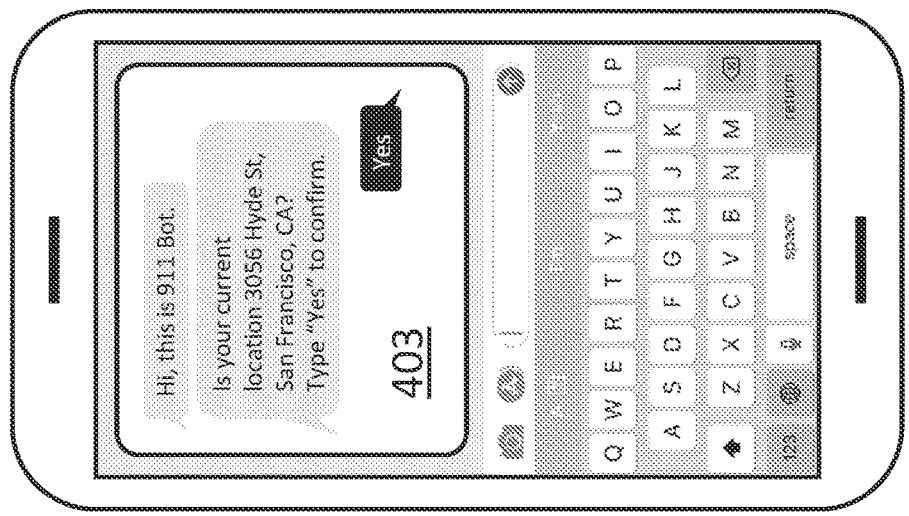
FIG. 4 illustrates a non-limiting example of an emergency response message and autonomous communication session in accordance with the present disclosure.
Figure 4:
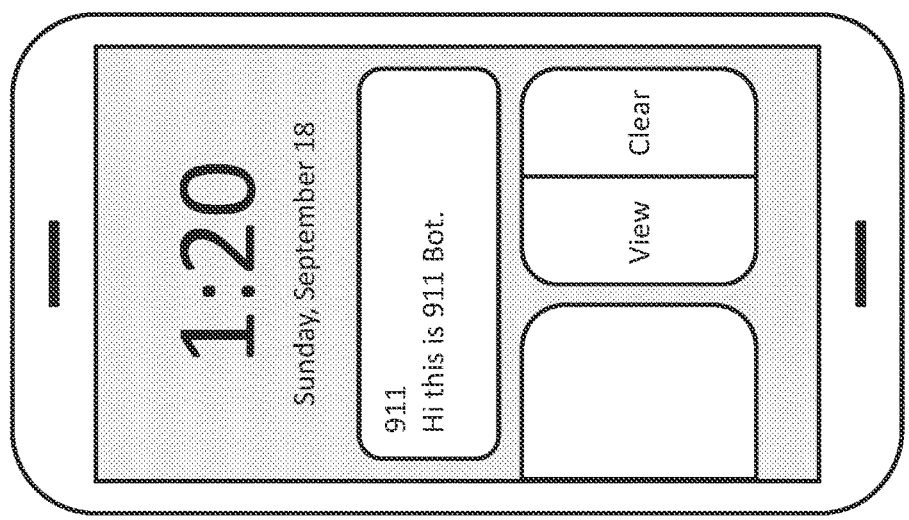
Figure 4:
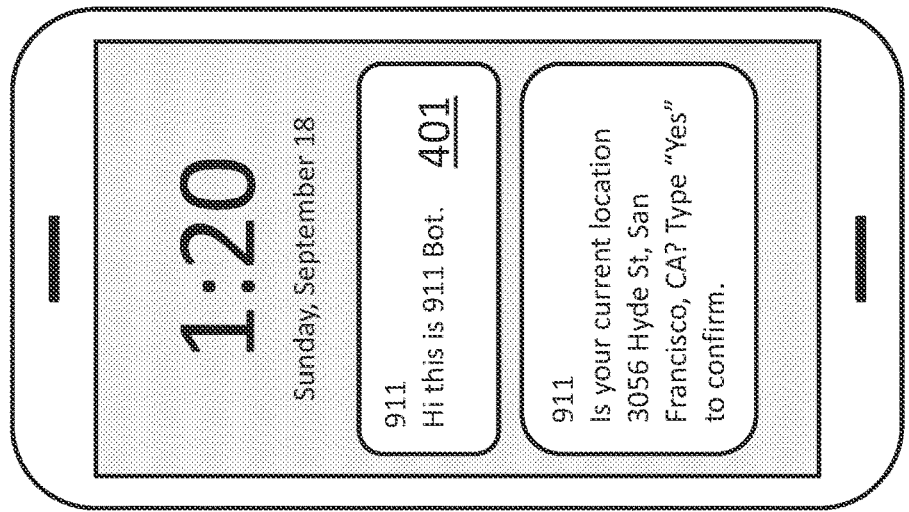

FIG. 4 illustrates an emergency response prompt and autonomous communication session in accordance with one embodiment of the present disclosure. As mentioned above with respect to FIG. 3, in some embodiments, the EMS, in response to detecting an emergency or a potential emergency, can initiate an autonomous communication session with one or more communication devices. In some embodiments, as depicted by FIG. 4, the EMS can initiate an autonomous communication session 403 with a communication device 410 by transmitting an emergency response prompt 401 to the communication device 410. In some embodiments, the emergency response prompt 401 is an SMS text message. In some embodiments, the emergency response prompt 401 includes two or more discrete messages. After the emergency response message 401 is transmitted to the communication device 410, a user of the communication device can confirm the emergency by responding to or otherwise interacting with the emergency response prompt 401. For example, in an embodiment in which the emergency response prompt 401 is an SMS text message, a user can confirm the emergency by replying to the SMS text message with another SMS text message. For example, as depicted in FIG. 4, the emergency response prompt 401 includes an SMS text message that from 9-1-1 that reads "Is your current location 306 Hyde St., San Francisco, CA? Type "Yes" to confirm." In this example, a user can open the SMS text message and respond with an SMS text message that says "Yes."

FIG. 5 illustrates an autonomous communication session in accordance with one embodiment of the present disclosure. As mentioned above, in some embodiments, the EMS can initiate an autonomous communication session with a communication device in response to detecting an emergency or potential emergency and extract emergency information from the autonomous communication session. In some embodiments, the EMS can initiate an autonomous communication session with a communication device 510 by launching a mobile application 551 on the communication device 510, as depicted by FIG. 5. In some embodiments, the EMS launches a mobile application 551 through a web browser installed on the communication device 510. In some embodiments, the mobile application 551 is previously installed on the communication device 510. In some embodiments, as depicted by FIG. 5, the mobile application 551 includes a graphical user interface. In some embodiments, the EMS poses questions to the user of the communication device through the mobile application 551. The EMS can then extract emergency information from the autonomous communication session in the form of answers from the user to the questions posed through the mobile application 551. In some embodiments, the graphical user interface includes one or more soft buttons 506 for the user to submit answers to questions posed by the EMS through the mobile application 551. In some embodiments, the one or more soft buttons include a yes button and a no button 506A for the user to respond to yes or no questions. In some embodiments, the user can use the one or more soft buttons to respond to multiple-choice questions. For example, as depicted in FIG. 5, the EMS poses the question "What is the nature of your emergency?" through the graphical user interface and presents four soft buttons 506B as options for response: Fire, Med (i.e., a medical emergency), Police, and Car (i.e., a vehicular emergency). In some embodiments, the graphical user interface includes a text entry field 506C for the user to submit free response responses to questions posed by the EMS through the mobile application 551. In some embodiments, the EMS extracts emergency information from the autonomous communication session by parsing free response responses submitted by the user during the autonomous communication session. Parsing free response responses submitted by the user during the autonomous communication session may include parsing the responses for key words or phrases.

In some embodiments, the EMS can initiate an autonomous communication session with a communication device by delivering a voice call (e.g., an interactive call) to the communication device. For example, in some embodiments, after detecting an emergency and identifying a communication device associated with the emergency, the EMS can determine a phone number associated with the communication device and deliver an interactive call to the communication device using the phone number associated with the communication device. The EMS can then deliver one or more emergency response messages as audio messages to the communication device through the interactive call, such as through a speaker built into the communication device. In some embodiments, the audio messages are generated using text-to-speech technology. In some embodiments, during an interactive call, a user can respond to one or more emergency response messages from the EMS by verbally responding to the one or more emergency response messages through the communication device, such as through a microphone built into the communication device. In some embodiments, verbal responses received from the user through a communication device during an interactive call are converted into text using speech-to-text technology. In some embodiments, a user can respond to one or more emergency response messages from the EMS by pressing a button on the communication device (e.g., press 1 for yes, press 2 for no). In another example, the EMS can initiate an autonomous communication session with an IoT device (e.g., a smart speaker device, such as an Amazon Alexa) associated with a user at risk of an emergency having communication elements (e.g., a speaker and a microphone) by delivering a voice over internet protocol (VoIP) call to the IoT device.

Figure 6:
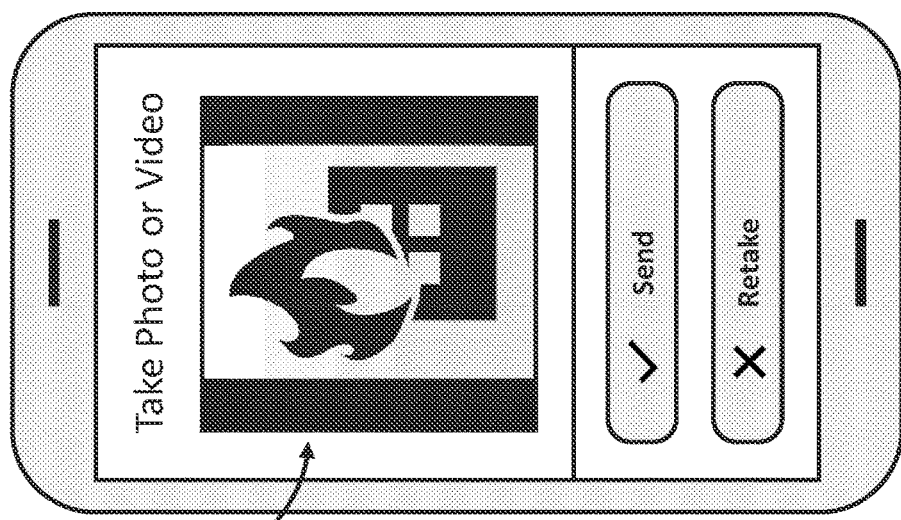
FIG. 6 illustrates a non-limiting example of an autonomous communication session in accordance with the present disclosure.
Figure 6:
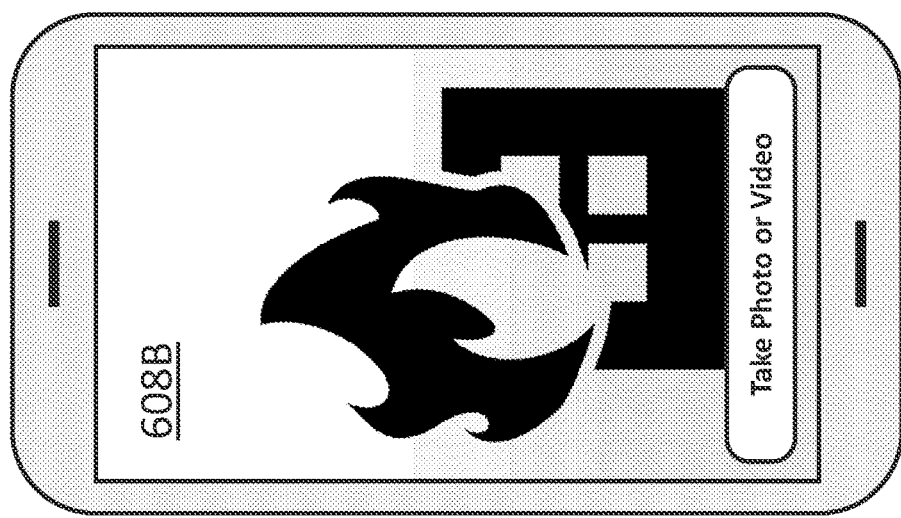
Figure 6:
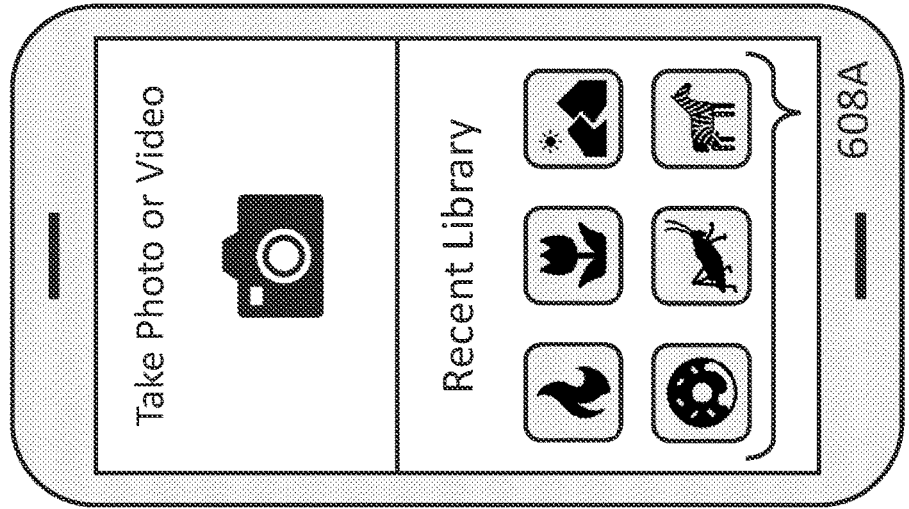

In some embodiments, a user can submit multimedia (e.g., photos or videos) pertaining to their emergency through the autonomous communication session. FIG. 6 illustrates a photo being submitted by a user to the EMS through the autonomous communication session. As shown in FIG. 6, in some embodiments, a user can submit a photo or video 608 through a mobile application 651 launched on a communication device 610 as part of an autonomous communication session. In some embodiments, during the autonomous communication session, the mobile application 651 prompts the user to submit a photo or video 608 of their emergency, if possible. As shown in FIG. 6, in some embodiments, a user may take a new photo or video 608B (e.g., by using a camera built into the communication device 610) or select an existing photo or video 608A from a library of photos and videos stored on or accessible by the communication device 610. In some embodiments, in which the autonomous communication session is conducted through a series of text messages (as described above), a user can submit a photo or video to the EMS through the autonomous communication session by sending the photo or video in a text message response during the autonomous communication session.

Figure 7A:
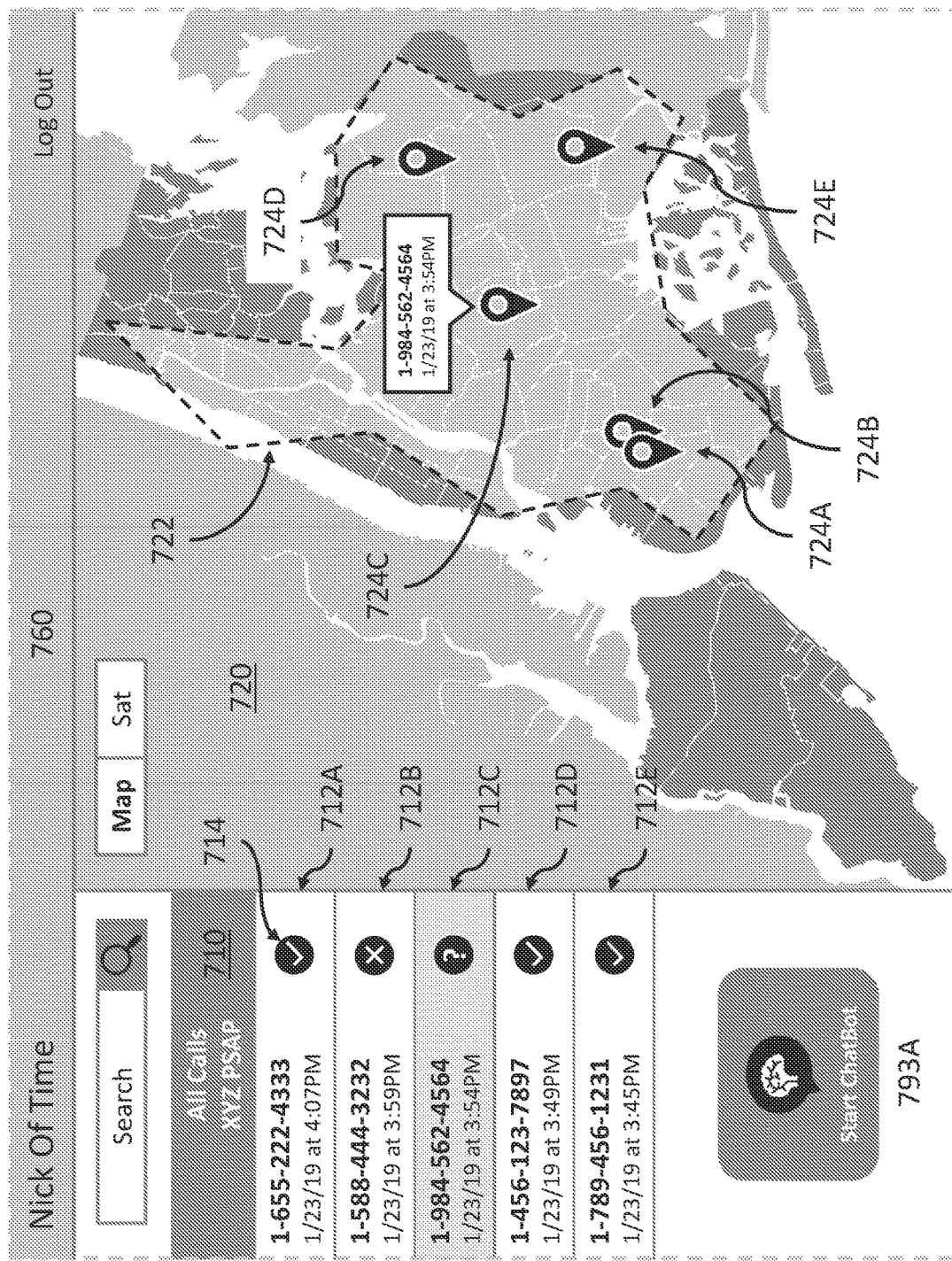
FIG. 7A and FIG. 7B illustrate a non-limiting example of an emergency response application in accordance with the present disclosure.
Figure 7B:
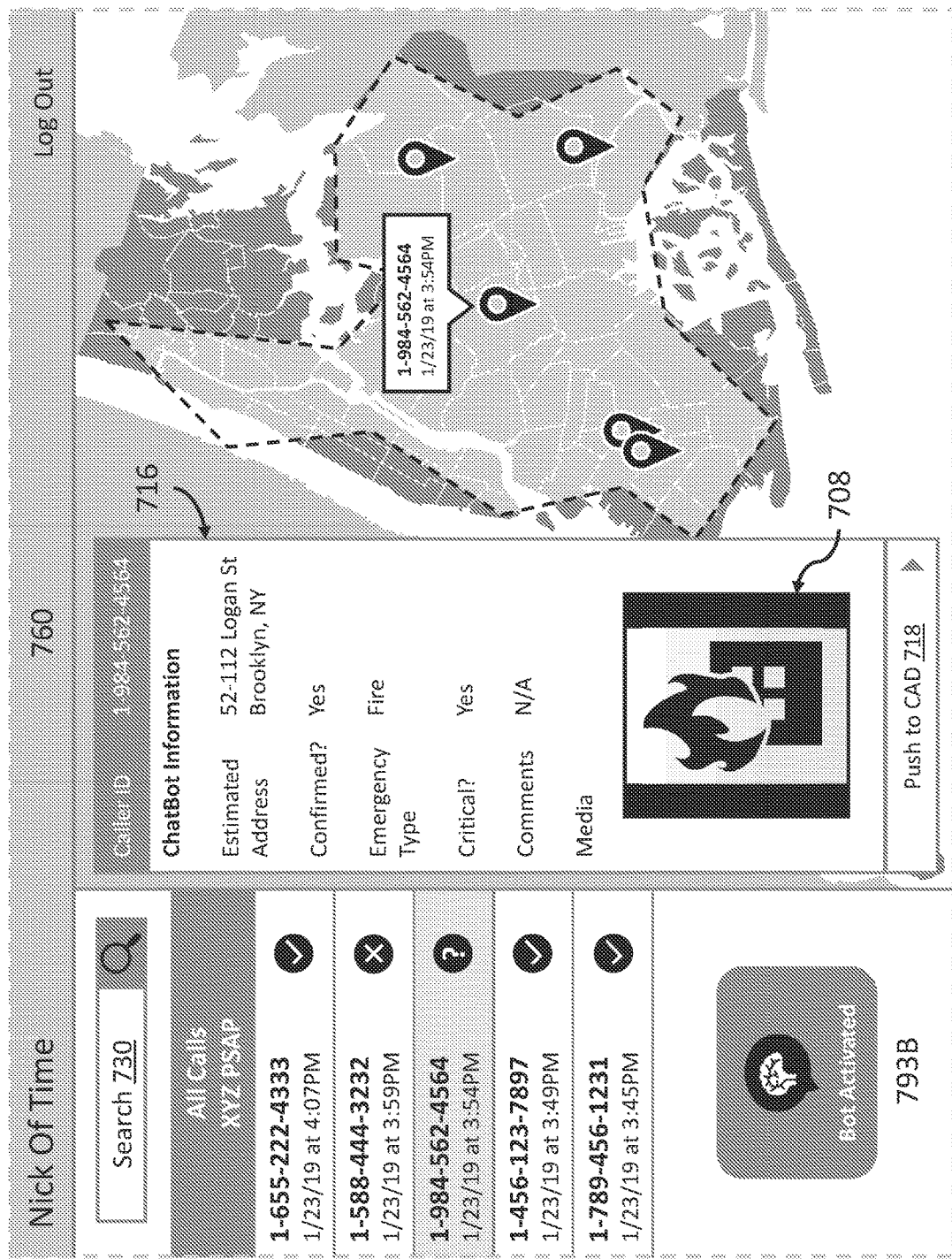

As described above, in some embodiments, the components of the system 200 (as depicted in FIG. 2) function to identify a user at risk of an emergency, initiate an autonomous communication session with a communication device 210 associated with the user, extract emergency information from the autonomous communication session, and transmit the emergency information to an emergency service provider (ESP) 230. In some embodiments, after the emergency information is transmitted to the ESP, the emergency information is then displayed within a graphical user interface (GUI) of an emergency response application. FIGS. 7A and 7B illustrate an exemplary embodiment of an emergency response application 760. In general, the emergency response application 760 functions to receive emergency data or emergency information from one or more sources (e.g., the EMS) and display the emergency data or emergency information within a GUI of the emergency response application 760. In some embodiments, the emergency response application 760 is a software program installed on a computing device at an emergency service provider (ESP). In some embodiments, the emergency response application 760 is a web application accessed through a web browser installed on a computing device at an ESP. In some embodiments, the emergency response application 760 is provided by the EMS. In some embodiments, the emergency response application 760 is not provided by the EMS but is communicatively coupled to the EMS. For example, in one embodiment, the emergency response application 760 is a computer aided dispatch (CAD) software program installed on a computing device at an ESP that receives information regarding emergency calls received by the ESP and displays the information within a GUI. In another example, the emergency response application 760 is a web application provided by the EMS that receives and displays supplemental emergency information regarding emergency calls received by the EMS (e.g., device-based hybrid locations, demographic information, health data, etc.).

Emergency response services such as PSAPs are often limited in the number of available personnel who can field emergency communications. Accordingly, in some embodiments, the emergency response application and/or the EMS triages an emergency. For example, in the case of an ongoing home invasion, the emergency may be labeled as high priority and moved to the top of a queue. Various relevant factors may be used to assess priority for purposes of triage. In some cases, the priority is based at least on a severity or a severity index as disclosed herein. Such factors may include the type of emergency, severity or scope of the emergency, personal injuries, property damage, emergency location, proximity to available emergency response personnel or resources, and other relevant information. Some of these factors can be ascertained at least partly using non-user input such as sensor or IoT data, for example, smart doorbell or home security system. In some cases, the non-user input data is obtained by querying third party databases that the EMS has authorization to access. Alternatively, or in combination, the non-user input data may be automatically pushed to the EMS or an associated EMS database.

In some embodiments, emergency communications or alerts are assigned a priority based at least in part on information gathered via the autonomous communication sessions. The priority label can be selectively implemented depending on the need for triage. For example, emergencies may be triaged by being placed in a queue in order of priority when a PSAP is overwhelmed with emergency communications or alerts (e.g., when there are not enough dispatchers to field the ongoing emergency communications or alerts). Alternatively, a triage step may not be implemented if it is determined to be unnecessary. This decision to triage can be automated using one or more rules or algorithms. For example, triage may be implemented when the number of emergency communications exceeds the available dispatchers who can field the communications. In some embodiments, the decision to implement triage is based on the volume of emergency communications exceeding a certain threshold number or percentage above capacity, for example, 10% of current emergency communications being in queue due to insufficient operators.

As illustrated in FIG. 7A, in some embodiments, the emergency response application 760 includes a list of incidents 710 and an interactive map 720. In some embodiments, the interactive map 720 displays a visualization of one or more jurisdictions 722 associated with the ESP at which the emergency response application 760 is being accessed. In some embodiments, when the emergency response application 760 receives emergency information regarding an emergency alert (e.g., an emergency call) generated within the jurisdiction 722 associated with the ESP at which the emergency response application 760 is being accessed, the emergency response application 760 displays a location associated with the emergency within the interactive map 720 as a location marker 724 and an identifier associated with the emergency alert (e.g., a device identifier, such as a phone number or email address associated with an electronic device that generated the emergency alert) within the list of incidents 710 as an incident 712. For example, in the example illustrated in FIG. 7A, the emergency response application 760 being accessed by this particular ESP shows five different incidents (incidents 712A-712E) occurring within the jurisdiction 722 of the particular ESP, corresponding to five different location markers (location markers 724A-724E). In some embodiments, an incident 712 (or its corresponding location marker 724) can be selected to perform additional actions, such as receiving additional emergency data or emergency information regarding the emergency alert represented by the incident 712 or initiating an autonomous communication session with a communication device associated with the emergency alert, as described above. In this example, incident 712C has been selected, and the device identifier and time that the associated emergency alert was generated is shown above corresponding location marker 724C, accordingly.

As described above, in some embodiments, the EMS identifies a user at risk of an emergency using an electronic or digital communication from an emergency service provider (ESP). In some embodiments, as illustrated in FIG. 7A, an ESP can transmit a digital communication to the EMS by selecting an incident 712 (or its corresponding location marker 724) and then selecting a button (such as the Start ChatBot button 793A) to initiate an autonomous communication session with an electronic device associated with the identifier associated with the incident 712. In some embodiments, an incident 712 has a status 714 associated with the incident. For example, in some embodiments, an incident 712 can have a status 714 of received/answered by the ESP (such as in the case of incident 712A, indicated by the check mark), not received/not answered by the ESP (such as in the case of incident 712B, indicated by the 'X' mark), or dropped/disconnected (such as in the case of incident 712C, indicated by the question mark). A received/answered status may be considered a "positive" status, while a not received/not answered or a dropped/disconnected status may be considered a "negative" status. In some embodiments, the status 714 of an incident 712 is included in an emergency alert associated with the incident 712. In some embodiments, in response to detecting the status 714 (e.g., a "negative status") of an incident 712, the EMS or emergency response application 760 can prompt a user of the emergency response application 760 (e.g., a call taker at a PSAP) to transmit a digital communication to the EMS identifying a user at risk of an emergency by presenting the Start ChatBot button 793A (i.e., a selectable option to initiate an autonomous communication session) within the GUI of the emergency response application 760. For example, in some embodiments, the emergency response application 760 presents the Start ChatBot 793A within the GUI of the emergency response application 760 in response to a user of the emergency response application 760 selecting an incident 712 that has a status 714 of not received/not answered or dropped/disconnected. If the user of the emergency response application 760 selects the Start ChatBot button 793A for a particular incident 712 (e.g., incident 712C, as illustrated in FIG. 7A), a digital communication is transmitted to the EMS that prompts the EMS to initiate an autonomous communication session with a communication device associated with the device identifier associated with the particular incident 712, as described above.

For example, in some embodiments, a method for facilitating emergency communications by an emergency management system (EMS) comprises: a) detecting a negative status of an emergency alert transmitted to an emergency service provider (ESP); b) presenting an option to initiate an autonomous communication session for the emergency alert within a graphical user interface (GUI) of an emergency response application executed on a computing device at the ESP; c) detecting selection of the option to initiate an autonomous communication session for the emergency alert; d) presenting an emergency response prompt at a communication device associated with the emergency alert; e) receiving confirmation of the emergency response prompt; f) in response to receiving confirmation of the emergency response prompt, initiating an autonomous communication session with the communication device; g) extracting emergency information from the autonomous communication session; h) transmitting the emergency information to the ESP; and i) displaying the emergency information through the GUI of the emergency response application.

As mentioned above, in some embodiments, the components of the system 200 (as depicted in FIG. 2) function to identify a user at risk of an emergency, initiate an autonomous communication session with a communication device 210 associated with the user, extract emergency information from the autonomous communication session, and transmit the emergency information to an emergency service provider (ESP) 230. In some embodiments, after the emergency information is transmitted to the ESP, the emergency information is then displayed within a graphical user interface (GUI) of an emergency response application 760 (as illustrated in FIGS. 7A and 7B). FIG. 7B illustrates emergency data or emergency information (some or all of which was extracted from an autonomous communication session) regarding an emergency displayed within the GUI of an emergency response application 760. For example, in the example illustrated in FIG. 7B, an emergency alert associated with the device identifier 1-984-562-4564 was generated by an electronic device associated with the device identifier on 1/23/19 at 3:54 PM. In this example, the emergency alert is associated with a location that falls within the jurisdiction of the ESP at which the emergency response application 760 is being accessed, so an incident and a corresponding location marker (as described above) are displayed within the GUI of the emergency response application 760. In this example, an emergency call associated with the emergency alert was received by the ESP but was then subsequently dropped or disconnected, as indicated by the question mark displayed on the incident within the list of incidents. In response, the emergency response application 760 presented a Start Chatbot button 793A (as illustrated in FIG. 7A) for the incident within the GUI of the emergency response application 760, and a user of the emergency response application 760 has selected the Start ChatBot button 793A, thereby delivering a digital communication to the EMS prompting the EMS to initiate an autonomous communication session with a communication device associated with the device identifier 1-984-562-4564. The Start ChatBot button 793A has now been replaced with a Bot Activated indicator 793B. After initiating the autonomous communication session with the communication device, the EMS has extracted emergency information from the autonomous communication session, and the emergency information 716 is now displayed within the GUI of the emergency response application 760. For example, as illustrated in FIG. 7B, the emergency information includes an address of the emergency, whether the emergency has been confirmed, the type of the emergency (e.g., fire), a severity of the emergency (e.g., critical), and a photo 708 of the emergency (e.g., the photo 608 transmitted to the EMS through the autonomous communication session depicted in FIG. 6). In some embodiments, a user of the emergency response application 760 can transmit or transfer emergency information extracted from an autonomous communication session to a computer aided dispatch (CAD) system, such as by selecting a Push to CAD button 718, as illustrated by FIG. 7B.

In some embodiments, the EMS transmits emergency information extracted from an autonomous communication session in real-time. For example, in some embodiments, the EMS transmits answers from a user to questions posed through an autonomous communication session to an ESP as the answers are being received. In other embodiments, the EMS waits to transmit emergency information extracted from an autonomous communication session to an ESP until the autonomous communication session has been concluded (e.g., when the predetermined script has finished and received answers to each of the questions posed during the autonomous communication session). In some embodiments, the EMS can transmit emergency data or emergency information associated with an emergency (e.g., an emergency alert) gathered from other sources (i.e., outside of an autonomous communication session; e.g., a separate database of medical information) to an ESP in addition to emergency data or emergency information extracted from an autonomous communication session. For example, if the EMS receives an emergency alert associated with a device identifier, the EMS can a) initiate an autonomous communication session with a communication device associated with the device identifier and extract emergency information from the autonomous communication session and b) simultaneously or subsequently query one or more databases within or outside of the EMS using the device identifier to receive additional emergency information associated with the emergency alert. The EMS can then transmit the emergency information extracted from the autonomous communication session and any additional emergency information received from the one or more databases within or outside of the EMS to an ESP concurrently.

Figure 8:
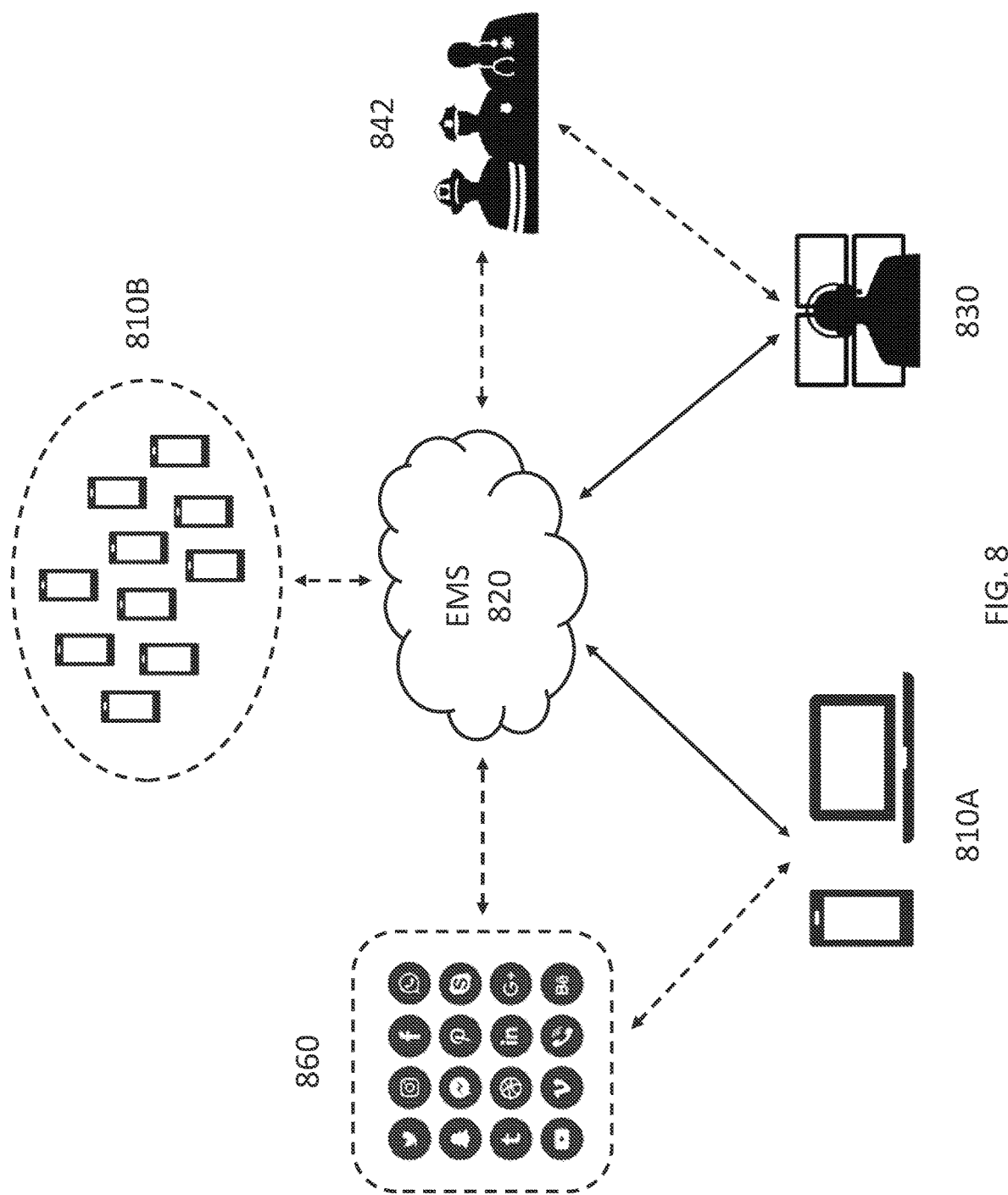
FIG. 8 depicts a non-limiting example of a system for facilitating emergency communications during an emergency by an emergency management system in accordance with the present disclosure.

FIG. 8 depicts an embodiment of a system for facilitating emergency communications during an emergency by an emergency management system in accordance with one embodiment of the present disclosure. As mentioned above, in some embodiments, the system includes an electronic device 810A, an emergency management system (EMS) 820, an emergency service provider 830 (e.g., a public safety answering point (PSAP) or emergency dispatch center (EDC)), and one or more emergency responders 842. In some embodiments, the system additionally includes one or more sources of social media data 860 (e.g., a social media feed, such as a stream or feed of Twitter posts). In some embodiments, the system additionally includes a group of electronic devices 810B.

In some embodiments, the EMS 820 receives social media data from the one or more sources of social media data 860 and analyzes the social media data for potential emergencies. For example, the EMS 820 can monitor the social media data for social media posts indicative of an emergency. In response to detecting one or more social media posts indicative of an emergency, the EMS 820 can identify one or more users potentially affected by the emergency, identify communication devices 810 associated with the one or more users, transmit emergency response messages to the communication devices 810, and, in response to receiving confirmation of the emergency response messages, initiate autonomous communication sessions with the one or more users through the communication devices 810. In some embodiments, a user potentially affected by the emergency is identified based on the one or more social media posts. For example, in some embodiments, the one or more social media posts are posted by a user potentially affected by the emergency. In some embodiments, the EMS 820 generates an emergency vicinity for the emergency based on the one or more social media posts and the one or more users potentially affected by the emergency are identified as within or potentially within the emergency vicinity. The EMS 820 can then initiate autonomous communication sessions with a group of communication devices 810B including a communication device 810 associated with each of the one or more users potentially affected by the emergency. In some embodiments, the EMS 820 receives a location from a communication device 810 associated with a user potentially affected by the emergency and confirms that the location is within the emergency vicinity before transmitting an emergency response message to the communication device 810.

Figure 9:
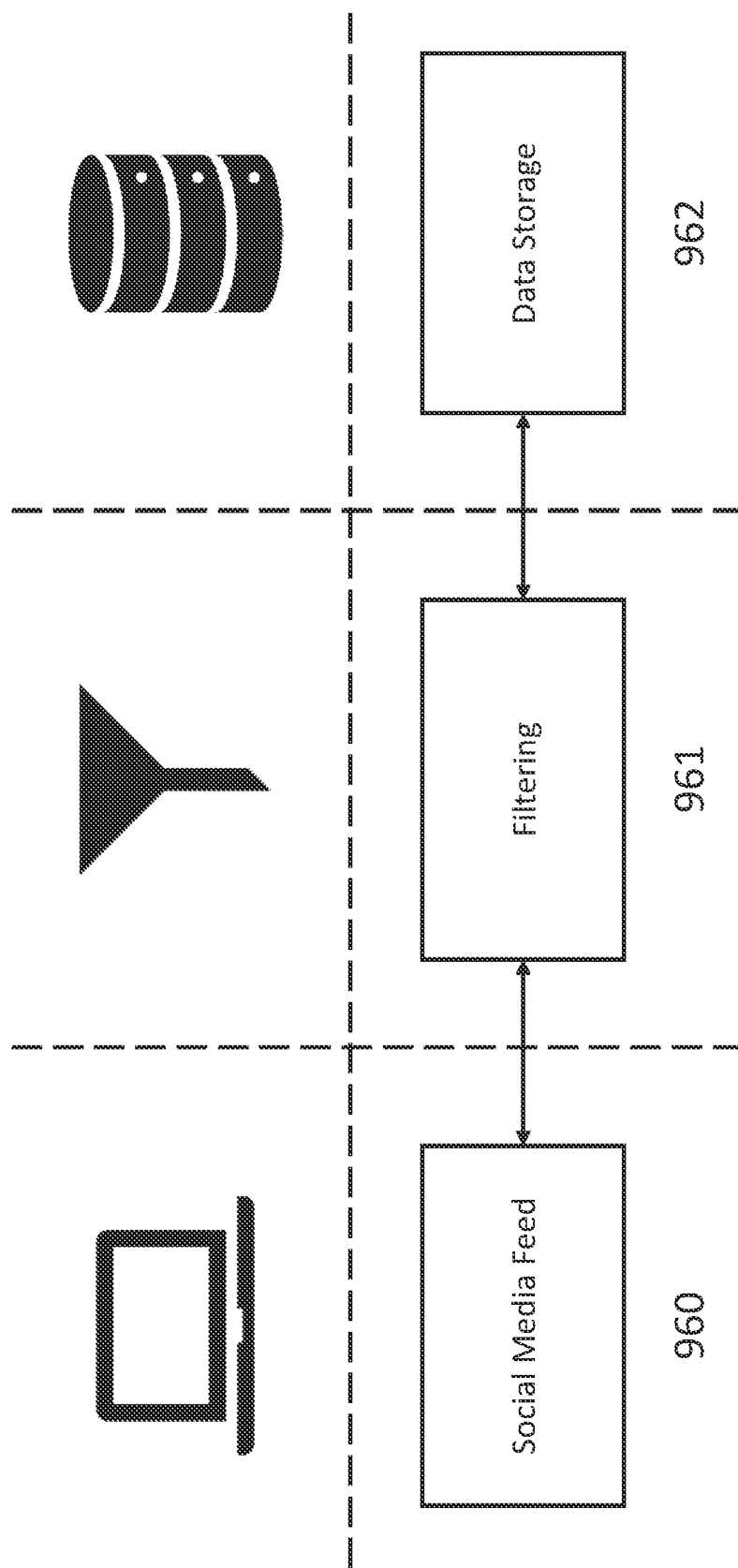
FIG. 9 depicts a non-limiting example of a system for detecting one or more social media posts indicative of an emergency in accordance with the present disclosure.

FIG. 9 depicts an embodiment of a system for detecting one or more social media posts indicative of an emergency in accordance with one embodiment of the present disclosure. As mentioned above, in some embodiments, the EMS receives social media data from the one or more sources of social media data 960 and analyzes the social media data for potential emergencies. In some embodiments, as depicted in FIG. 9, the EMS receives social media posts from a social media feed and passes the social media posts through one or more filtering layers 961. The filtering layers can filter the social media posts for location, relevancy, credibility, legitimacy, and other factors. The social media posts can then be stored in data storage 962, such as a database.

Emergency Assistant Application

Figure 10A:
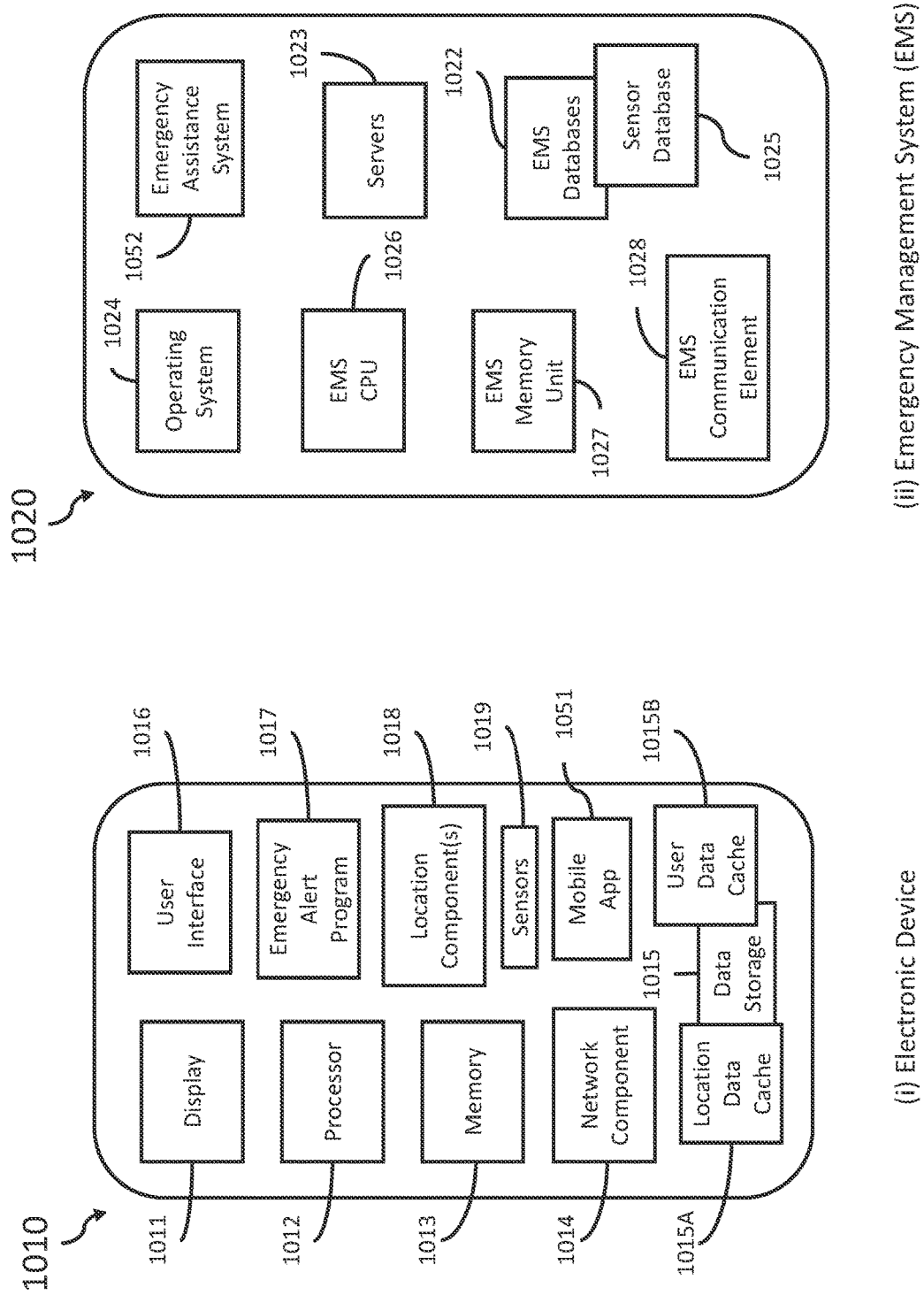
FIGS. 10A and 10B depict diagrams of (i) an electronic device, (ii) an emergency management system, (iii) an emergency service provider (ESP) system, and (iv) ESP software in accordance with one embodiment of the present disclosure.
Figure 10B:
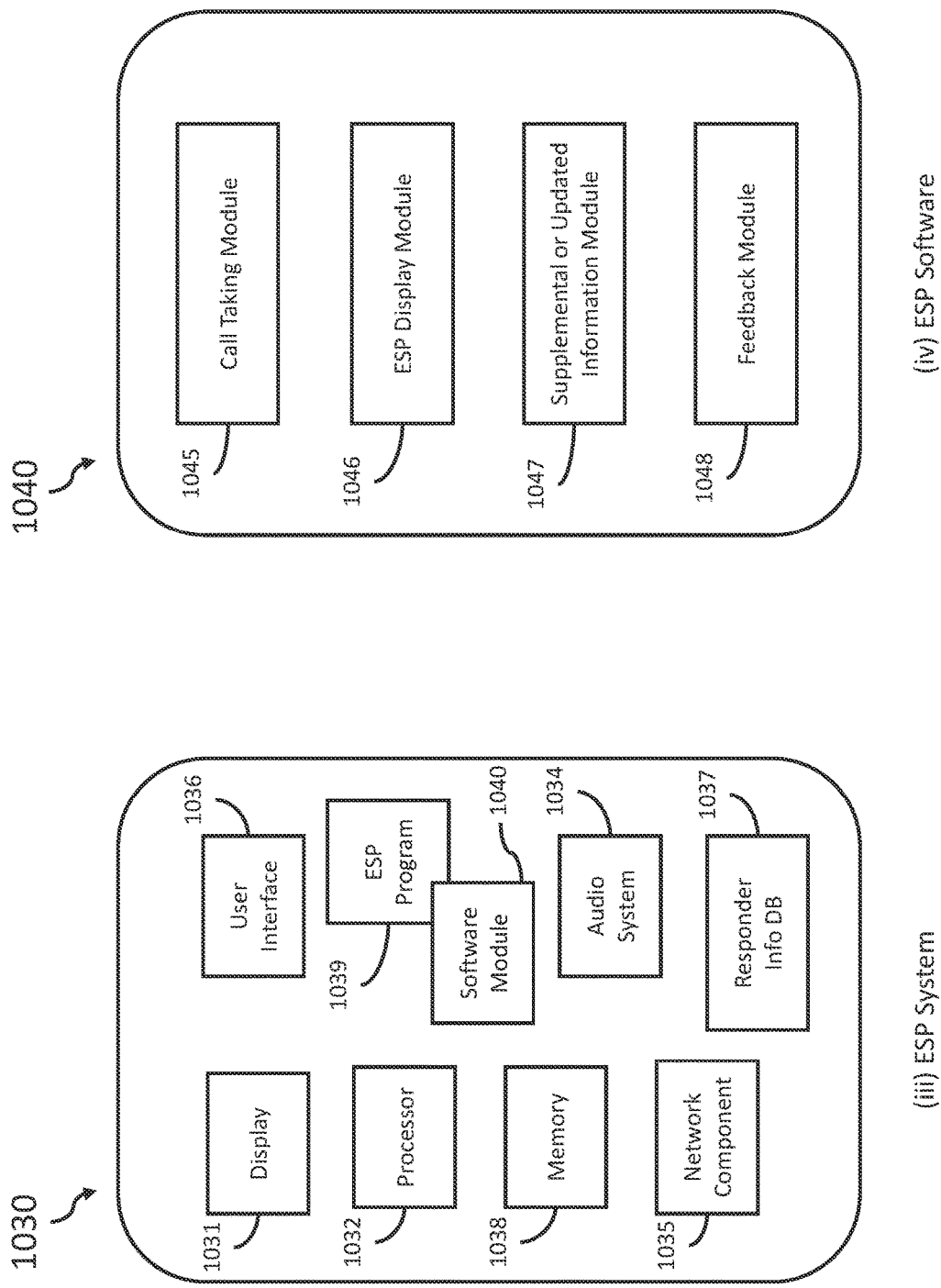

FIGS. 10A and 10B depict diagrams of (i) an electronic device 1010, (ii) an emergency management system 1020, (iii) an emergency service provider (ESP) system 1030, and (iv) ESP software 1040 in accordance with one embodiment of the present disclosure. As described above, in some embodiments, the electronic device 1010 is a digital processing device such as a communication device, wearable device, IoT device, or security monitoring device. In some embodiments, the electronic device 1010 includes a display 1011, a processor 1012, a memory 1013, and several other optional components such as one or more network components 1014, a data storage 1015, a user interface 1016, a computer program 1017, one or more location components 1018, and one or more sensors 1019. In some embodiments, the electronic device 1010 additionally or alternatively includes a mobile application 1051 (also referred to as a "mobile app") configured to perform emergency response functions in response to an emergency alert (such as an emergency alert initiated by the emergency alert program) or according to instructions from the EMS 1020. As described above, in some embodiments, the emergency management system (EMS) 1020 includes an EMS operating system 1024, an EMS CPU 1026, an EMS memory unit 1027, and an EMS communication element 1028. In some embodiments, as depicted in FIG. 10A, the EMS 1020 includes an emergency assistance system 1052 configured to provide an emergency assistant application on an electronic device 1010, as described below.

As described above, in some embodiments, an ESP 1030 is an emergency service provider (ESP) system that includes one or more of a display 1031, a memory 1038, a user interface 1036, at least one central processing unit (processor) 1032, a network component 1035, an audio system 1034, and a computer program (software) 1039. In some embodiments, the ESP software includes at least one software module 1040, such as a call taking module 1045, an ESP display module 1046, a supplemental or updated information module 1047, a feedback module 1048, or a combination thereof. In some embodiments, location and supplemental information is displayed for other emergency service providers (e.g., police, fire, medical, etc.) and/or responders on their respective devices.

Figure 11:
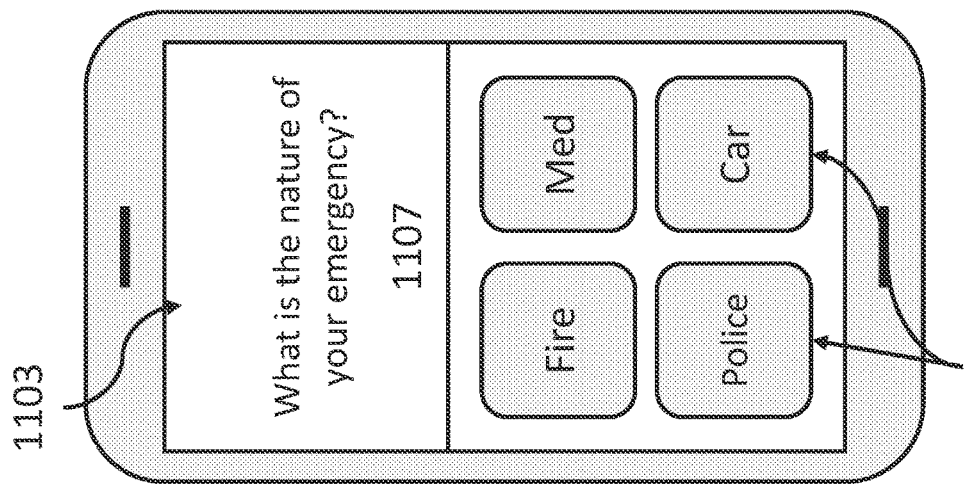
FIG. 11 illustrates a non-limiting example of an emergency assistant application in accordance with the present disclosure.
Figure 11:
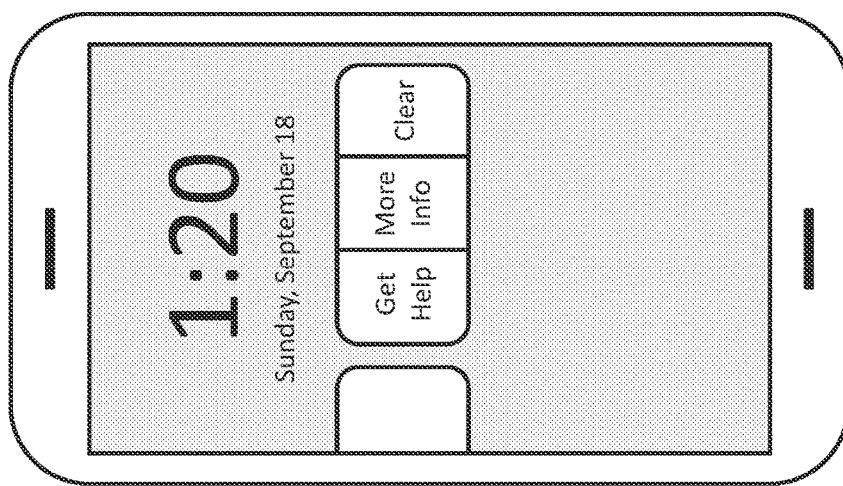
Figure 11:
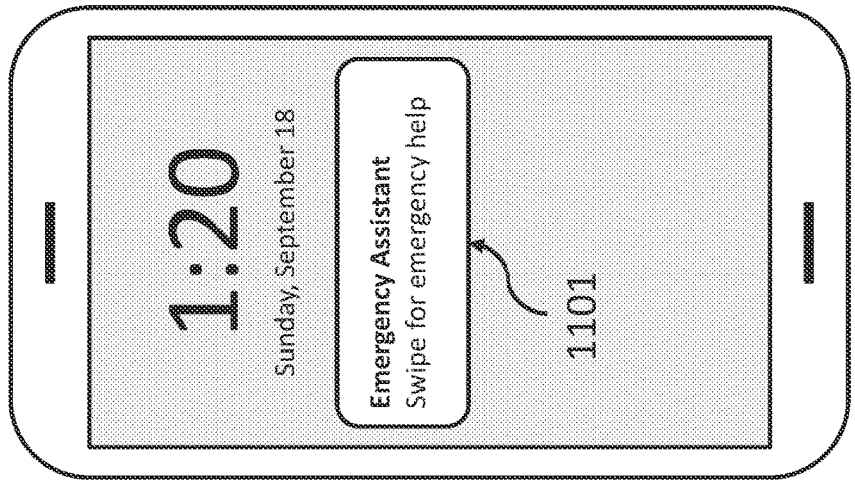

FIG. 11 illustrates an embodiment of an emergency assistant application in accordance with one embodiment of the present disclosure. In some embodiments, when an emergency alert is generated for an emergency by an electronic device (such as a 9-1-1 call being dialed on a mobile phone in the United States), the emergency management system (EMS) provides an emergency assistant application through an electronic device associated with the emergency alert to gather emergency information regarding the emergency and deliver safety recommendations to one or more persons potentially affected by the emergency. The emergency alert provides an indication of an emergency (e.g., a sign or piece of information that indicates an emergency), for example, that a user of the device that sent the alert may be at risk of an emergency. Other indications of an emergency can include an emergency communication sent by a home alarm or security system, an alert and/or sensor readings from an IoT or smart fire or carbon monoxide alarm, or a natural disaster alert for an area that the user device is located within such as a tornado warning. For example, in some embodiments, after detecting an emergency alert, the EMS can identify an electronic device associated with the emergency alert and provide an emergency assistant application through an interface of the electronic device. In some embodiments, as depicted by FIG. 11, the EMS provides the emergency assistant application 1107 through the interface of the electronic device 1110 by transmitting an emergency response message 1101 to the electronic device 1110, receiving confirmation of the emergency response message, and, in response to receiving confirmation of the emergency response message, initiating an autonomous communication session 1103 with a user of the electronic device. In some embodiments, wherein the electronic device 1110 is a communication device (e.g., a smartphone), the emergency response message 1101 is a first SMS text message and confirmation of the emergency response message is a second SMS text message received from the user in response to the first SMS text message. In some embodiments, the emergency response message 1101 is a push notification and confirmation of the emergency response message is selection of the push notification. For example, in an embodiment in which the emergency response message is a push notification, a user can confirm the push notification by swiping the push notification or otherwise selecting the push notification, such as by selecting the "Get Help" button depicted in FIG. 11. In some embodiments, the EMS initiates the autonomous communication session 1103 with the user of the electronic device by launching a mobile application on the communication device 1110. In some embodiments, the mobile application includes a graphical user interface through which the autonomous communication session 1103 is held. In some embodiments, the graphical user interface includes one or more soft buttons 1106 or text entry fields for the user to respond to questions posed through the emergency response application 1107 during the autonomous communication session 1103, as depicted in FIG. 11. For example, as depicted in FIG. 11, the EMS poses the question "What is the nature of your emergency?" through the graphical user interface and presents four soft buttons 1106 as options for response: Fire, Med (medical), Police, and Car.

Figure 12A:
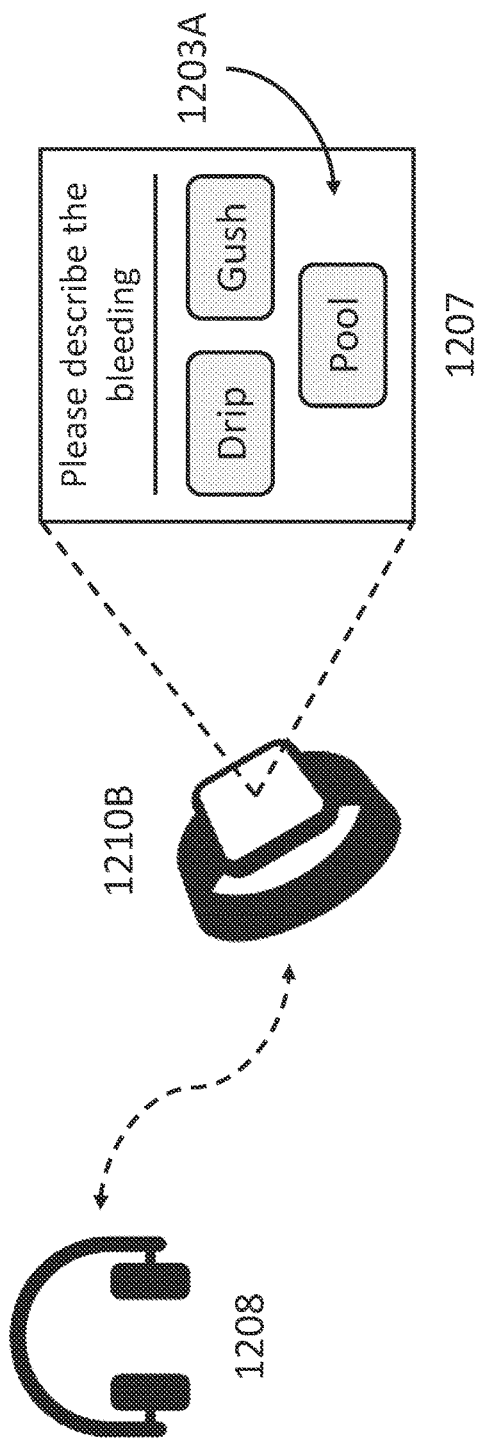
FIG. 12A and FIG. 12B illustrate non-limiting examples of an emergency assistant application implemented on various electronic devices in accordance with the present disclosure.
Figure 12B:
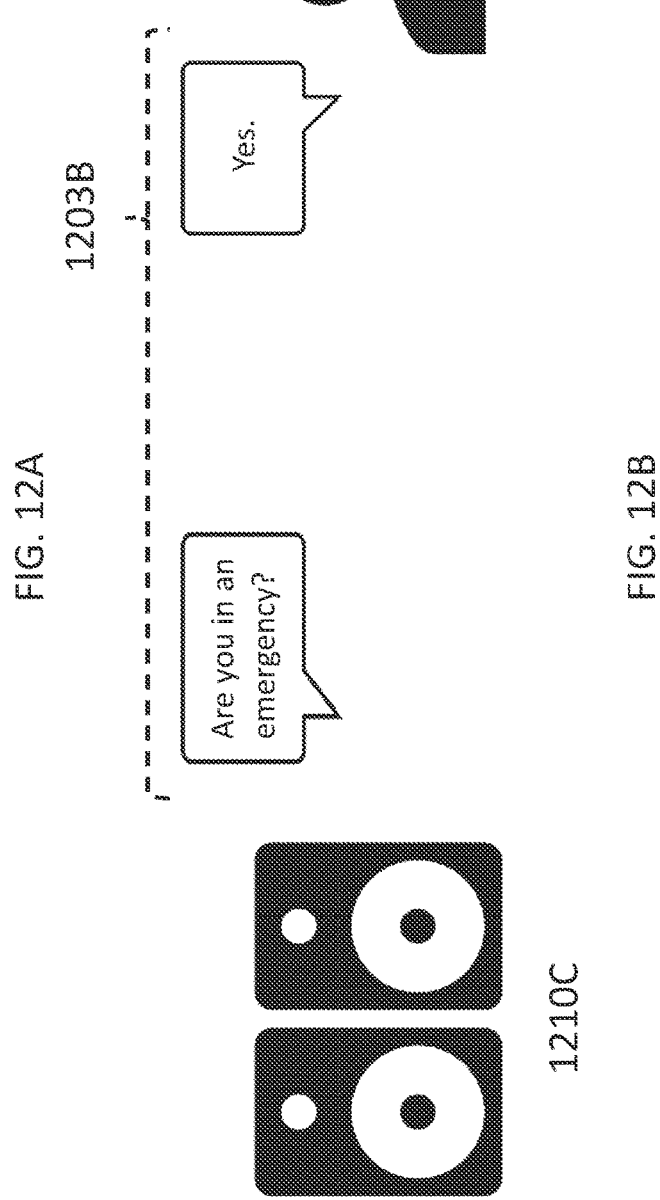

FIGS. 12A and 12B illustrate embodiments of an emergency assistant application in accordance with one embodiment of the present disclosure. As mentioned above, in some embodiments, when an emergency alert is generated for an emergency by an electronic device (such as a 9-1-1 call being dialed on a mobile phone in the United States), the emergency management system provides an emergency assistant application through an electronic device associated with the emergency alert to gather emergency information regarding the emergency and deliver safety recommendations to one or more persons potentially affected by the emergency. For example, in some embodiments, after detecting an emergency alert, the EMS can identify an electronic device associated with the emergency alert and provide an emergency assistant application through an interface of the electronic device. In some embodiments, the electronic device is one of a smartphone, a wearable device, an IoT device, or a vehicle.

In some embodiments, wherein the electronic device is a wearable device 1210B, the EMS provides the emergency assistant application 1207 through the interface of the wearable device 1210B by transmitting an emergency response message to the wearable device, receiving confirmation of the emergency response message, and, in response to receiving confirmation of the emergency response message, initiating an autonomous communication session 1203 with a user of the wearable device, as depicted in FIG. 12A. In some embodiments, the wearable device 1210B houses or is otherwise coupled to a microphone and a speaker. In such an embodiment, the EMS can transmit the emergency response message to the wearable device 1210B by audibly playing the emergency response message through the speaker and receive confirmation of the emergency response message by receiving verbal confirmation of the emergency response message through the microphone. In some embodiments, the EMS initiates the autonomous communication 1203 with the user of the wearable device by audibly playing one or more audio messages through the speaker. In some embodiments, the EMS initiates the autonomous communication session 1203A by launching a mobile application on the wearable device 1210B, as depicted by FIG. 12A. In some embodiments, the mobile application includes a graphical user interface through which the autonomous communication session 1203 is held. In some embodiments, the graphical user interface includes one or more soft buttons for the user to respond to questions during the autonomous communication session 1203, as depicted by FIG. 12A.

In some embodiments, wherein the electronic device is an IoT device 1210C housing or otherwise coupled to a microphone and a speaker, the EMS provides the emergency assistant application through the interface of the IoT device 1210C by transmitting an emergency response message to the IoT device 1210C, audibly playing the emergency response message through the speaker, receiving verbal confirmation of the emergency response message through the microphone, and, in response to receiving verbal confirmation of the emergency response message, initiating an autonomous communication session with a user of the IoT device, wherein the autonomous communication session is held using the speaker and microphone. In some embodiments, the EMS initiates the autonomous communication session 1203B with the user by audibly playing one or more audio messages through the speaker, as depicted by FIG. 12B.

In some embodiments, the electronic device is communicatively coupled to a headset 1008 housing or otherwise coupled to a microphone and a speaker. In such an embodiment, the EMS can provide the emergency assistant application through the interface of the electronic device by transmitting an emergency response message to the electronic device, audibly playing the emergency response message through the speaker, receiving verbal confirmation of the emergency response message through the microphone, and, in response to receiving verbal confirmation of the emergency response message, initiating an autonomous communication session with a user of the electronic device. In some embodiments, the EMS initiates the autonomous communication session by audibly playing one or more audio messages through the speaker. In some embodiments, the electronic device is a communication device, such as a smartphone. In some embodiments, the electronic device is a wearable device 1210B.

Figure 13:
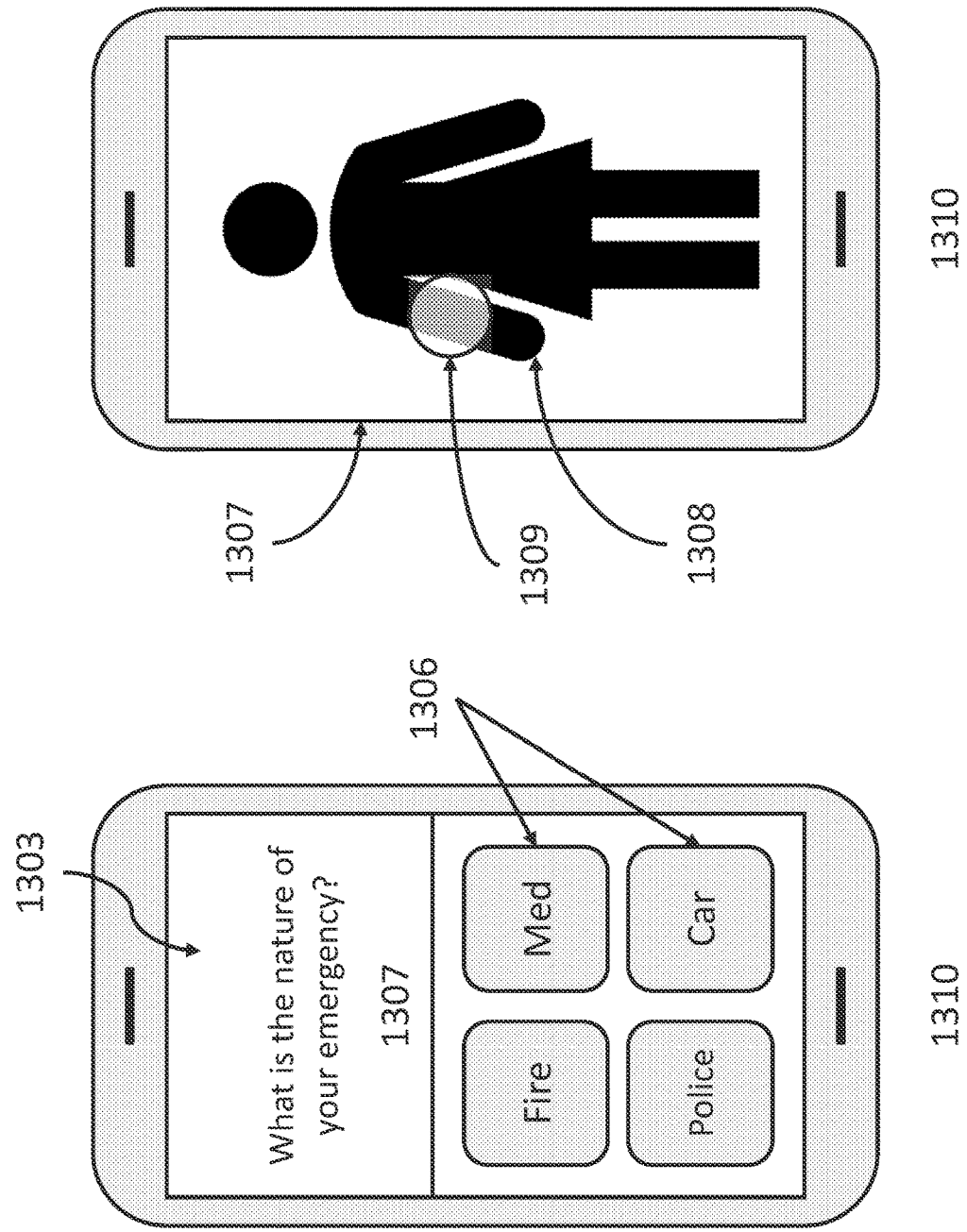
FIG. 13 illustrates a non-limiting example of an emergency assistant application in accordance with the present disclosure.

FIG. 13 illustrates an embodiment of an emergency assistant application 1307 in accordance with one embodiment of the present disclosure. As mentioned above, in some embodiments, when an emergency alert is generated for an emergency by an electronic device (such as a 9-1-1 call being dialed on a mobile phone in the United States), the emergency management system (EMS) provides an emergency assistant application through an electronic device associated with the emergency alert to gather emergency information regarding the emergency and deliver safety recommendations to one or more persons potentially affected by the emergency. In some embodiments, the electronic device is one of a smartphone, a wearable device, an IoT device, or a vehicle. In some embodiments, wherein the electronic device is a communication device (e.g., a smartphone), the EMS provides an emergency assistant application through an interface of the communication device by initiating an autonomous communication session with a user of the communication device, as described above. In such an embodiment, the EMS can receive emergency information obtained through the interface of the electronic device by receiving one or more SMS text messages from the communication device and extracting the emergency information from the one or more SMS text messages.

In some embodiments, wherein the electronic device 1310 is a communication device or a wearable device, the EMS provides an emergency assistant application 1307 through an interface of the communication device or wearable device by launching a mobile application on the communication device or wearable device, as described above. In some embodiments, the mobile application includes a graphical user interface through which an autonomous communication session 1303 is held, and the graphical user interface includes one or more soft buttons 1306 or text entry fields for the user to respond to questions posed through the emergency assistant application 1107 during the autonomous communication session 1303, as depicted by FIG. 13. In such an embodiment, the EMS can receive emergency information through the interface of the communication device or wearable device by receiving, from a user of the communication device or wearable device, responses to questions posed through the emergency assistant application 1307 during the autonomous communication session 1303. In some embodiments, wherein the electronic device is an IoT device housing or otherwise coupled to a microphone and a speaker, or wherein the electronic device is coupled to a headset housing or otherwise coupled to a microphone and a speaker, the EMS can provide the emergency assistant application through the interface of the electronic device by initiating an autonomous communication session held using the speaker and microphone, as described above. In such an embodiment, the EMS can receive emergency information obtained through the interface of the electronic device by receiving, from a user of the electronic device, verbal responses to questions posed through the emergency assistant application during the autonomous communication session.

In some embodiments, after initiating an autonomous communication session with an electronic device, the EMS poses questions to the user through the emergency assistant application. In some embodiments, the questions posed through the emergency assistant application are limited to a predetermined number of questions. In some embodiments, the predetermined number of questions is two or three. In some embodiments, one of the questions posed to the user through the emergency assistant application prompts the user to identify a nature of the emergency, as depicted in FIG. 13. In some embodiments, one of the questions posed to the user through the emergency assistant application 1307 prompts the user to identify an afflicted body part. In embodiments, the EMS receives a verbal response from the user identifying an afflicted body part. In some embodiments, the EMS provides a virtual body diagram 1308 through the interface of the electronic device, as depicted in FIG. 13, and receives a response identifying the afflicted body part 1309, from the user, through the virtual body diagram 1308 provided through the interface of the electronic device 1310. For example, in some embodiments, a user can tap on their afflicted body part 1309 on the virtual body diagram 1308 presented through the graphical user interface of the electronic device 1310.

Figure 14:
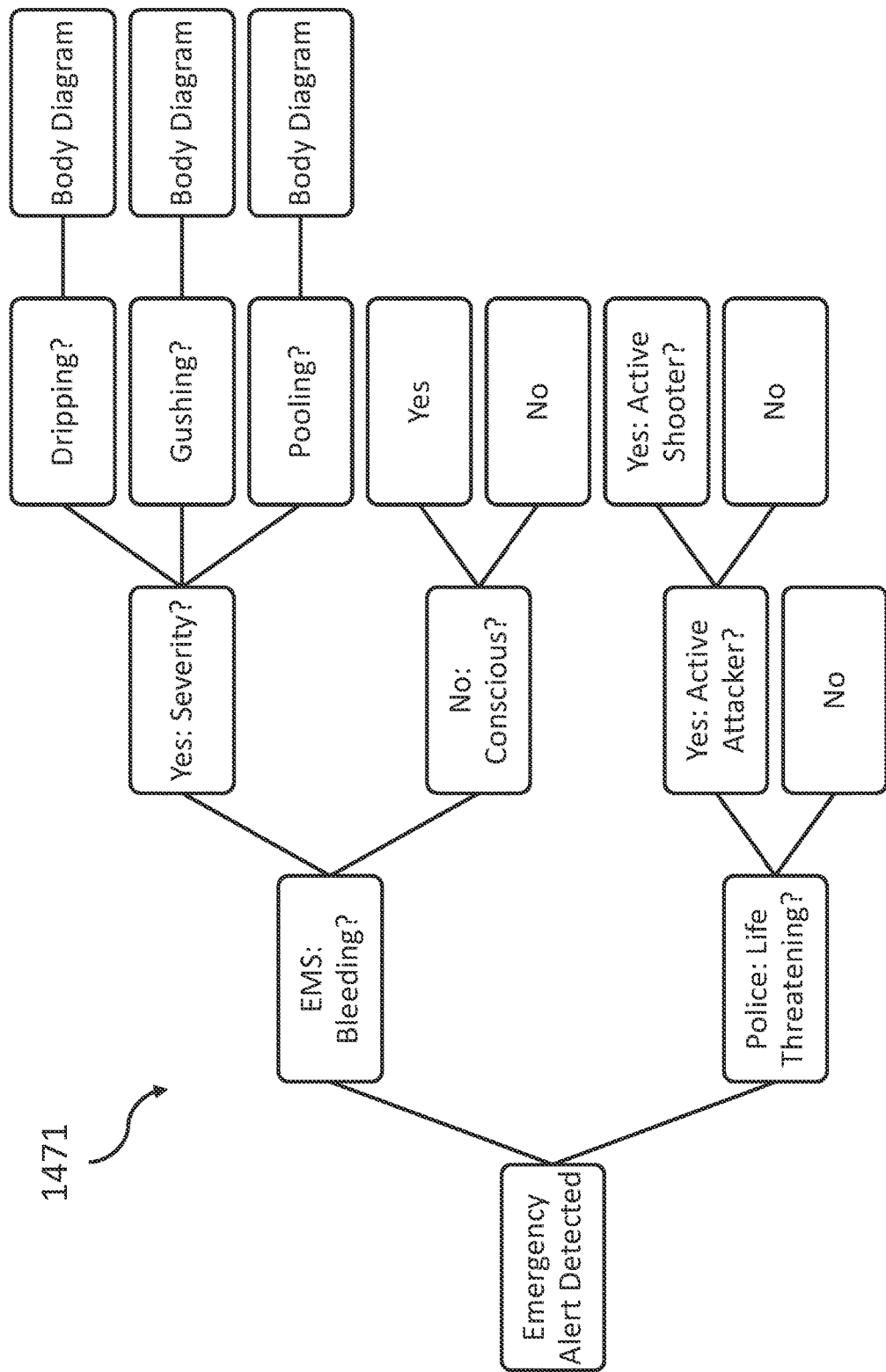
FIG. 14 depicts a non-limiting example of a decision tree in accordance with the present disclosure.

FIG. 14 depicts an embodiment of a decision tree 1471 in accordance with one embodiment of the present disclosure. As mentioned above, in some embodiments, when an emergency alert is generated for an emergency by an electronic device (such as a 9-1-1 call being dialed on a mobile phone in the United States), the emergency management system provides an emergency assistant application through an electronic device associated with the emergency alert to gather emergency information regarding the emergency and deliver safety recommendations to one or more persons potentially affected by the emergency. In some embodiments, the EMS generates or retrieves a safety recommendation from a safety recommendation database based on a likely emergency category determined for the emergency. In some embodiments, the EMS determines a likely emergency category for the emergency based at least in part on emergency information received through the interface of the electronic device, as described above. In some embodiments, the EMS determines a nature of the emergency and determines a likely emergency category for the emergency based at least in part on the emergency information received through the interface of the electronic device and at least in part on the nature of the emergency. In some embodiments, the nature of the emergency is one of medical, fire, or police. In some embodiments, the nature of the emergency is included in the emergency alert. In some embodiments, the EMS gathers emergency data and determines the nature of the emergency using the emergency data. In some embodiments, the emergency data includes at least one of sensor data, environmental data, health data, or medical history. In some embodiments, the emergency data is gathered from an emergency data database. In some embodiments, the emergency data is gathered from a second electronic device associated with a user of the electronic device. In some embodiments, the emergency data is gathered from a second electronic device communicatively coupled to the electronic device. In some embodiments, the second electronic device is one of a smartphone, a wearable device, or a vehicle.

In some embodiments, after providing the emergency assistant application through an interface of the electronic device, the EMS access a decision tree 1471 for safety recommendations and steps through the decision tree using emergency information received through the interface of the electronic device to determine the likely emergency, as depicted by FIG. 14. In some embodiments, the EMS accesses the decision tree based on a nature of emergency determined for an emergency. In some embodiments, each step of the decision tree points to a corresponding safety recommendation within the safety recommendation database. In some embodiments, after initiating an autonomous communication session with a user of the electronic device, posing questions to the user through the emergency assistant application (as described above), and receiving responses to the questions posed to the user through the emergency assistant application during the autonomous communication session, the EMS then uses each response received from the user during the autonomous communication session to move one step forward on the decision tree. In some embodiments, each level of the decision tree asks a more detailed and/or specific question than the precous level. In some embodiments, if the EMS does not have enough information to answer the next question in a decision tree, the EMS stops moving through the decision tree and selects the safety recommendation corresponding to the most recently answered question on the decision tree as the most appropriate safety recommendation for the current emergency.

Figure 15:
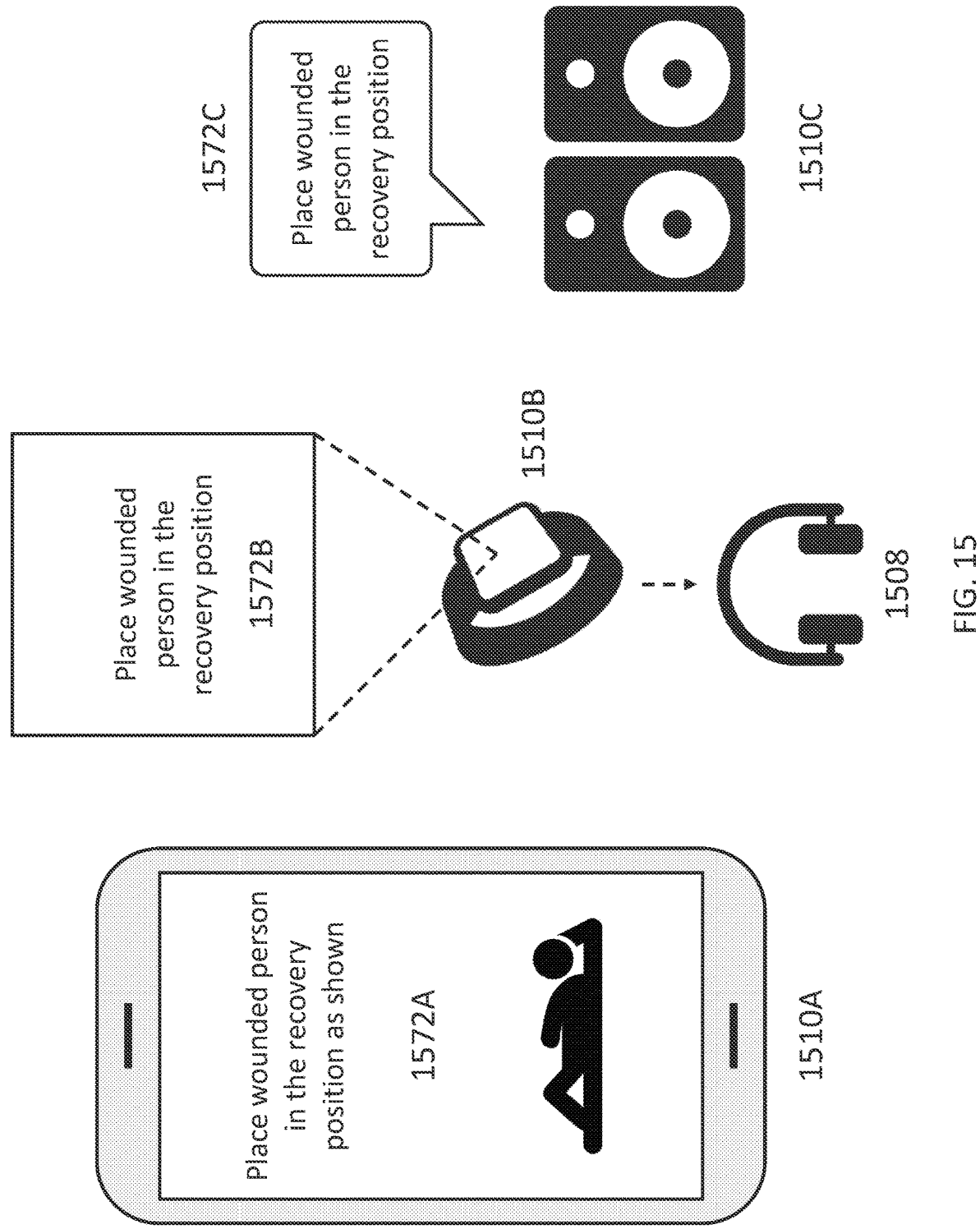
FIG. 15 illustrates non-limiting implementations of a safety recommendation in accordance with the present disclosure.

FIG. 15 illustrates examples of a safety recommendation. As mentioned above, in some embodiments, when an emergency alert is generated for an emergency by an electronic device (such as a 9-1-1 call being dialed on a mobile phone in the United States), the emergency management system provides an emergency assistant application through an electronic device associated with the emergency alert to gather emergency information regarding the emergency and deliver safety recommendations to one or more persons potentially affected by the emergency. The emergency assistant application can be integrated with the autonomous communication session (e.g., Chatbot) as described herein. Alternatively, the autonomous communication session can deliver safety recommendations or instructions independently of the emergency assistant application. For example, the autonomous communication session can provide safety recommendations to the communication device of a user via text messaging. As discussed above, in some embodiments, the electronic device is one of a smartphone, a wearable device, an IoT device, or a vehicle. In some embodiments, after determining a likely emergency category for the emergency, the EMS retrieves a safety recommendation 1572 based on the likely emergency category from a safety recommendation database and delivers the safety recommendation 1572 through an interface of the electronic device 1510, as depicted by FIG. 15. In some embodiments, the safety recommendation 1572B is delivered through the interface of the electronic device 1510B as text. In some embodiments, the safety recommendation is delivered through the interface of the electronic device 1510C as audio 1572C. In some embodiments, the audio is a text-to-speech conversion of a text file. In some embodiments, the safety recommendation 1572A is delivered through the interface of the electronic device 1510A as a photo or video. In some embodiments, wherein the electronic device is a communication device (e.g., a smartphone), the EMS delivers the safety recommendation by transmitting an SMS text message to the communication device. In some embodiments, wherein the electronic device is a communication device 1510A or a wearable device 1510B, the EMS delivers the safety recommendation 1572 through a graphical user interface of a mobile application. In some embodiments, wherein the electronic device 1510 is an IoT device 1510C housing or otherwise coupled to a microphone and speaker, or wherein the electronic device 1510 is coupled to a headset 1508 housing or otherwise coupled to a microphone and speaker, the EMS delivers the safety recommendation 1572 by audibly playing the safety recommendation 1572 through the speaker, as depicted by FIG. 15.

Automatic Emergency Response Coordination

Figure 16A:
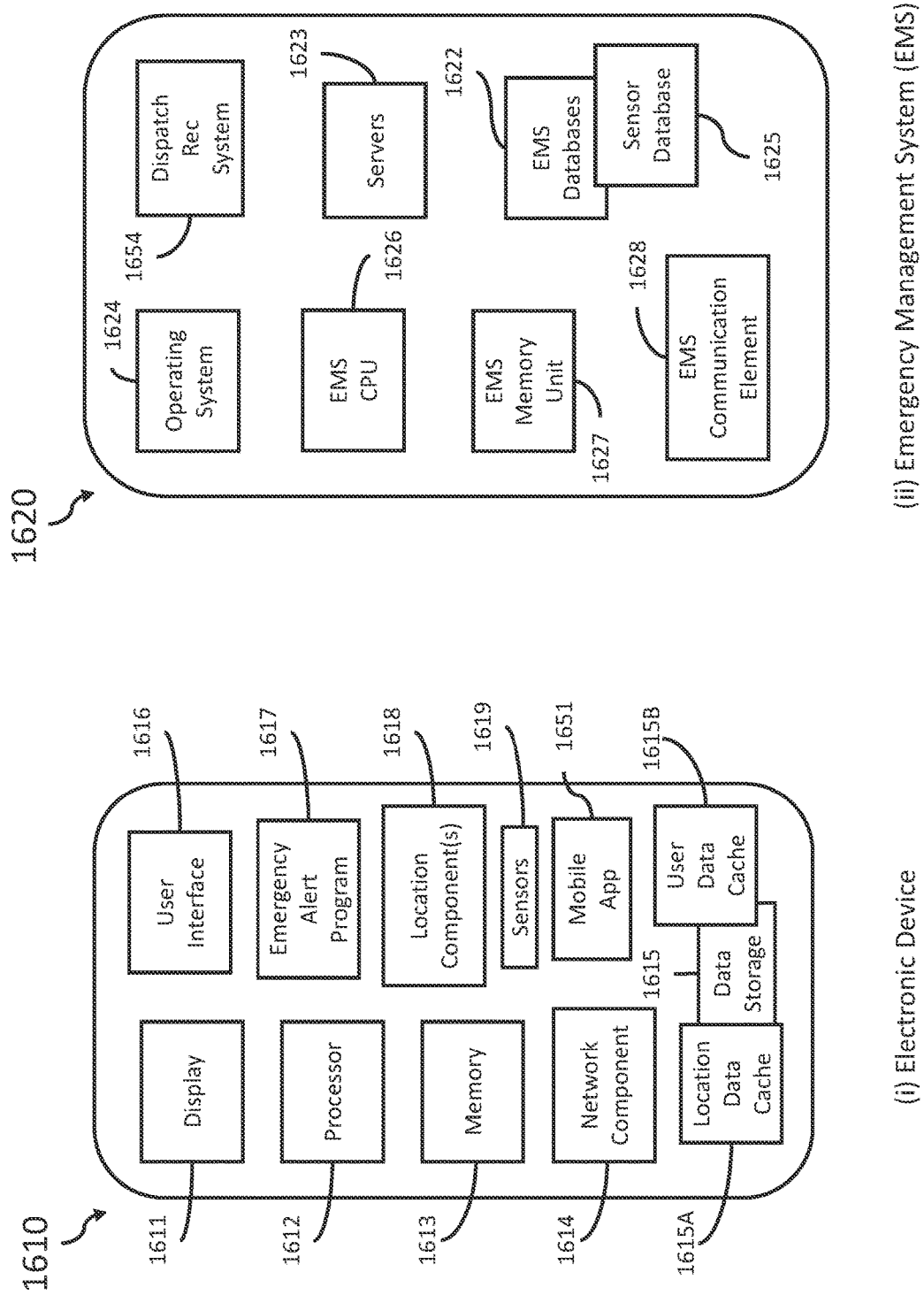
FIGS. 16A and 16B depict diagrams of (i) an electronic device, (ii) an emergency management system, (iii) an emergency service provider (ESP) system, and (iv) ESP software in accordance with one embodiment of the present disclosure.
Figure 16B:
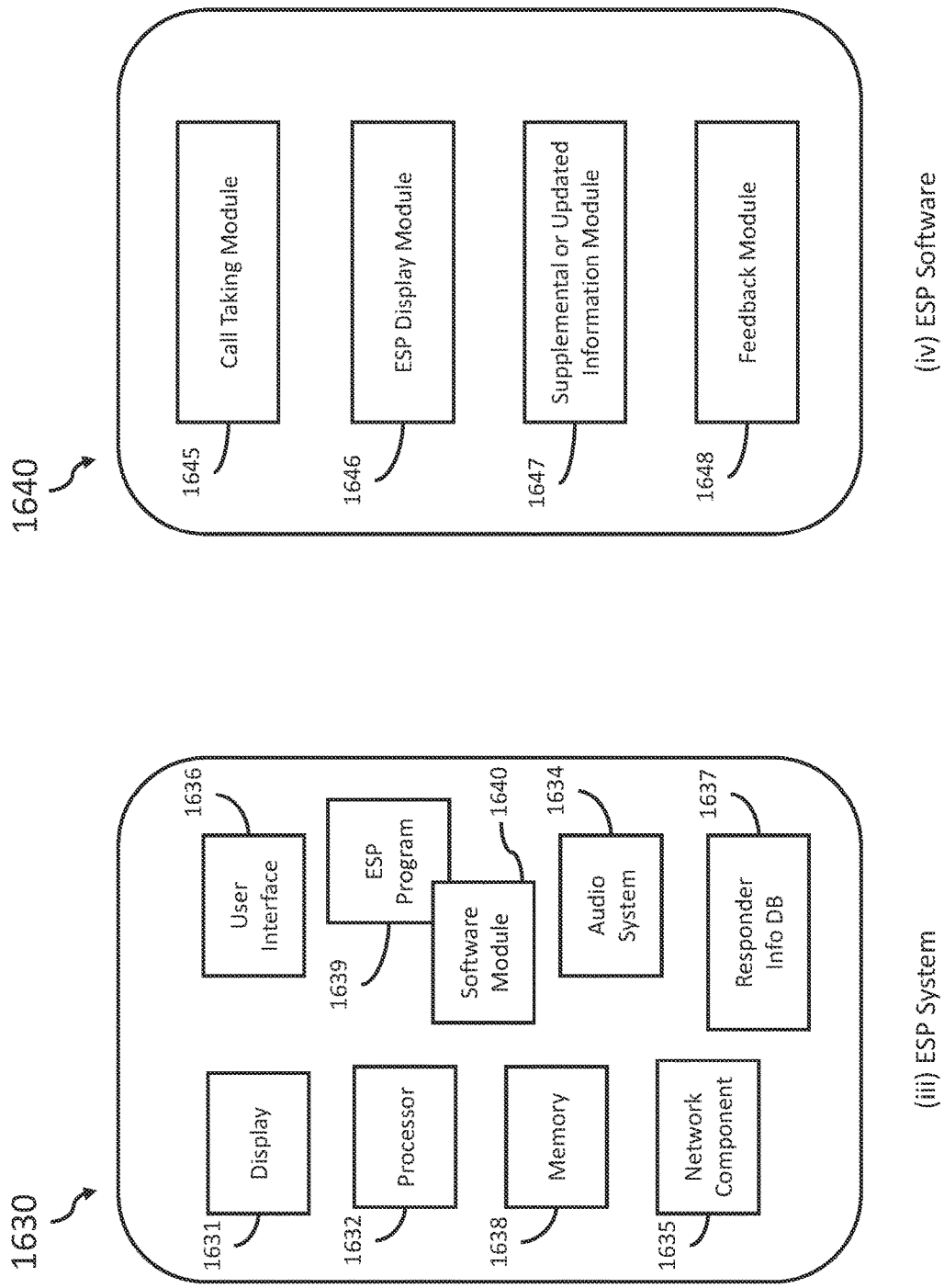

FIGS. 16A and 16B depict diagrams of (i) an electronic device 1610, (ii) an emergency management system 1620, (iii) an emergency service provider (ESP) system 1630, and (iv) ESP software 1640 in accordance with one embodiment of the present disclosure. As described above, in some embodiments, the electronic device 1610 is a digital processing device such as a communication device (e.g., a mobile phone), wearable device, or IoT device. In some embodiments, the electronic device 1610 includes a display 1611, a processor 1612, a memory 1613, and several other optional components such as one or more network components 1614, a data storage 1615, a user interface 1616, a computer program 1617, one or more location components

1618, and one or more sensors 1619. In some embodiments, the electronic device 1610 additionally or alternatively includes a mobile application 1651 (also referred to as a "mobile app") configured to perform emergency response functions in response to an emergency alert (such as an emergency alert initiated by the emergency alert program) or according to instructions from the EMS 1620. As described above, in some embodiments, the emergency management system (EMS) 1620 includes an EMS operating system 1624, an EMS CPU 1626, an EMS memory unit 1627, and an EMS communication element 1628. In some embodiments, as depicted in FIG. 16A, the emergency management system 1620 includes a dispatch recommendation system 1654 configured to generated automated dispatch recommendations in response to emergencies and provide the dispatch recommendations to emergency service providers. As described above, in some embodiments, an ESP 1630 is an emergency service provider (ESP) system that includes one or more of a display 1631, a memory 1638, a user interface 1636, at least one central processing unit (processor) 1632, a network component 1635, an audio system 1634, and a computer program (software) 1639. In some embodiments, the ESP software includes at least one software module 1640, such as a call taking module 1645, an ESP display module 1646, a supplemental or updated information module 1647, a feedback module 1648, or a combination thereof. In some embodiments, location and supplemental information is displayed for other emergency service providers (e.g., police, fire, medical, etc.) and/or responders on their respective devices.

Figure 17:
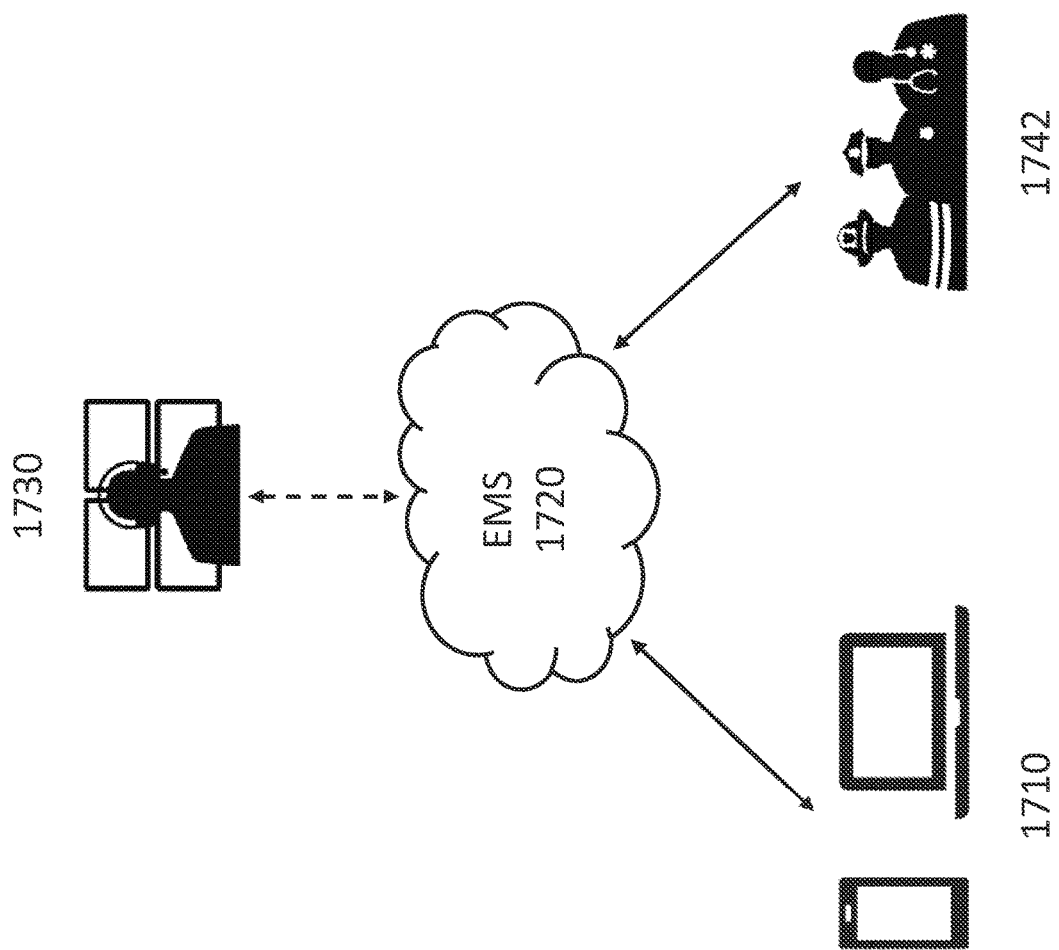
FIG. 17 depicts a non-limiting example of a system for coordinating emergency response by an emergency management system in accordance with the present disclosure.

FIG. 17 depicts an embodiment of a system for coordinating emergency response by an emergency management system in accordance with one embodiment of the present disclosure. In some embodiments, the system includes an electronic device 1710, an emergency management system (EMS) 1720, and an emergency service provider (ESP) 1730 or emergency service provider personnel 1742. In some embodiments, when an emergency alert is generated for an emergency by an electronic device 1710 (e.g., a smart thermostat detecting a fire), the emergency management system 1720 receives the emergency alert, gathers emergency data associated with the emergency alert, determines a nature of the emergency, determines a severity index for the emergency based at least in part on the emergency data, generates a dispatch recommendation for the emergency based at least in part on the nature of the emergency and the severity index, and transmits the dispatch recommendation to an emergency service provider (ESP) personnel 1742. In some embodiments, the electronic device 1710 is a sensor device, and the emergency alert is automatically generated by the sensor device in response to detecting an emergency based on sensor data gathered by the sensor device. In some embodiments, the electronic device 1710 is an intelligent vehicle system, and the emergency alert is automatically generated by the intelligent vehicle system in response to detecting an emergency based on sensor data gathered by the intelligent vehicle system.

Severity Index

Figure 18:
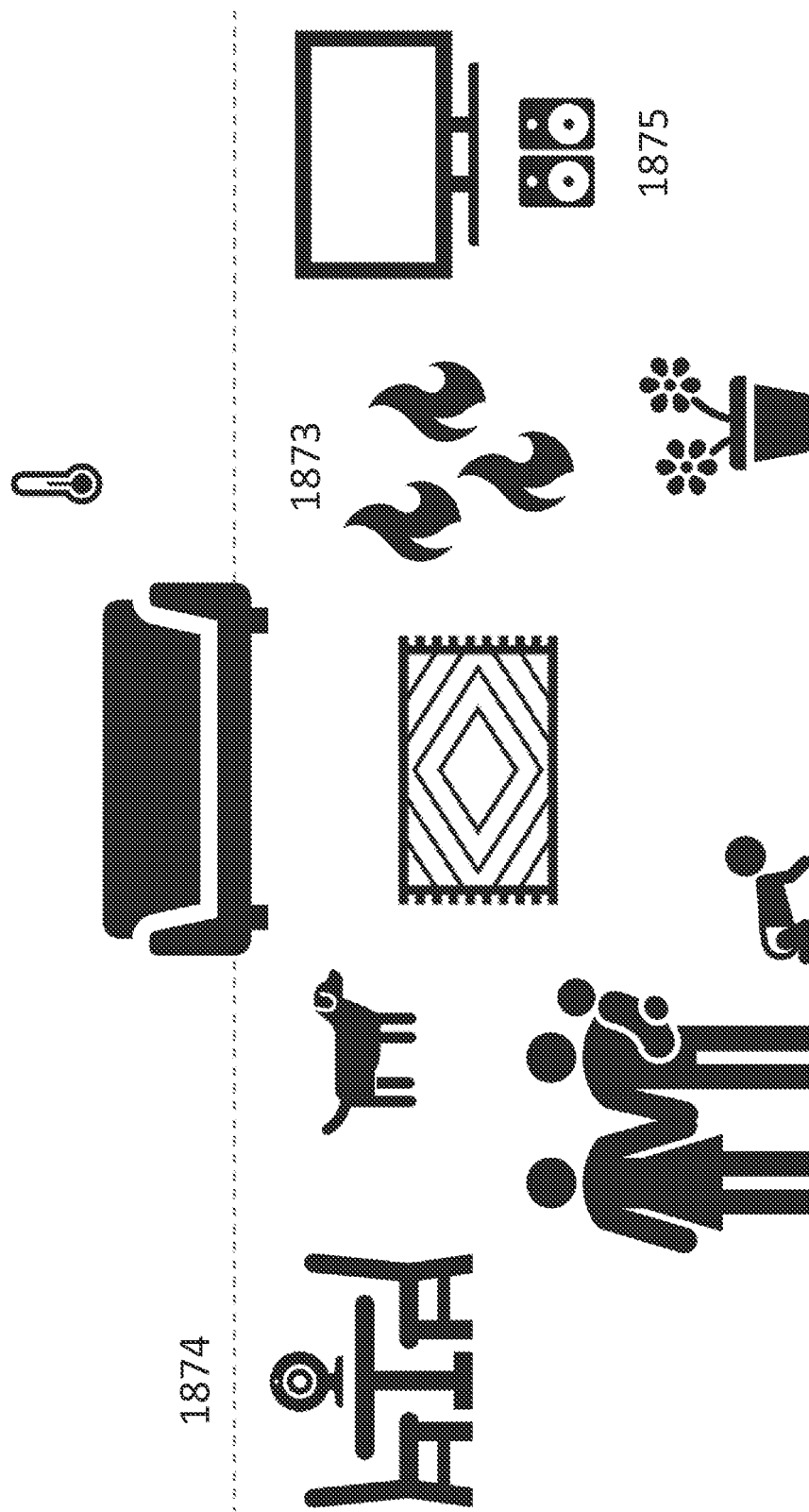
FIG. 18 illustrates a non-limiting example of an emergency data analysis scenario in accordance with the present disclosure.

FIG. 18 illustrates an emergency data analysis scenario in accordance with one embodiment of the present disclosure. As mentioned above, in some embodiments, after receiving an emergency alert associated with an emergency, the emergency management system determines a nature of the emergency. In some embodiments, the nature of the emergency is included in the emergency alert. In some embodiments, the emergency management system determines the nature of the emergency using emergency data associated with the emergency alert, as depicted in FIG. 18. In some embodiments, the EMS gathers some or all of the emergency data from one or more EMS databases. In some embodiments, the emergency data includes static information such as name, age, address, medical history, allergies, etc. In some embodiment, emergency data includes dynamic or real-time information received from one or more sensors in the vicinity of an emergency. In some embodiments, the emergency data associated with the emergency alert includes at least one of health data, sensor data, environmental data, audio, video, and medical history. In some embodiments, the emergency management system gathers emergency data associated with the emergency alert by providing an emergency assistant application through an interface of an electronic device associated with the emergency and receiving emergency information obtained through the interface of the electronic device, as discussed above. In some embodiments, the emergency management system poses questions to a user of the electronic device through the emergency assistant application and receives emergency information obtained through the interface of the electronic device by receiving responses to the questions posed through the emergency assistant application. In some embodiments, one of the questions posed through the emergency assistant application asks the user for a nature of the emergency.

Figure 19:
FIG. 19 illustrates a non-limiting example of an emergency data analysis scenario in accordance with the present disclosure.

In some embodiments, the emergency data associated with the emergency alert includes audio or video, and the emergency management system determines the nature of the emergency by processing the audio or video for audio or visual cues. In some embodiments, the audio cues include key words. In some embodiments, the audio cues include volume level. In some embodiments, the audio cues include unique voices. In some embodiments, the visual cues include at least one of light intensity, activity, objects, or people. For example, in some embodiments, for the fire depicted in FIG. 18, the family depicted in FIG. 18 may call 9-1-1, thereby generating an emergency alert that the emergency management system can detect. In response to detecting the emergency alert, in some embodiments, the emergency management system can identify the smart camera 1874 depicted in FIG. 18 as associated with the device used to call 9-1-1. The emergency management system can then connect to the smart camera 1874 and receive video taken by the smart camera. The emergency management system may then process the video received from the smart camera and detect a sharp increase in the light intensity within the video, indicating that a fire 1873 has ignited. In another example, FIG. 19 depicts a medical emergency. A man 1976 has collapsed and is bleeding on the floor of a living room. A woman in the living room with the collapsed man calls 9-1-1, such as by speaking a voice command to a smart speaker 1975 also situated in the living room. In response to receiving the voice command, the smart speaker 1975 connects to 9-1-1 and generates an emergency alert for the emergency (e.g., the collapsed and bleeding man 1976) that is sent to the emergency management system. In some embodiments, the emergency management system detects the smart camera 1974 in the living room and identifies the smart camera 1974 as associated with the emergency. For example, in some embodiments, the emergency management system detects that the smart camera 1974 and smart speaker 1975 are associated with a common account. The emergency management system can then receive emergency data from one or both of the smart camera 1974 and the smart speaker 1975. For example, the emergency management system may receive audio recorded by the smart speaker and recognize the word "fallen" or "bleeding"

within the audio and determine the nature of the emergency to be a medical emergency. In another example, the emergency management system recognizes a collapsed person in a video received from the smart camera and determines the nature of the emergency to be a medical emergency. In some embodiments, the emergency management system uses the emergency data associated with the emergency alert to determine a dispatch category for the emergency. The emergency management system can then use the dispatch category to generate a dispatch recommendation for the emergency, as described below.

Figure 20:
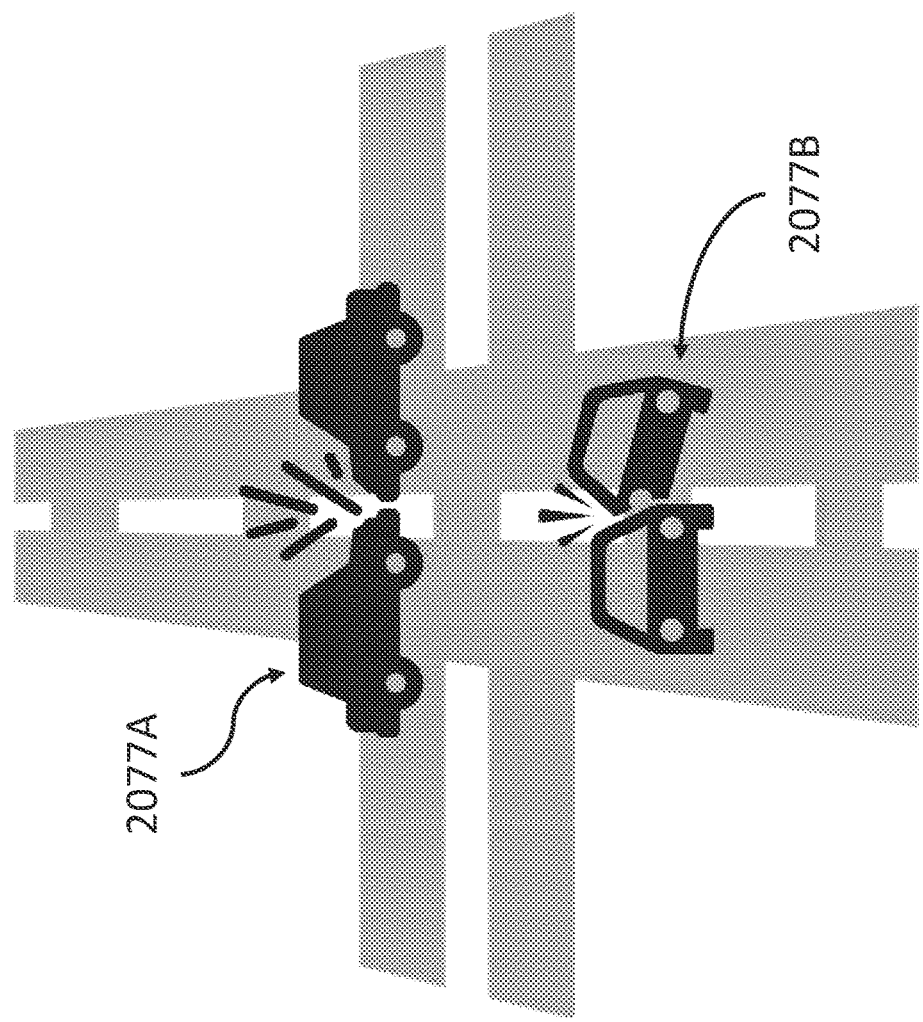
FIG. 20 illustrates a non-limiting example of an emergency data analysis scenario in accordance with the present disclosure.

FIG. 20 illustrates an emergency data analysis scenario in accordance with one embodiment of the present disclosure. As mentioned above, in some embodiments, when an emergency alert is generated for an emergency by an electronic device, the emergency management system receives the emergency alert, gathers emergency data associated with the emergency alert, determines a nature of the emergency, and determines a severity index for the emergency based at least in part on the emergency data. For example, in an embodiment in which the electronic device is an intelligent vehicle system, when a car including an intelligent vehicle system is involved in a car accident (as depicted in FIG. 20), the intelligent vehicle system automatically generates an emergency alert and transmits the emergency alert to the emergency management system. In some embodiments, the emergency alert indicates that the emergency is a vehicular emergency. In some embodiments, the intelligent vehicle system gathers emergency data associated with the emergency alert such as the speed that the car was moving at the time of the accident, the area of incidence, how many passengers were in the car, or any other information gathered by the car's telematics systems and transmits the emergency data to the emergency management system. For example, in some embodiments, the intelligent vehicle system can determine if the area of incidence is the front of the car 2077A or the side of the car 2077B, which may indicate a difference in the severity of the accident. In some embodiments, the emergency management system uses the emergency data to determine a severity index for the car accident. In some embodiments, the severity index is generated by the electronic device and included in the emergency alert. In some embodiments, the severity index is received from an external source.

In some embodiments, the severity index is a quantized value, such as an integer between zero and ten. In some embodiments, the severity index is a qualitative level. For example, in some embodiments, the qualitative level is one of low, medium, and high. In some embodiments, the qualitative level is one of low and high. In some embodiments, the emergency management system processes emergency data associated with an emergency alert to determine a number of persons involved in an emergency and determines a severity index of the emergency based at least in part on the number of persons involved in the emergency. In some embodiments, wherein the severity index is qualitative level between low and high, the severity index is determined to be high in response to the number of persons involved in the emergency equaling or exceeding two persons. In some embodiments, the severity index is determined to be high in response to receiving a response to a question posed through an emergency assistant application indicating that a person involved in the emergency needs immediate emergency assistance. In some embodiments, the severity index is determined to be high in response to receiving a response to a question posed through an emergency assistant application indicating that the emergency involves a life-threatening danger.

Figure 21:
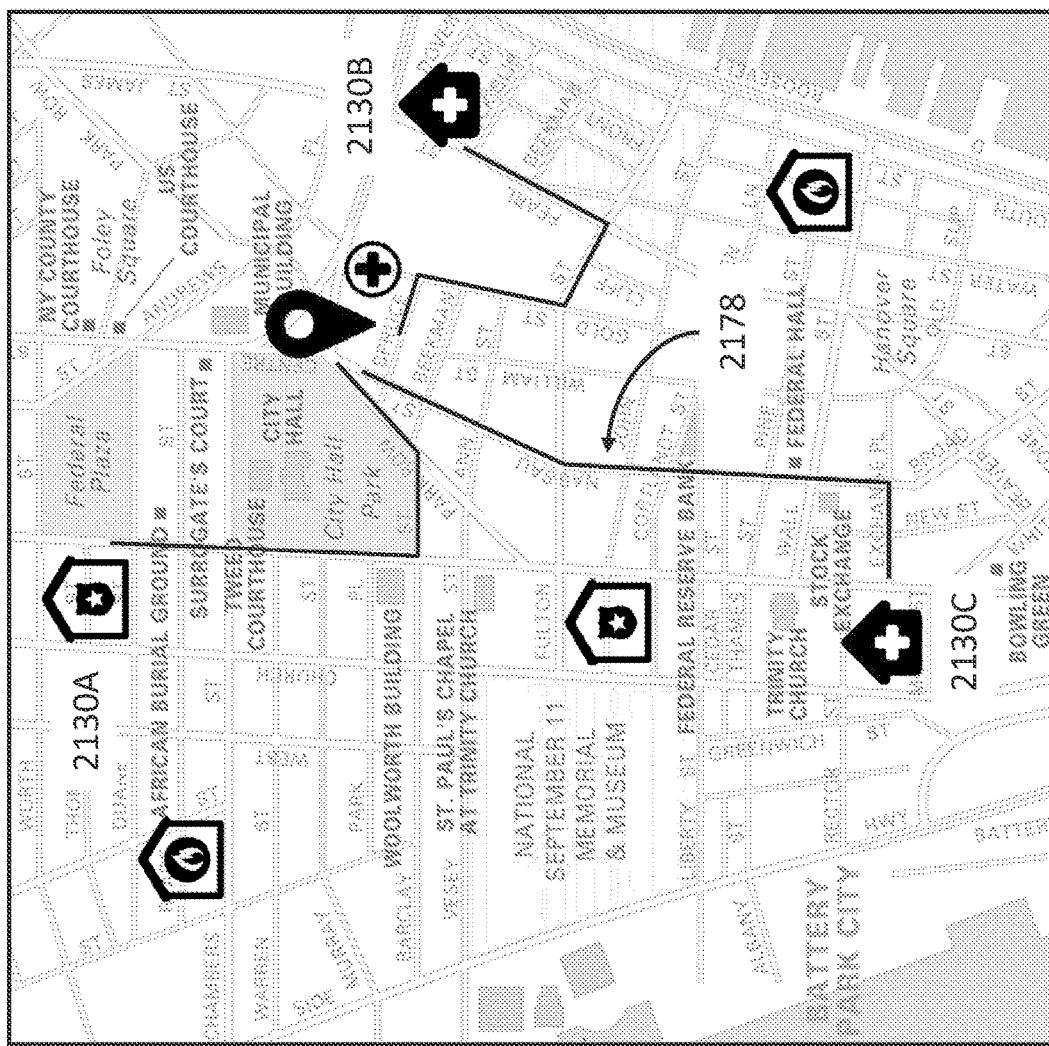
FIG. 21 illustrates a non-limiting example of an embodiment of a dispatch recommendation in accordance with the present disclosure.

FIG. 21 illustrates an embodiment of a dispatch recommendation in accordance with one embodiment of the present disclosure. In some embodiments, after determining a nature of an emergency and a severity index for the emergency, the emergency management system generates a dispatch recommendation for the emergency. In some embodiments, the dispatch recommendation includes at least one type of emergency response unit and at least one number of the at least one type of emergency response unit. For example, the dispatch recommendation may call for one basic life safety ambulance unit. In another example, the dispatch recommendation may call for one basic life safety ambulance unit and two advanced life safety ambulance unit. In another example, the dispatch recommendation the dispatch recommendation may call for one advanced life safety ambulance unit and two police squad car units. In some embodiments, the emergency management system accesses a dispatch protocol including a list of dispatch recommendations, wherein each combination of nature of emergency and severity index corresponds to a particular dispatch recommendation on the list of dispatch recommendations. In some embodiments, the emergency management system identifies a location of an emergency and generates a dispatch recommendation for the emergency based at least in part on the nature of the emergency, the severity index, and the location of the emergency. In some embodiments, the emergency management system accesses a responder information database, identifies one or more emergency service providers in the vicinity of the location of the emergency, and determines the types, capabilities, or availabilities of emergency response units from the one or more emergency service providers. In some embodiments, the dispatch recommendation includes directions 2178 from one or more emergency service providers 2130 to the location of the emergency, as depicted by FIG. 21. In some embodiments, the emergency management system graphically displays the dispatch recommendation within a map on an ESP device, such as the map depicted by FIG. 21. In some embodiments, after a dispatch recommendation is sent to an emergency service provider, an incident is created within the ESP system (such as within a CAD system included in the ESP system) corresponding to the emergency alert for which the dispatch recommendation was created.

Emergency Dispatch Cards

Figure 22:
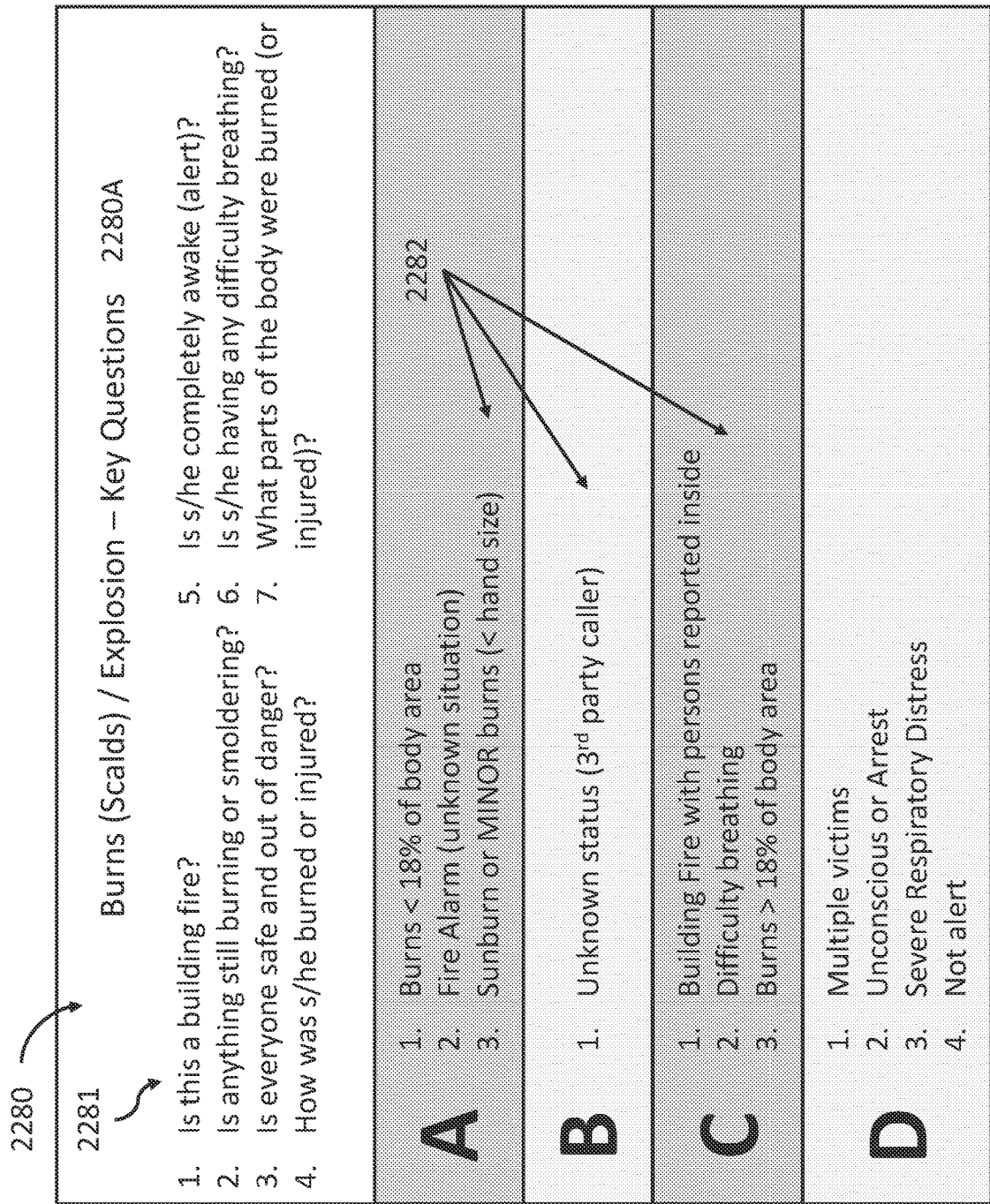
FIG. 22 depicts a non-limiting example of a dispatch card in accordance with the present disclosure.

FIG. 22 depicts an embodiment of a priority dispatch card 2280 (hereinafter, "dispatch card"), in accordance with one embodiment of the present disclosure. As described above, in some embodiments, after receiving an emergency alert associated with an emergency, the emergency management system (EMS) gathers emergency data associated with emergency alert and generates a dispatch recommendation for the emergency. In some embodiments, the EMS generates a dispatch recommendation for the emergency at least in part by using a dispatch card. In general, a dispatch card 2280 is a representation of a protocol for how to respond to a specific type of emergency. For example, the dispatch card 2280A depicted by FIG. 22 represents a protocol for how to respond to burns (scalds)/explosions. Various forms of dispatch cards are used by emergency service providers (such as PSAP personnel) in responding to emergencies. A dispatch card 2280 contains one or more questions 2281 related to the specific type of emergency that the dispatch card is associated with. For example, the burns (scalds)/explosions dispatch card 2280A depicted by FIG. 22 includes seven questions, beginning with "1. Is this a building fire?" and ending with "7. What parts of the body were burned (or injured)?" The dispatch card 2280 additionally contains one or more dispatch options 2282 to be selected based on the answers to the one or more questions 2281 contained by the dispatch card. When being used in a PSAP, a call taker or dispatcher will answer the questions on a dispatch card using information qualitatively received by verbally speaking with a 9-1-1 caller. The call taker or dispatcher will then select the most appropriate dispatch option on the dispatch card based on the answers to the questions on the dispatch card. For example, the burns (scalds)/explosions dispatch card 2280A includes four dispatch options 2282: dispatch options A, B, C, and D. In this example, if a victim has been burned and has burns on less than 18% of their body area, a fire alarm has been pulled and nothing else is known about the emergency, or if the victim has been burned and has a sunburn or minor burns (burns smaller than the victim's hand size), then an emergency response according to dispatch option A is recommended. If there are multiple burn victims, if a victim is unconscious or in cardiac arrest, a victim is suffering from severe respiratory distress, or if a victim is not alert, an emergency response according to dispatch option D is recommended. In some embodiments, the dispatch option includes at least one type of emergency response unit and at least one number of the at least one type of emergency response unit. A dispatch option differs from a dispatch recommendation in that a dispatch option is not specific to a particular emergency instance.

Dispatch cards 2280 are useful tools in responding to emergencies; however, as the process of completing a dispatch card requires a call taker to verbally ask and receive answers to the questions on the dispatch card, the process can take a significant amount of time, which can have a negative impact on emergency response success rates. For example, when using the Burns (Scalds)/Explosions dispatch card 2280A depicted in FIG. 22 to respond to a burn emergency, a call taker would ideally answer all seven questions 2281 on the dispatch card before selecting a dispatch option 2282. If it takes the call taker an average of 15 seconds to ask and receive an answer from the caller for each question, it would take a call taker nearly two minutes to complete the dispatch card, thereby adding two minutes to the total response time for the emergency. It has been well established that mortality rates are extremely sensitive to response time, particularly at the onset of an emergency. For example, a 7-10% reduction in mortality rate per minute has been observed during the first 5-10 minutes for cardiac or respiratory emergencies. The time saved when completing a dispatch card can thus have a significant impact on the likelihood of a successful emergency response. As will be described below, the EMS can instantly and simultaneously answer one or more questions on a dispatch card as soon as a dispatch card has been determined for a particular emergency using emergency data gathered for the particular emergency (e.g., emergency data associated with an emergency alert associated with the particular emergency), thereby reducing the time required to complete a dispatch card an potentially significantly increase the likelihood of a successful emergency response.

Figure 23A:
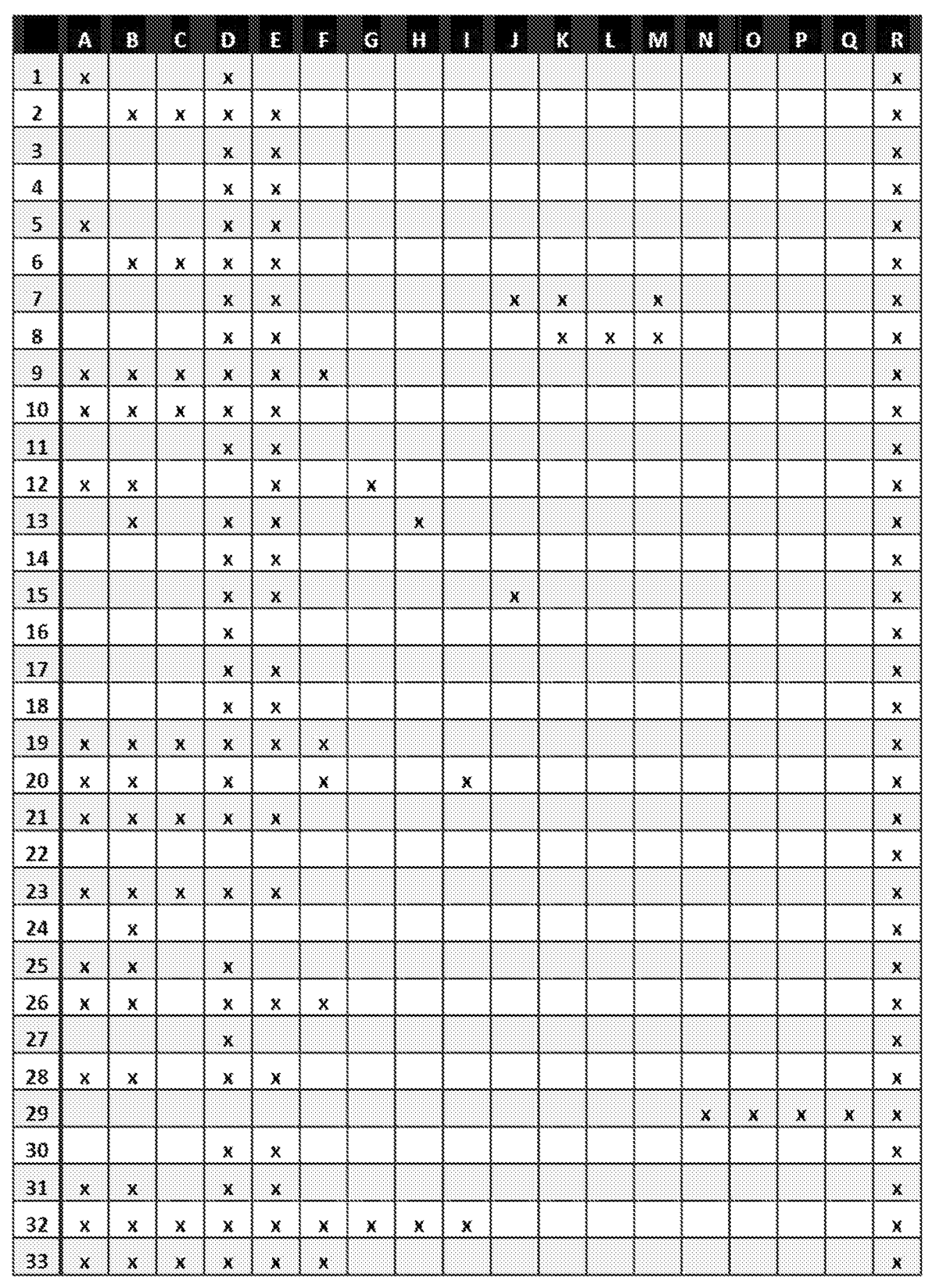

In some embodiments, after receiving an emergency alert associated with an emergency, the EMS gathers emergency data associated with the emergency alert (as described above with respect to FIG. 18) and determines a dispatch card 2280 appropriate for the emergency. In some embodiments, the EMS stores a plurality of dispatch cards, wherein each dispatch card within the plurality of dispatch cards is associated with a different type of emergency. For example, in some embodiments, the EMS stores 33 different dispatch cards: a respective dispatch card for each of 1) abdominal pain, 2) allergies/envenomation, 3) animal bites/attacks, 4) assault/sexual assault, 5) back pain, 6) breathing problems, 7) burns/explosions (as depicted by FIG. 22), 8) carbon monoxide (CO)/hazmat, 9) cardiac or respiratory arrest/death, 10) chest pain (non-traumatic), 11) choking, 12) convulsions/seizures, 13) diabetic, 14) drowning, 15) electrocution/lightning, 16) eye problems/injuries, 17) falls, 18) headache, 19) heart problems, 20) heat/cold exposure, 21) hemorrhage/lacerations, 22) inaccessible incident/other entrapments, 23) overdose/poisoning, 24) pregnancy/childbirth/miscarriage, 25) psychiatric/abnormal behavior/suicide attempt, 26) sick person, 27) stab/gunshot/penetrating trauma, 28) stroke, 29) traffic/transportation accidents, 30) traumatic injuries, 31) unconscious/fainting, 32) unknown problem, and 33) transfer/interfacility/palliative care. This set of dispatch cards is represented below in the table depicted in FIG. 23A, wherein each row (1-33) represents a different dispatch card. Each column (A-R) represents a different emergency data type that may be available to the EMS for a given emergency. In this example, certain emergency data types may only be pertinent to certain emergency dispatch cards. For example, as depicted in FIG. 23A, real-time multimedia (data type R) is pertinent (e.g., helpful in answering a dispatch card question) to each of the 33 dispatch cards while heart rate is only pertinent to dispatch cards #9 (cardiac or respiratory arrest), #19 (heart problems), #20 (heat/cold exposure), #26 (sick person), #32 (unknown problem), and #33 (transfer/interfacility/palliative care). Or for example, the emergency data types pertinent to dispatch card #9 (cardiac or respiratory arrest) are emergency data types A (age), B (pre-existing medical conditions), C (medication), D (fall detection), E (breathing), F (heart rate), and R (real-time multimedia). As depicted in FIG. 23B, in some embodiments, emergency data types may be tagged or otherwise categorized into groups. In this example, emergency data types A (age), B (pre-existing medical conditions), and C (medications) are all be tagged as "static" emergency data types. Static emergency data types are not specific to a particular emergency instance. Emergency data types D-I are tagged as "medical" emergency data types, emergency data types J-M are tagged as "home" emergency data types, and emergency data types N-Q are tagged as "auto" emergency data types. The "medical," "home," and "auto" emergency data types may also be considered dynamic emergency data types, as each of these emergency data types are specific to particular emergency instances (e.g., a sampled heart rate is only applicable in the emergency instance during which it was sampled).

In some embodiments, the EMS determines or selects the dispatch card appropriate for a particular emergency autonomously based on the emergency data associated with the emergency alert. For example, in one embodiment, a wearable device may detect that the wearer of the wearable device is experiencing arrhythmia (e.g., an irregular heartbeat) and present a button through an interface of the wearable device that the wearer can select to send an emergency alert to the EMS, if necessary. If the wearer selects the button, the wearable device transmits an emergency alert, along with any available emergency data, to the EMS on behalf of the wearer. In this example, the wearable device includes a heartrate sensor (which was used to determine that the wearer was experiencing the arrhythmia) and can thus sample and record the wearer's heartbeat, which the wearable device then transmits to the EMS as emergency data. In this example, after receiving the emergency alert and the emergency data including the heartbeat data, the EMS recognizes the arrhythmia captured by the heartbeat data and determines the heart problems dispatch card (dispatch card #19 on the table depicted by FIG. 23A) to be the appropriate dispatch card for the emergency.

In some embodiments, the EMS determines or selects the dispatch card appropriate for a particular emergency based on input from ESP personnel (e.g., a PSAP call taker or dispatcher). For example, in some embodiments, when a person dials an emergency number (e.g., 9-1-1 in the United States) from a communication device (e.g., a mobile phone), an emergency alert is concurrently transmitted to the EMS as the communication device establishes an emergency call with a public safety answering point (PSAP). A call taker at the PSAP then answers the emergency call and begins responding the emergency through an ESP (PSAP) device. The EMS is communicatively coupled to the ESP device and detects, manually or automatically, that the ESP device is being used to respond to the emergency associated with the emergency alert. For example, in some embodiments, when the ESP device receives an emergency call, the ESP device subsequently and automatically transmits a communication to the EMS that includes an identifier of the emergency call. For example, in some embodiments, in response to receiving an emergency call, the ESP device automatically sends a request for emergency information regarding the emergency call to the EMS. The request for emergency information contains the phone number (e.g., the identifier of the emergency call) from which the emergency call was dialed, which the EMS can then use to identify emergency information pertinent to the emergency call. In some embodiments, the request for emergency information is an HTTP GET request. In another example, in some embodiments, when a call taker at a PSAP answers an emergency call, the call taker can manually submit an identifier of the emergency call to the EMS, such as through a computer aided dispatch (CAD) system installed on the ESP device and communicatively coupled to the EMS or through a web application provided by the EMS and running on the ESP device. Once the EMS has detected that the ESP device is being used to respond to the emergency associated with the emergency alert, the EMS can then prompt the call taker to select a dispatch card appropriate for the emergency. In some instances, the call taker may be well suited to select the dispatch card most appropriate for the emergency, as the call taker is often able to qualitatively gather relevant information regarding the emergency while verbally speaking with the caller. The call taker can use this information to make an informed decision on which dispatch card will be the most appropriate for the emergency. In some embodiments, the EMS prompts the call taker to select a dispatch card appropriate for the emergency through a web application provided by the EMS and running on the ESP device. In some embodiments, the EMS prompts the call taker to select the dispatch card through a CAD system installed on the ESP device. In some embodiments, when the EMS prompts the call taker to select a dispatch card, the EMS presents a full set of dispatch cards (e.g., the entire set of 33 dispatch cards from the set of dispatch cards represented in FIG. 23) to the call taker. In some embodiments, when the EMS prompts the call taker to select a dispatch card, the EMS presents a limited set of dispatch cards for the call taker to choose from. For example, referring again to the arrhythmia example described above, based on the irregular heartbeat data received from the wearable device, the EMS can determine that the emergency is most likely a heart-related problem and exclude non-heart-related dispatch cards (e.g., dispatch card #25, "psychiatric/abnormal behavior/suicide attempt") from the limited set of dispatch cards presented to the call taker. In some embodiments, when the EMS prompts a call taker at an ESP to select a dispatch card appropriate for an emergency, an incident is created within the ESP system corresponding to the emergency.

In some embodiments, the EMS determines or selects the dispatch card appropriate for a particular emergency based on input from the user that generated the emergency alert. For example, in some embodiments, when an emergency alert is generated by an electronic device (such as a smartphone, wearable, or IoT device), the EMS can initiate an autonomous communication session with the electronic device (as described above with respect to FIGS. 3 & 4) or present an emergency assistant application through an interface of the electronic device (as described above with respect to FIGS. 11 & 12), through which the EMS can receive input from a user of the electronic device. Through the autonomous communication session or the emergency assistant application, the EMS can ask a user of the electronic device questions regarding the nature of their emergency. The EMS can then determine a dispatch card appropriate for the emergency based on answers received from the user. For example, in some embodiments, if the EMS receives an emergency alert generated by a wearable device and including heartbeat data that shows that the wearer of the wearable device is experiencing an irregular heartbeat (such as in the arrhythmia example described above), the EMS presents an emergency assistant application through a display on the wearable device and asks the wearer if they believe they are experiencing a heart problems or not. If the wearer answers indicating that they do believe they are experience a heart problem, the EMS can then determine that a heart problems dispatch card (e.g., dispatch card #19 in FIG. 23) is the dispatch card most appropriate for the emergency associated with the emergency alert.

Once a dispatch card appropriate for a particular emergency has been determined by the EMS, the EMS then uses the emergency data associated with the emergency alert to answer questions on the dispatch card and generates a dispatch recommendation for the emergency based on the answers to the questions on the dispatch card. In some embodiments, the EMS uses emergency data to answer each of the questions on a dispatch card determined for an emergency. For example, referring to the Burns (Scalds)/Explosion dispatch card depicted in FIG. 22, if the EMS receives an emergency alert and detects a fire alarm from a building associated with the emergency alert, the EMS can answer question #1 in the affirmative. In the same example, if the EMS receives sensor data from a smoke detector or video camera in the building indicating that a fire is still burning within the building, the EMS can answer question #2 in the affirmative. Or, for example, a man suffers a burn and calls 9-1-1 (thereby activating an emergency alert that is detected by the EMS). The man subsequently faints, and his fall is detected by his smartwatch. The smartwatch then prompts the man to press a confirmation button on the smartwatch if he is okay, but the man does not press the confirmation button, indicating that he has fallen unconscious. In this example, the smartwatch can transmit the fall detection data to the EMS, which can then use the fall detection data to answer question #5 in the negative.

In some embodiments, the EMS uses emergency data to answer a subset of the questions on a dispatch card determined for an emergency. For example, after the EMS receives an emergency alert regarding an emergency and determines that the Burns (Scalds)/Explosions dispatch card (as depicted in FIG. 19) is the most appropriate dispatch card for the emergency, the EMS gathers emergency data associated with the emergency alert. In this example, the emergency data types pertinent to the Burns (Scalds)/Explosions dispatch card (#7 in the table depicted by FIG. 23) are medical emergency data types D (fall detection) and E (breathing); home emergency data types J (smoke), K (building), and M (building hazards); and R (real-time multimedia). In this example, if the EMS is able to access emergency data for all of the pertinent emergency data types, the EMS may be able to instantly and automatically answer all seven of the questions on the dispatch card. For example, the EMS may be able to answer question #1 (Is this a building fire?) with emergency data type K (building); question #2 with emergency data type J (smoke); questions #3, 4 and 7 with emergency data type R (real-time multimedia); question #5 with emergency data type D (fall detection); and question #6 with emergency data type E (breathing). In another example, if the EMS is only able to access emergency data for pertinent emergency data types D, E, and J, the EMS may only be able to answer questions #2, 5, and 6.

After answering one or more questions on a dispatch card using emergency data, the EMS can generate a dispatch recommendation based at least in part on the one or more questioned answered using the emergency data. For example, in some embodiments, a dispatch card contains one or more dispatch options to be selected based on the answers to the one or more questions contained by the dispatch card, as described above with respect to FIG. 22. Once the EMS has answered one or more questions on a dispatch card using emergency data, the EMS can cross check the answered questions with the dispatch options on the dispatch card. For example, the Burns (Scalds)/Explosion dispatch card depicted in FIG. 22 includes four dispatch options, A-D. During an emergency for which the Burns (Scalds)/Explosion dispatch card is determined to be the most appropriate dispatch card, if the EMS gathers emergency data associated with the emergency that indicates that a building fire has ignited, the EMS can generate a dispatch recommendation for the emergency based on dispatch option C. If the EMS gathers emergency data associated with the emergency that indicates that a burn victim is unconscious, the EMS can generate a dispatch recommendation for the emergency based on dispatch option D. Or, for example, if the EMS gathers emergency data associated with the emergency that indicates that a building fire has ignited and that a burn victim is unconscious, the EMS can generate a dispatch recommendation based on dispatch recommendations C and D. For example, is dispatch option C specifies two fire trucks and two basic life safety ambulances and dispatch option D specifies one advanced life safety ambulance, the EMS can combine both to generate a dispatch recommendation including two fire trucks, two basic life safety ambulances, and an advanced life safety ambulance. As described above with respect to FIG. 22, in some embodiments, a dispatch recommendation includes at least one type of emergency response unit and at least one number of the at least one type of emergency response unit. In some embodiments, the EMS identifies a location of an emergency and generates a dispatch recommendation for the emergency based at least in part on a dispatch option and the location of the emergency. In some embodiments, the emergency management system accesses a responder information database, identifies one or more emergency service providers in the vicinity of the location of the emergency, and determines the types, capabilities, or availabilities of emergency response units from the one or more emergency service providers. In some embodiments, the dispatch recommendation includes directions from one or more emergency service providers to the location of the emergency, as depicted by FIG. 21.

FIG. 24 depicts an embodiment of an emergency report 2484 (also referred to as an "incident report") in accordance with one embodiment of the present disclosure. In some embodiments, the emergency management system generates an emergency report 2484 for an emergency, as depicted by FIG. 24. In some embodiments, the emergency report 2484 includes a nature of the emergency, a severity index for the emergency, and a dispatch recommendation for the emergency. In some embodiments, the emergency report 2484 includes a location of the emergency. In some embodiments, the emergency report 2484 includes a dispatch recommendation and a location of the emergency. In some embodiments, the emergency report 2484 includes a transcription of emergency data associated with an emergency alert generated for the emergency. In some embodiments, the emergency report 2484 includes a data and time of when the emergency alert was received. In some embodiments, the emergency management system receives a notification when an emergency responder is dispatched to the emergency and when the emergency responder arrives at the emergency, and the emergency report 2484 includes a first date and time of when the emergency responder was dispatched to the emergency and a second date and time of when the emergency responder arrived at the emergency. In some embodiments, an emergency report 2484 is transmitted to an emergency service provider that responded to the associated emergency after the emergency report is generated. In some embodiments, after an emergency report is transmitted to an ESP, the emergency report is uploaded into the ESP system at the ESP (such as into a CAD system included in the ESP system).

In some embodiments, some or all of emergency data associated with an emergency alert and gathered by the emergency management system is transmitted to an emergency service provider. For example, in some embodiments, the emergency management system can transmit multimedia (e.g., audio or video) associated with the emergency alert to an emergency service provider. In some embodiments, if the EMS receives a video stream from a smart camera, the EMS can direct the video stream directly to an endpoint of the ESP system. Alternatively, the EMS can provide the ESP with a weblink to a domain hosting the video stream. In some embodiments, the EMS transmits data or multimedia received from an electronic device indirectly to an ESP (e.g., the EMS consumes the data or multimedia before relaying the data or multimedia to the ESP). For example, if the EMS can receive a video stream from a smart camera to an endpoint of the EMS and then transmit the video stream from the EMS to an endpoint of the ESP system. Alternatively, the EMS can generate a video stream from a smart camera by continuously querying the smart camera for a still image (e.g., two still images per second) and patching the images together to form a video stream after the still images are received by the EMS. The EMS can then transmit the patched together video stream to the ESP. In some embodiments, the emergency management system summarizes emergency data associated with the emergency alert into a summarization, such as a text summary. For example, in some embodiments, the emergency management system can summarize audio or video associated with the emergency alert, such as by analyzing the audio or video and creating a description of the audio or video. In some embodiments, along with a description of the emergency data, a summarization can include information such as emergency data type (e.g., media type), the type of device from which the emergency data was captured, location, and timestamp. After creating a summarization of emergency data associated with the emergency alert, the emergency management system can then transmit the summarization to an emergency service provider.

Machine Learning Algorithms

In some embodiments, the systems, methods, and media described herein use one or more algorithms analyzing emergency data. In some embodiments, machine learning algorithms are used for training prediction models and/or making predictions such as predicting a dispatch category based on available emergency data. In some embodiments, the emergency data comprises social media data. In some embodiments, social media data is screened or filtered to obtain relevant emergency data. In some embodiments, machine learning algorithms are used for training models for generating questions or responses to questions as part of an autonomous chat session with a user. In some embodiments, a machine learning model is trained to evaluate message(s) from a user and generate an output indicative of a response or communication or type of response or communication to the user. As an illustrative example, a user message requesting help and stating there is a fire may be processed by the model to generate an output corresponding to a response that the fire department is on the way. In some instances, machine learning methods are applied to the generation of such models.

In some embodiments, a machine learning algorithm uses a supervised learning approach. In supervised learning, the algorithm generates a function from labeled training data. Each training example is a pair consisting of an input object and a desired output value. In some embodiments, an optimal scenario allows for the algorithm to correctly determine the class labels for unseen instances. In some embodiments, a supervised learning algorithm requires the user to determine one or more control parameters. These parameters are optionally adjusted by optimizing performance on a subset, called a validation set, of the training set. After parameter adjustment and learning, the performance of the resulting function is optionally measured on a test set that is separate from the training set. Regression methods are commonly used in supervised learning. Accordingly, supervised learning allows for a model or classifier to be generated or trained with training data in which the expected output is known such as when the emergency category for past emergency events or alerts have been confirmed.

In some embodiments, a machine learning algorithm uses an unsupervised learning approach. In unsupervised learning, the algorithm generates a function to describe hidden structures from unlabeled data (e.g., a classification or categorization is not included in the observations). Since the examples given to the learner are unlabeled, there is no evaluation of the accuracy of the structure that is output by the relevant algorithm. Approaches to unsupervised learning include: clustering, anomaly detection, and neural networks.

In some embodiments, a machine learning algorithm learns in batches based on the training dataset and other inputs for that batch. In other embodiments, the machine learning algorithm performs on-line learning where the weights and error calculations are constantly updated.

In some embodiments, a machine learning algorithm is applied to new or updated emergency data to be re-trained to generate a new prediction model. In some embodiments, a machine learning algorithm or model is re-trained periodically. In some embodiments, a machine learning algorithm or model is re-trained non-periodically. In some embodiments, a machine learning algorithm or model is re-trained at least once a day, a week, a month, or a year or more. In some embodiments, a machine learning algorithm or model is re-trained at least once every 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days or more.

In some instances, machine learning methods are applied to select, from a plurality of models generated, one or more particular models that are more applicable to certain attributes. In some embodiments, different models are generated depending on the distinct sets of attributes obtained for various communications.

In some embodiments, the classifier or trained algorithm of the present disclosure comprises one feature space. In some cases, the classifier comprises two or more feature spaces. In some embodiments, the two or more feature spaces are distinct from one another. In various embodiments, each feature space comprise types of attributes associated with an emergency alert or communication such as the location, user identity, user demographic information (e.g., gender, age, ethnicity, etc.), and other types of relevant emergency information. In some embodiments, the accuracy of the classification or prediction is improved by combining two or more feature spaces in a classifier instead of using a single feature space. The attributes generally make up the input features of the feature space and are labeled to indicate the classification of each communication for the given set of input features corresponding to that communication.

In some embodiments, an algorithm utilizes a predictive model such as a neural network, a decision tree, a support vector machine, or other applicable model. Using the training data, an algorithm is able to form a classifier for generating a classification or prediction according to relevant features. The features selected for classification can be classified using a variety of viable methods. In some embodiments, the trained algorithm comprises a machine learning algorithm. In some embodiments, the machine learning algorithm is selected from at least one of a supervised, semi-supervised and unsupervised learning, such as, for example, a support vector machine (SVM), a Naïve Bayes classification, a random forest, an artificial neural network, a decision tree, a K-means, learning vector quantization (LVQ), regression algorithm (e.g., linear, logistic, multivariate), association rule learning, deep learning, dimensionality reduction and ensemble selection algorithms. In some embodiments, the machine learning algorithm is a support vector machine (SVM), a Naïve Bayes classification, a random forest, or an artificial neural network. Machine learning techniques include bagging procedures, boosting procedures, random forest algorithms, and combinations thereof.

In some embodiments, a machine learning algorithm such as a classifier is tested using data that was not used for training to evaluate its predictive ability. In some embodiments, the predictive ability of the classifier is evaluated using one or more metrics. These metrics include accuracy, specificity, sensitivity, positive predictive value, negative predictive value, which are determined for a classifier by testing it against a set of independent cases (e.g., communications). In some instances, an algorithm has an accuracy of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein. In some instances, an algorithm has a specificity of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein. In some instances, an algorithm has a sensitivity of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein. In some instances, an algorithm has a positive predictive value of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein. In some instances an algorithm has a negative predictive value of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein.

In some embodiments, the emergency data and/or communications (e.g., automated chat messages) undergoes natural language processing using one or more machine learning algorithms. In some embodiments, the one or more machine learning algorithms utilize word embeddings that map words or phrases to vectors of real numbers. In some embodiments, the embeddings serve as the input into the machine learning model. In some embodiments, the mapping is generated by a neural network. In some embodiments, a machine learning algorithm is applied to parse the text obtained from an available source such as the autonomous chat session, a social media post or message, or a message received from the user (e.g., text message or extracted text from a video or audio recording/streaming by the user). In some embodiments, a machine learning algorithm is applied to segment words into morphemes and identify the class of the morphemes. In some embodiments, a machine learning algorithm is applied to identify and/or tag the part of speech for the words in the multimedia content (e.g., tagging a word as a noun, verb, adjective, or adverb). In some embodiments, the application applies at least one machine learning algorithm to emergency communications such as alerts, messages, requests, or chat session information to determine an emergency type (e.g., injury or accident, medical problem, shooting, violent crime, robbery, tornado, or fire) and/or emergency level (e.g., safe, low, medium, high). In some embodiments, the algorithm determines an appropriate emergency dispatch center based on the emergency data. For example, training data sets comprising emergency locations and actual emergency response times for specific dispatch centers and/or first responders. For example, an actual emergency response time may be calculated based on a first time when the emergency alert or communication was sent and/or received or when the first responder(s) was assigned and/or contacted regarding an emergency and a second time when the responder(s) reached the victim or emergency location. Accordingly, machine learning can train models that accept data inputs such as emergency location and dispatch center and/or first responder(s) (e.g., a particular police or fire station or hospital), and generate an output indicating an estimated response time. In some embodiments, the training data and/or data inputs include additional information that can influence response time such as time of the emergency and/or level of traffic congestion (e.g., near the emergency location, the responder location, or a calculated route connecting the emergency and responder locations).

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, a "device" or "electronic device" is a digital processing device designed with one or more functionality, for example, a communication device or sensor device. A "communication device" refers to a communication device with a communication component, which will allow it to send and receive information over a wireless channel, a wired channel, or any combination thereof (e.g., sending/receiving information over the Internet). Examples of electronic devices include a mobile phone (e.g., a smartphone), a laptop, a desktop, a tablet, a radio (e.g., a two-way radio), and a vehicular communication system. In some embodiments, an electronic device includes a car security system (e.g., OnStar®), a home security system, or a home control system (e.g., a networked control system for providing network controlled and/or smart temperature control such as a Wi-Fi smart thermostat, lighting, entertainment, and/or door control, such as Nest®). In some embodiments, a triggering device is an Internet of Things (IoT) device. In some embodiments, the triggering device is a sensor for sensing environmental or health indicators. In some embodiments, the sensor may include a sensing component and a communication component. In some embodiments, the electronic device is a sensor in a sensor network or a device that controls a sensor network.

In some embodiments, an electronic device is a wearable device (e.g., a communication device worn by a user). In some embodiments, an electronic device (e.g., a wearable device) comprises one or more sensors. As used herein, a "mobile wireless device" refers to a device that is portable and communicates wirelessly. In some embodiments, a user wears or carries the mobile wireless device on the user's person or in the user's vehicle. Examples of mobile wireless devices include mobile or cellular phones, wearable devices (e.g., smart watch, fitness tracker, wearable sensor, smart glasses, etc.).

As used herein, an "associated device" refers to an electronic device that is associated with another electronic device. For example, a user may be using several communication devices such as a mobile phone, a wearable, a home security system, a car computer. The user may have registered these devices with his or her account and linked these devices with a user name, user number(s), email address(es), home or other physical address(es). In some embodiments, associated devices may include communication devices of a second user who is associated with user, e.g., a husband and wife, a father and son, a patient and doctor, friends, work colleagues, etc. In some cases, the user may have added the second user as an emergency contact, a member of a group, etc. In some cases, user may have agreed to share location and other data with the second user. In some embodiments, the second user may be someone who is frequently contacted by the user and the communication device identifies the second user from the "Recently called" or "Frequently called" list. In some embodiments, associated devices may be devices that are proximal or near-by to an electronic device such as obtained through a Wi-Fi scan. In some embodiments, an associated device is proximal to the triggering device when the location of the associated device is within 1, 5, 10, 15, 20, 25, 30, 35, 40, 45, 50, 60, 70, 80, 90, 100, 200, 300, 400, or 500 meters of the location of the triggering device.

As used herein, the "list of associated devices" refers to a list of electronic devices that are associated with a user or another electronic device (e.g., a second resident in a smart home). The list of associated devices may be listed by user name, phone number, email address, physical address, coordinates etc. The device entry in the list may include phone number, email address, physical address, coordinates, BSSID, SSID or MAC address. The list may be user defined or generated by the device or the EMS.

As used herein, an "emergency alert" refers to a communication relating to an emergency or non-emergency situation. In some embodiments, an emergency alert is an emergency request for assistance (e.g., the request is associated with an emergency situation). In some embodiments, an emergency alert comprises an emergency indication. In further embodiments, an emergency indication is selected from one or more of the group consisting of traffic accident, police emergency, medical emergency, and fire emergency. In some embodiments, an emergency alert is associated with a non-emergency situation (e.g., request for a tow truck after car breaks down). In some embodiments, an emergency alert is associated with a device sending the alert. In other embodiments, an emergency alert is associated with a device not sending the alert (e.g., a proxy request on behalf of a second device and/or a member device in a group of devices). As used herein, an emergency alert is "associated" with a device or user when the emergency alert relates to an emergency or non-emergency situation involving the device or user. In some embodiments, an emergency alert comprises data associated with a device (or user thereof). In some embodiments, an emergency alert comprises data associated with an electronic device sending the alert or another device. For example, in some embodiments, an emergency alert comprises data associated with a device, wherein the data set comprises current and/or past location data. In another example, the data set comprises current and/or past health data associated with the user of an electronic device. In other embodiments, an emergency alert is sent and/or received separately from data associated with a device.

As used herein, a "request for assistance" refers to a request or message sent to a recipient asking for help. In some embodiments, a request for assistance is an emergency request for assistance (e.g., the request is associated with an emergency situation) such as, for example, an emergency alert. In some embodiments, an emergency alert comprises a request for assistance. In some embodiments, a request for assistance is associated with an emergency situation. In some embodiments, a request for assistance comprises an emergency indication. In further embodiments, an emergency indication is selected from one or more of the group consisting of traffic accident, police emergency, medical emergency, and fire emergency. In some embodiments, a request for assistance is associated with a non-emergency situation (e.g., request for a tow truck after car breaks down). In some embodiments, a request for assistance is associated with a device sending the request. In other embodiments, a request for assistance is associated with a device not sending the request (e.g., a proxy request on behalf of a second device and/or a member device in a group of devices). As used herein, a request is "associated" with a device or user when the request relates to an emergency or non-emergency situation involving the device or user. In some embodiments, a request comprises data associated with a device (or user thereof). In some embodiments, a request comprises a data set associated with a device. For example, in some embodiments, a request comprises a data set associated with a device, wherein the data set comprises current location data. In other embodiments, a request for assistance is sent and/or received separately from data associated with a device. For example, in some embodiments, a request is sent first, and the recipient subsequently queries the device that sent the request for data or a data set associated with the emergency and/or device or user involved in the emergency. Alternatively, in some embodiments, a request is sent first, and the recipient subsequently queries the device associated with the emergency for data or a data set associated with the emergency and/or device or user involved in the emergency.

As used herein, a "first responder" refers to any person or persons responsible for addressing an emergency situation. In some embodiments, a first responder refers to government personnel responsible for addressing an emergency situation. In some embodiments, a first responder is responsible for a particular jurisdiction (e.g., a municipality, a township, a county, etc.). In some embodiments, a first responder is assigned to an emergency by an emergency dispatch center. In some embodiments, a first responder responds to a request for emergency assistance placed by a user via a user communication device. In some embodiments, a first responder includes one or more fire fighters, police officers, emergency medical personnel, community volunteers, private security, security personnel at a university, or other persons employed to protect and serve the public and/or certain subsets of the population.

As used herein, an "emergency service provider" (ESP) is a public or private organization or institution responsible for providing emergency services. For example, in some embodiments, an EDC (e.g., a public safety answering point (PSAP)), a fire department, a police department, and a hospital may all be considered emergency service providers. In some embodiments, an emergency responder is a member of an ESP. In some embodiments, an ESP personnel is a person who works at an ESP. For example, an ESP personnel may be a call-taker at a PSAP or a first responder at a fire department.

As used herein, a "recipient" refers to one or more persons, services, or systems that receive a request for assistance (e.g., an emergency alert). The recipient varies depending on the type of request. In some embodiments, a recipient is an emergency service. In some embodiments, a recipient is an emergency service when the request for assistance pertains to an emergency (e.g., a tier 2 emergency). In some embodiments, a recipient is an emergency management system. In some embodiments, a recipient is an emergency dispatch center. In some embodiments, a recipient is an emergency dispatch center, wherein the request is first routed through an emergency management system (e.g., request is sent to the EMS, but ultimately is sent to an EDC). In some embodiments, a recipient is a first responder (e.g., a communication device of a first responder). In some embodiments, a recipient is a non-emergency service or personnel, for example, a relative or friend. In such situations, a user of a communication device (or member device or second device) does not require emergency assistance, but does need help. As an example, a user of a member device in a group of devices is a child who is lost in a theme park. The parent of the child has a communication device in the same group of devices as the child's member device. The parent uses the communication device to send a request for assistance on behalf of the child's member device to theme park security guards who are closer to the child than the parent. Security is then able to pick up the child quickly using the data set associated with the member device, which they are given authorization to access by the parent's communication device.

As used herein, a "user" refers to one or more person or persons associated with a device (e.g., communication device, member device, second device, device of a first responder, etc.). In some embodiments, a user utilizes a device to place a request for assistance. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.).

As used herein, "data" refers to a collection of information about one or more entities (e.g., user of a user communication device) and/or an environment that pertains to characteristics of the one or more entities. In some embodiments, an entity is a person. In some embodiments, an entity is a thing (e.g., a house). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by the current emergency situation. As an example, two unrelated users are involved in a vehicular collision, and each user sends a separate emergency request (for traffic accident) using his/her communication device. In this example, the separate emergency requests are associated (e.g., by an emergency management system and/or emergency dispatch center) with the same emergency based on the proximity of time, location, and emergency indication of the emergency requests. As a result, the data set for this accident comprises information from both user communication devices. In this example, the data set comprises location information from both devices (e.g., GPS coordinates), biosensor data for one or both devices (e.g., biosensor data such as heart rate and blood pressure can be important in case of injury), and information about the vehicle driven by each user (e.g., make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "health data" refers to medical information associated with a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to general information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

As used herein, "communication link" refers to a communication pathway from a device (e.g., communication device) to another device or to an intermediate device (e.g., a router) on a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). A communication link refers to the point-to-point communication channels, point-to-point and end-to-end data sessions, and the physical hardware facilitating the communication channel(s) (e.g., antennas used to communicate/transmit information). In some embodiments, a data session comprises session parameters and the network route taken from one device to another device.

As used herein, an "autonomous communication session" is a communication session held between a user of an electronic device and an artificial conversational entity (e.g., a chatbot). The artificial conversational entity can communicate with the user of the electronic device according to a predetermined script or completely independently using any appropriate form of artificial intelligence, such as deep learning or natural language processing. In some embodiments, a chatbot communicates with a user of an electronic device by posing questions to the user to gather emergency data or information. In some embodiments, the chatbot poses yes-or-no questions to the user of the electronic device. In some embodiments, the chatbot poses multiple choice questions to the user of the electronic device. In some embodiments, the chatbot poses free response questions to the user of the electronic device. The autonomous communication session may be held using different types of electronic devices and different interfaces of electronic devices.

As used herein, a "data channel" refers to a communication session between two devices wherein data packets are exchanged between the devices. In some embodiments, a data session is setup using exchange of certain data packets, also called as "handshake signals," which are able to define the capabilities of the data session. For example, in some embodiments, the data session "handshake" provides for the ability to transfer multi-media data, voice data, and other data via the data session. In some embodiments, the data session is setup without the use of handshake signals, wherein the two devices involved share data packets according to a predefined protocol (e.g., a previously agreed upon protocol). In some embodiments, the data session is routed through an EMS, which stores the multi-media, voice, and/or other data from any of the devices that are part of the data session. In further embodiments, the EMS shares the data from the data session with the other device (e.g., device of a first responder). In some embodiments, the EMS manages the data session.

As used herein, a "Received Signal Strength Indicator (RSSI)" refers to a measurement of the power present in a received radio signal. In some embodiments, the RSSI refers to a number assigned to the signal levels (e.g., power level) of packets as detected by a device receiving the packets from a device sending the packets. For example, an RSSI value may be a number within an arbitrary range such as from 0 to 100. In some embodiments, the RSSI refers to the decibel level of the power of the received data packets. In other embodiments, the RSSI refers to the actual power, for example measured in mW, as detected by the receiver. In some embodiments, RSSI is replaced with received channel power indicator (RCPI), which is a measure of the received radio signal power in a selected channel over the preamble and the entire received frame.

As used herein, "voice or speech recognition software" refers to computer programs that can recognize a person's speech to identify trigger phrases (e.g., iListen, Voice Navigator, Google Now, LilySpeech, etc.). In some embodiments, the software may be able to recognize the identity of the speaker. As used herein, "voice command" refers to words or phrases that a user may use to give command to the triggering device. The trigger phrases may be user-defined or may be from a library of phrases on the trigger device or at a remote server.

As used herein, "sound detection software" refers to computer programs for detecting trigger sounds in and around the triggering device. The trigger sounds may be user-defined or may be from a library of phrases on the trigger device or at a remote server. The trigger sounds may be sounds (alarms, breakage, gunshots, explosion, fire, car crash, etc.) or absence of sound (e.g., no heartbeat, etc.). For example, a glass break detector software may use the microphone in the trigger device to monitor any noise or vibrations to detect burglaries in a smart home. If the vibrations exceed a baseline, they may be analyzed by the software. The software may analyze frequencies typical of glass shattering and trigger an emergency alert if the sound is above a trigger threshold. In some cases, the software may compare detected sounds with glass-break profiles analysis and trigger an alert if the amplitude threshold and/or statistically expressed similarity threshold are breached. In some embodiments, an emergency is detected or triggered when a trigger sound exceeds a threshold. In some embodiments, a trigger sound threshold is about 50, 55, 60, 65, 70, 75, 80, 85, 90, 95, 100, 110, 120, 130, 140, 150, 160, 170, 180, 190, or 200 decibels. In some embodiments, a trigger sound threshold is at least about 50, 55, 60, 65, 70, 75, 80, 85, 90, 95, 100, 110, 120, 130, 140, 150, 160, 170, 180, 190, or 200 decibels. In some embodiments, a trigger sound threshold is no more than about 50, 55, 60, 65, 70, 75, 80, 85, 90, 95, 100, 110, 120, 130, 140, 150, 160, 170, 180, 190, or 200 decibels.

Modern communication devices, for example, smart phones, tablet computers, wearable communication devices, smart sensor devices and/or systems are often equipped with a variety of features for determining location information of the communication device using, for example, GPS, or triangulation with cellular phone towers. Modern communication devices also often include functionality to store data regarding a user of the communication device, for example, health information about the user.

In some embodiments, the communication device (or communication module of the device) communicates with a recipient through one or more data channels. In some embodiments, the recipient is an emergency management system. In some embodiments, the EMS routes communications to an EDC. In further embodiments, the EMS establishes a first data channel with the communication device and a second data channel between the EMS and the EDC, wherein the EMS bridges the first and second data channels to enable the communication device and the EDC to communicate. In some embodiments, the EMS converts data (e.g., data set) from the communication device into a format suitable for the EDC (e.g., analog or digital, audio, SMS, data, etc.) before sending or routing the formatted data to the EDC. In some embodiments, the EMS routes communications to a device associated with a first responder. In some embodiments, the communication device relays additional communications, information, and/or data sent or shared between member devices in the group of devices to the EMS or EDC after a request for assistance has been sent. In further embodiments, the additional information is relayed to the EMS or EDC after the request for assistance has been sent in order to provide current information that is relevant to the request. For example, in some instances, communications between member devices contain information relevant to the emergency (e.g., information that the user of member device who is experiencing a medical emergency suffers from diabetes). Accordingly, in some embodiments, the information is sent autonomously, at request of a user of the communication device, or at request of the recipient (e.g., EMS, EDC, first responder, etc.).

The present methods and systems disclose partially or fully integrated solutions emergency management systems, emergency service providers, and electronic devices. Previous systems were not integrated and could not provide secured pathways, user privacy and software compatibilities. In some embodiments, partial integration with a dispatch center or first responder may involve adding the emergency management system as a "trusted link" on their systems or devices. In some embodiments, end-to-end software solutions are beneficial, e.g., for video feed from sensor to be available to first responders.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the non-volatile memory comprises magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

EXAMPLES

The following illustrative examples are representative of embodiments of the systems, methods, devices, and media described herein and are not meant to be limiting in any way.

Just In Time, an emergency response company, aids emergency service providers (ESPs; such as public safety answering points (PSAPs) and emergency dispatch centers) by gathering emergency data from a variety of sources and delivering the data directly to the emergency service providers during emergencies. To this end, Just In Time maintains and provides an emergency management system (hereinafter, "EMS") that receives and stores data, information, and multimedia (hereinafter, "emergency data") during emergencies from a plurality of sources, such as mobile phones and mobile applications, internet of things (IoT) devices, intelligent vehicle systems, and other electronic devices. The EMS can then deliver helpful and relevant emergency data to ESPs that can help the ESPs in responding to emergencies. For example, the EMS can provide a live streaming video of a fire to the nearest fire department, providing situational awareness that allows the firefighters to arrive more prepared to address the fire.

However, the EMS can also aid emergency response or provide emergency assistance in various ways when an emergency service provider (e.g., a PSAP) is preoccupied or otherwise unavailable, as exemplified below.

Example 1—Autonomous Communication Session

Darius Wilde has just graduated from college and is living at home with his mother in South Florida while he searches for jobs. One day late in the summer, a category 5 hurricane comes off the coast of Florida and descends on their city, causing massive flooding that turns their streets into small rivers that cars cannot drive through. Darius and his mother did not choose to evacuate and are now trapped within their home. After a day of being trapped inside, Darius' mother trips and falls down the stairs, severely injuring her arm in the fall. They believe that Darius' mother has broken her arm, and, unable to drive his mother to the nearest hospital due to the flooding, Darius calls 9-1-1 on his cell phone.

Unfortunately, Darius' local PSAP is unable to answer Darius' 911 call because the city is experiencing many more emergencies than usual due to the hurricane. There are dozens of 911 calls on hold waiting in line before Darius' call. However, the EMS detects an emergency alert comprising Darius' location (their home address, 6104 Gatorback Lane) generated by Darius' cell phone in response to Darius dialing 9-1-1 and initiates an autonomous communication session with Darius by sending an emergency response text message to Darius' cell phone while Darius is on hold. The emergency response message is a text message that reads "Hello, this is the 911 chatbot. Are you experiencing an emergency? Reply "Yes" if so, "no" if not." Darius responds to the emergency response message by texting back a message that reads "Yes." The EMS immediately replies with a text message that reads "Is your location 6104 Gatorback Lane? Reply "Yes" if so, "no" if not." Darius replies by texting back a second "Yes" message. The EMS then replies with a message that reads "Please describe the nature of your emergency." Darius texts back "My mother fell down the stairs and appears to have broken her arm but we are trapped within our house because of the hurricane flooding." The EMS responds with "Your emergency has been noted and delivered to your local PSAP. If the nature of your emergency changes or develops, please text us the update here."

The EMS then shares the location and nature of Darius' emergency with the local PSAP. The local PSAP is made of aware of the emergency without having to speak directly to Darius. The local PSAP is then able to prioritize Darius' emergency faster than they would have been able to if they had to wait to speak to Darius directly. Darius remains on hold with the local PSAP just in case he is able to get through to a call taker. Twenty minutes later, however, Darius receives a call from an emergency responder.

A call taker at the local PSAP was responding to an emergency call from a location close to Darius' location when the call taker received a notification regarding Darius' emergency from the EMS. The call taker was then able recommend that the two emergencies be addressed simultaneously, if possible, by the same emergency responders. On their way to respond to the first emergency, an emergency responder called Darius to let him know that they would be passing by Darius' location in a riverboat after responding to the first emergency to pick up Darius' mother and take her to the nearest hospital.

Example 2—Emergency Assistant

Caroline Smith lives alone in a one-bedroom apartment in New York City. Her kitchen and living room are conjoined in the small apartment. In her living room, Caroline has an Amazon Alexa smart speaker that she uses to control her various smart home products. One day, as she is cutting onions to prepare a dinner for herself, Caroline brings her left hand to her eyes to wipe away some onion-induced tears and inadvertently gets chili pepper flakes in her eye. Instinctively, in response to the burning in her eye, she drops the knife in her right hand. The knife falls and impales her bare foot.

When it registers that the knife has landed in her foot, Caroline screams and drops to the floor. Mortified, she yells, "Alexa, call 9-1-1!" In response, her smart speaker begins dialing 9-1-1. Simultaneously, the smart speaker sends an emergency alert to the EMS. In response to receiving the emergency alert, the EMS initiates an emergency assistant application on the smart speaker. The smart speaker then begins audibly asking Caroline questions. First, the smart speaker asks if Caroline's emergency is a fire, medical, or police emergency. Caroline verbally responds and tells the emergency assistant application (via the smart speaker) that she is experiencing a medical emergency. The smart speaker then asks if she is bleeding; then asks if the wound is an abrasion, a laceration, a puncture, or an avulsion; and finally asks if the blood is dripping, gushing, or pooling. Caroline tells the emergency assistant application that she is bleeding, that it is a puncture wound, and that the blood is gushing.

After verbally receiving the description of Caroline's emergency through the smart speaker, the emergency assistant provides a safety recommendation that audibly instructs Caroline through the smart speaker on how best to treat the injury until emergency responders are able to respond to her emergency. The EMS also transmits the description of Caroline's emergency her local PSAP. Just after Caroline finishes tending to her wound according to the safety recommendation, her 9-1-1 call is picked up by a call taker at the local PSAP. The call taker has already received the description of Caroline's emergency from the EMS and is able to simply confirm the details with Caroline before dispatching an ambulance to Caroline's location.

Example 3—Automatic Emergency Response Coordination

Rufus Black, an architect and real estate developer, has just moved from Greensboro, North Carolina to Anise, Arizona, a new and recently built city. Anise, AZ has a number of emergency dispatch centers—three police stations, two fire departments, and two hospitals with emergency rooms—but does not have any public safety answering points (PSAPs). Representatives of the emergency dispatch centers met previously and decided to adopt the Phoenix, AZ dispatch protocols (e.g., what types of emergency response units and how many should be dispatched for different types of emergencies) for their new city. The representatives of the emergency dispatch centers then submit the Phoenix, AZ dispatch protocols to the EMS. The EMS is communicatively coupled to the dispatch systems of the emergency dispatch centers in Anise, AZ, such that the EMS is constantly aware of the availability of emergency response units at the emergency dispatch centers.

One day, Rufus is driving on a highway to visit an empty plot of land on the outskirts of Anise, AZ that he and his associates are considering purchasing to develop a hotel and casino on. On the way, luggage falls out of the trunk of a car in front of Rufus. Rufus veers right to avoid running into the luggage but is hit by a car in the lane to his right. Rufus' car is impacted at an angle in the center of the right side of his car. An intelligent vehicle system installed in Rufus' car is configured to log the speed that Rufus was driving and detect the part of Rufus' car that was impacted and the force with which the car was impacted. The intelligent vehicle system is also aware that Rufus was the only passenger in the car (using pressure sensors installed in the seats). In response to detecting the impact, the intelligent vehicle system sends all of this information to the EMS, which uses the information to determine the nature and severity of the emergency.

Based on the information—a side impact car accident involving multiple vehicles—the EMS is able to instantly determine that the emergency is most likely a car accident of medium severity. The EMS then references the dispatch protocols provided by the representatives of the emergency dispatch centers and the availability of emergency response units from the seven emergency dispatch centers and generates a dispatch recommendation for Rufus' car accident based on the determination of car accident of medium severity. The dispatch recommendation calls for a fire truck and two police squad cars from the fire department and police station nearest to the location of the car accident. The EMS then sends the dispatch recommendation to each of the emergency dispatch centers in Anise, AZ, which can use the dispatch recommendation to instantly respond to Rufus' car accident without the involvement of a PSAP.

What is claimed is:

1. A method for facilitating emergency communications by an emergency management system (EMS), the method comprising:
   detecting an emergency call made by a communication device;
   initiating an autonomous communication session with a user of the communication device through the communication device, wherein the autonomous communication session comprises one or more emergency response questions transmitted to the communication device and one or more user responses to the one or more emergency response questions received from the communication device;
   extracting emergency information from the one or more user responses received from the communication device;
   based at least in part on the emergency information extracted from the one or more user responses, generating a safety recommendation; and
   delivering the safety recommendation to the communication device to be presented to the user through an interface of the communication device.

2. The method of claim 1, wherein the one or more emergency response questions are transmitted to the communication device according to a predetermined script.

3. The method of claim 2, further comprising adapting the predetermined script during the autonomous communication session according to the one or more user responses received from the communication device.

4. The method of claim 1, wherein the autonomous communication session is facilitated through a microphone and a speaker housed by or otherwise communicatively coupled to the communication device.

5. The method of claim 4, wherein the safety recommendation is delivered to the communication device to be presented to the user through the speaker housed by or otherwise communicatively coupled to the communication device.

6. The method of claim 1, wherein the autonomous communication session is facilitated through a graphical user interface (GUI) provided by the communication device.

7. The method of claim 6, wherein the safety recommendation is delivered to the communication device to be presented to the user through the GUI provided by the communication device.

8. The method of claim 1, wherein detecting the emergency call made by the communication device comprises receiving an emergency alert generated by the communication device in response to the emergency call being made by the communication device and without receiving the emergency call.

9. The method of claim 1, further comprising presenting an emergency response prompt to the user through the interface of the communication device.

10. The method of claim 9, further comprising receiving, through the interface of the communication device, confirmation of the emergency response prompt from the user and initiating the autonomous communication session in response to receiving the confirmation of the emergency response prompt.

11. A emergency management system comprising a network component, a memory, and at least one processor communicatively coupled to the network component and the memory and operative to:
   detect an emergency call made by a communication device;
   initiate an autonomous communication session with a user of the communication device through the communication device, wherein the autonomous communication session comprises one or more emergency response questions transmitted to the communication device and one or more user responses to the one or more emergency response questions received from the communication device;
   extract emergency information from the one or more user responses received from the communication device;
   based at least in part on the emergency information extracted from the one or more user responses, generate a safety recommendation; and
   deliver the safety recommendation to the communication device to be presented to the user through an interface of the communication device.

12. The system of claim 11, wherein the one or more emergency response questions are transmitted to the communication device according to a predetermined script.

13. The system of claim 12, wherein the at least one processor is further operative to adapt the predetermined script during the autonomous communication session according to the one or more user responses received from the communication device.

14. The system of claim 11, wherein the autonomous communication session is facilitated through a microphone and a speaker housed by or otherwise communicatively coupled to the communication device.

15. The system of claim 14, wherein the safety recommendation is delivered to the communication device to be presented to the user through the speaker housed by or otherwise communicatively coupled to the communication device.

16. The system of claim 11, wherein the autonomous communication session is facilitated through a graphical user interface (GUI) provided by the communication device.

17. The system of claim 16, wherein the safety recommendation is delivered to the communication device to be presented to the user through the GUI provided by the communication device.

18. The system of claim 11, wherein the at least one processor is further operative to detect the emergency call made by the communication device by receiving an emergency alert generated by the communication device in response to the emergency call being made by the communication device and without receiving the emergency call.

19. The system of claim 11, wherein the at least one processor is further operative to present an emergency response prompt to the user through the interface of the communication device.

20. The system of claim 19, wherein the at least one processor is further operative to receive, through the interface of the communication device, confirmation of the emergency response prompt from the user and initiating the autonomous communication session in response to receiving the confirmation of the emergency response prompt.

* * * * *